United States Patent
Pirkey et al.

(10) Patent No.: US 12,043,169 B2
(45) Date of Patent: Jul. 23, 2024

(54) CANCELLATION DEVICE FOR AN AUTOMOTIVE FEATURE

(71) Applicant: STRATTEC SECURITY CORPORATION, Milwaukee, WI (US)

(72) Inventors: Adam Pirkey, Germantown, WI (US); Gregory J. Organek, Whitefish Bay, WI (US); Steven J. Dimig, Plymouth, WI (US); Alan J. Ritz, Brookfield, WI (US); Ben Dimig, Elkhart Lake, WI (US)

(73) Assignee: STRATTEC SECURITY CORPORATION, Milwaukee, WI (US)

( * ) Notice: Subject to any disclaimer, the term of this patent is extended or adjusted under 35 U.S.C. 154(b) by 522 days.

(21) Appl. No.: 17/299,142

(22) PCT Filed: Dec. 3, 2019

(86) PCT No.: PCT/US2019/064164
§ 371 (c)(1),
(2) Date: Jun. 2, 2021

(87) PCT Pub. No.: WO2020/117754
PCT Pub. Date: Jun. 11, 2020

(65) Prior Publication Data
US 2022/0072994 A1    Mar. 10, 2022

Related U.S. Application Data

(60) Provisional application No. 62/775,229, filed on Dec. 4, 2018.

(51) Int. Cl.
*B60Q 1/40*    (2006.01)
*B60Q 1/068*    (2006.01)

(52) U.S. Cl.
CPC .......... *B60Q 1/40* (2013.01); *B60Q 1/068* (2013.01)

(58) Field of Classification Search
CPC .......... G05G 1/04; G05G 2009/0474; G05G 2009/04744; G05G 2009/04748;
(Continued)

(56) References Cited

U.S. PATENT DOCUMENTS 2,364,143 A    12/1944 Horton et al.
3,532,838 A    10/1970 Mollo
(Continued)

FOREIGN PATENT DOCUMENTS

DE    2849686 A1    5/1980
DE    102015000419 A1    7/2016
(Continued)

OTHER PUBLICATIONS

International Search Report with Written Opinion for related Application No. PCT/US2019/064164 dated Apr. 1, 2020 (12 Pages).
(Continued)

*Primary Examiner* — Anthony R Jimenez
(74) *Attorney, Agent, or Firm* — Michael Best & Friedrich LLP

(57) ABSTRACT

A cancellation device for an automotive feature on a vehicle includes a lever to be manually moved relative to the vehicle from a first, neutral position to a second, non-neutral position to actuate the motor vehicle feature. The cancellation device also includes at least one magnet to move the lever back to the first, neutral position.

20 Claims, 38 Drawing Sheets

(58) Field of Classification Search
CPC .......... G05G 2009/04751; G05G 2009/04755; H01H 2033/666; H01H 2033/667; H01H 2071/66; H01H 2071/665; H01H 2221/00; H01H 2221/016; H01H 3/04; H01H 3/06; H01H 3/32; H01H 3/46; H01H 3/54; H01H 3/58; H01H 13/186; H01H 2003/00; H01H 2003/46; H01H 2003/466; B60Q 11/00; B60Q 11/007; B60Q 1/26; B60Q 1/2603; B60Q 1/2607; B60Q 1/2619; B60Q 1/2623; B60Q 1/22; B60Q 1/34; B60Q 1/343; B60Q 1/38; B60Q 1/40; B60Q 1/1469; B60Q 1/1484; B60Q 1/068; B60Q 1/08
USPC ...................................................... 200/61.54
See application file for complete search history.

(56) References Cited

U.S. PATENT DOCUMENTS

| | | | |
|---|---|---|---|
| 4,900,946 A | 2/1990 | Williams et al. | |
| 5,216,399 A * | 6/1993 | Kamada | B60Q 1/425 335/190 |
| 6,175,290 B1 * | 1/2001 | Forsythe | B60Q 1/1469 335/207 |
| 6,518,524 B1 | 2/2003 | Brandt et al. | |
| 7,220,927 B2 | 5/2007 | Browne et al. | |
| 2012/0109463 A1 | 5/2012 | Elkins et al. | |
| 2016/0016508 A1 | 1/2016 | Hoskins et al. | |
| 2021/0323468 A1 | 10/2021 | Pirkey et al. | |
| 2022/0072994 A1 | 3/2022 | Pirkey et al. | |

FOREIGN PATENT DOCUMENTS

| | | |
|---|---|---|
| DE | 102018115330 A1 | 1/2020 |
| EP | 1102290 A1 | 11/2000 |
| EP | 1939039 A2 | 7/2008 |
| JP | S5858946 U | 4/1986 |
| WO | 2016098436 A1 | 6/2016 |
| WO | 2020001897 A1 | 1/2020 |
| WO | 2020117754 A1 | 6/2020 |
| WO | 2021216438 A1 | 10/2021 |

OTHER PUBLICATIONS

International Search Report with Written Opinion for related Application No. PCT/US2021/027940 dated Jun. 25, 2021 (16 Pages).
European Patent Office Extended European Search Report for application 19893112.3, dated Oct. 26, 2022 (12 pages).

* cited by examiner

CANCELLATION DEVICE FOR AN AUTOMOTIVE FEATURE

CROSS-REFERENCE TO RELATED APPLICATIONS

This application is a U.S. national stage entry of International Patent Application No. PCT/US2019/064164, filed on Dec. 3, 2019, which claims priority to U.S. Provisional Patent Application No. 62/775,229, filed on Dec. 4, 2018, the entire contents of each of which are fully incorporated herein by reference.

FIELD OF THE INVENTION

The present invention relates to turn signal devices, specifically turn signal devices for motor vehicles.

BACKGROUND OF THE INVENTION

Current motor vehicles include a multitude of adjustable vehicle features both on and within the vehicle, including but not limited to turn signal devices. Conventionally, turn signal devices include a stalk that is mounted to a steering wheel column. The stalk is positioned behind a steering wheel. The stalk is moved manually away from a starting position to activate a turn signal, and manual movement of the steering wheel itself cancels the turn signal and returns the stalk to its starting position.

SUMMARY OF THE INVENTION

In accordance with one construction, a cancellation device for an automotive feature on a vehicle includes a lever to be manually moved relative to the vehicle from a first, neutral position to a second, non-neutral position to actuate the motor vehicle feature. The cancellation device also includes at least one magnet to move the lever back to the first, neutral position.

In accordance with another construction, a cancellation device for an automotive feature on a vehicle includes a lever to be manually moved relative to the vehicle from a first, neutral position to a second, non-neutral position to actuate the motor vehicle feature. The cancellation device also includes a centering spring to naturally bias the lever back to the first, neutral position. The cancellation device also includes a magnet to generate a force to hold the lever in the second, non-neutral position.

In accordance with another construction, a cancellation device for an automotive feature on a vehicle includes a lever to be manually moved relative to the vehicle from a first, neutral position to a second, non-neutral position to actuate the motor vehicle feature. The cancellation device also includes a motor to move the lever back to the first, neutral position. The motor rotates in only a single rotational direction.

In accordance with another construction, a cancellation device for an automotive feature on a vehicle includes a lever to be manually moved relative to the vehicle from a first, neutral position to a second, non-neutral position to actuate the motor vehicle feature. The cancellation device also includes a centering spring to naturally bias the lever back to the first, neutral position, and a pulsed magnetic element to generate a force to hold the lever in the second, non-neutral position, and to release the force to allow the centering spring to return the lever back to the first, neutral position.

In accordance with another construction, a turn signal device includes a steering column and a stalk pivotally coupled to the steering column. The stalk is movable between an original starting position, a right turn position, and a left turn position. The device further includes an actuator configured to pivotally move the stalk from the right turn position back to the original starting position and from the left turn position back to the original starting position.

In accordance with another construction, a turn signal device includes a steering column and a stalk pivotally coupled to the steering column. The stalk is movable between an original starting position, a right turn position, and a left turn position. The device further includes a self-centering spring configured to pivotally move the stalk from the right turn position back to the original starting position and from the left turn position back to the original starting position.

In accordance with another construction, a turn signal device includes a steering column and a self-centering stalk pivotally coupled to the steering column. The stalk is movable between an original starting position, a right turn position, and a left turn position. The device further includes an actuator configured to hold the stalk in the right turn position and the left turn position, and a controller coupled to the actuator. The controller is configured to activate the actuator to release the stalk from the right turn position and the left turn position and allow the stalk to return to the original starting position.

In accordance with another construction, a turn signal device includes a steering column and a self-centering stalk pivotally coupled to the steering column. The stalk is movable between an original starting position, a right turn position, and a left turn position. The device further includes an actuator configured to move a detent mechanism to allow the stalk to return to the original starting position.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1A:
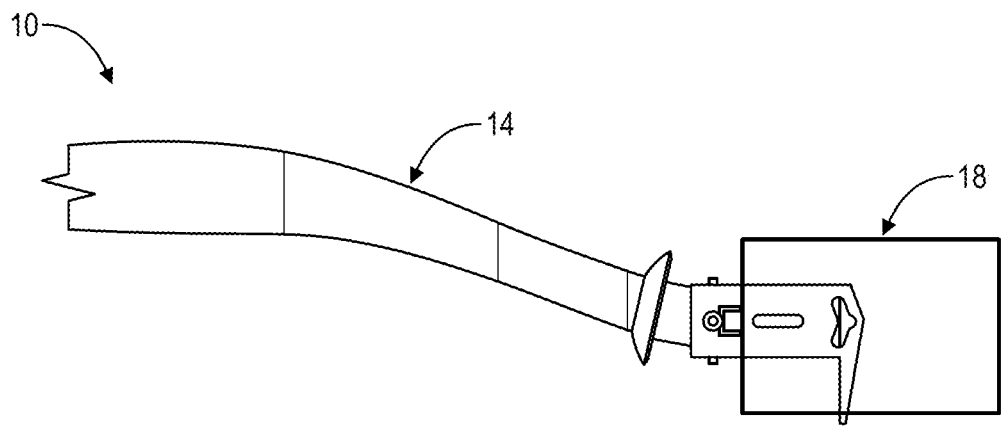
FIGS. 1A-1C are schematic views of a conventional turn signal device.
Figure 1B:
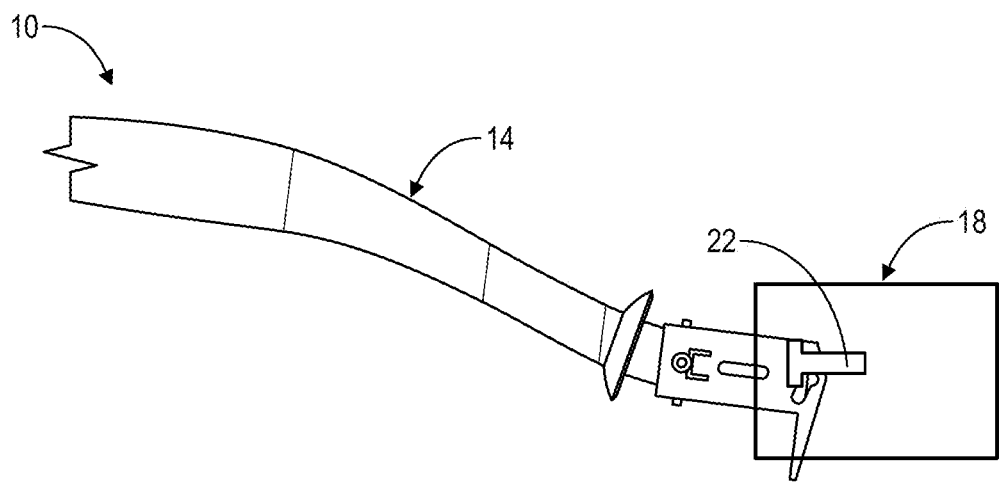
Figure 1C:
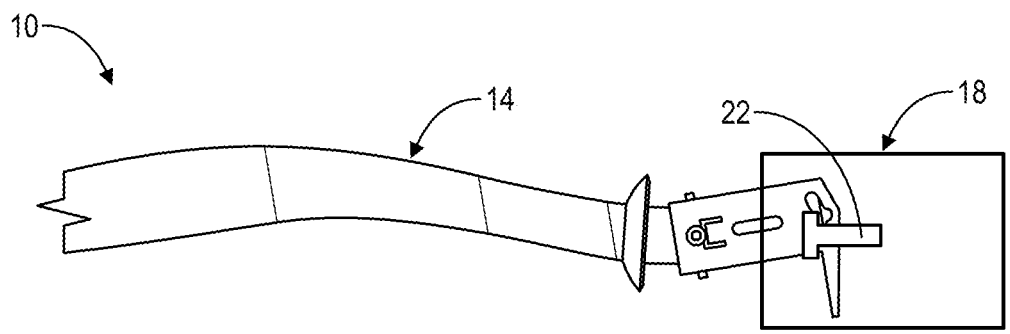

FIGS. 1A-1C illustrate a conventional turn signal device 10. The turn signal device 10 includes a stalk 14 that is pivotally mounted to a steering column 18 of a motor vehicle. As illustrated in FIG. 1, when a driver wishes to turn right, the driver manually raises and pivots the stalk 14 upwardly with his or her left hand from a starting position (FIG. 1A) to a right turn position (FIG. 1). The driver receives a tactile feedback (e.g., feel and sound) during this movement, caused for example by an over center spring or other detent mechanism located on the stalk 14 and/or steering column 18. The driver then turns a steering wheel clockwise to cause the vehicle to turn right. When the vehicle has completed its right-hand turn, the driver then turns the steering wheel counterclockwise. This counterclockwise movement of the steering wheel activates (e.g., pulls back on) a release pawl 22 (FIG. 1B) or other mechanical linkage structure or trip lever within the steering column 18, which physically forces the stalk 14 to return down to its original starting position (FIG. 1A) and cancels the right turn signal.

As illustrated in FIGS. 1A and 1C, when a driver wishes to turn left, the driver lowers and pivots the stalk 14 downwardly with his or her left hand from the starting position (FIG. 1A) to a left turn position (FIG. 1C). The driver again receives a tactile feedback (e.g., feel and sound) during this movement, caused for example by the over center spring or other detent mechanism located on the stalk 14 and/or steering column 18. The driver then turns the steering wheel counterclockwise to cause the vehicle to turn left. When the vehicle has completed the left-hand turn, the driver then turns the steering wheel clockwise. This clockwise movement of the steering wheel similarly activates the release pawl 22 (e.g., pulls back on the release pawl 22), which again physically forces the stalk 14 to return up to its original starting position (FIG. 1A) and cancels the left turn signal.

FIGS. 2-29 illustrate various embodiments of turn signal devices according to the invention. The devices described herein, which are cancellation devices, do not require a steering wheel to make the same manual, mechanical canceling of the turn signal as that shown in FIGS. 1A-1C. Rather, as described herein, the devices rely upon various types of actuators (e.g., solenoids, electric motors, permanent magnets, pulsed magnetics, smart materials, pumps, etc.) that hold or move a lever such as a stalk, a rotary knob, or any other component that is gripped and moved relative to the vehicle either linearly, rotationally, or a combination thereof. For example, the lever may be pivoted. The lever instead may be shifted linearly (e.g., pushed up or down). The lever may instead be a rotary knob that is twisted or otherwise rotated about an axis of rotation between different positions. The actuators may hold and/or return the lever to its natural starting position and cancel a turn signal. The devices are described in the context of a commercial motor vehicle. However, the devices may be used in a variety of different vehicles and settings, including in semis, military vehicles, industrial equipment, or any other settings where a driver or operator may be required to move the vehicle or equipment and to indicate that movement through the use of a turn signal.

Solenoids

Figure 2A:
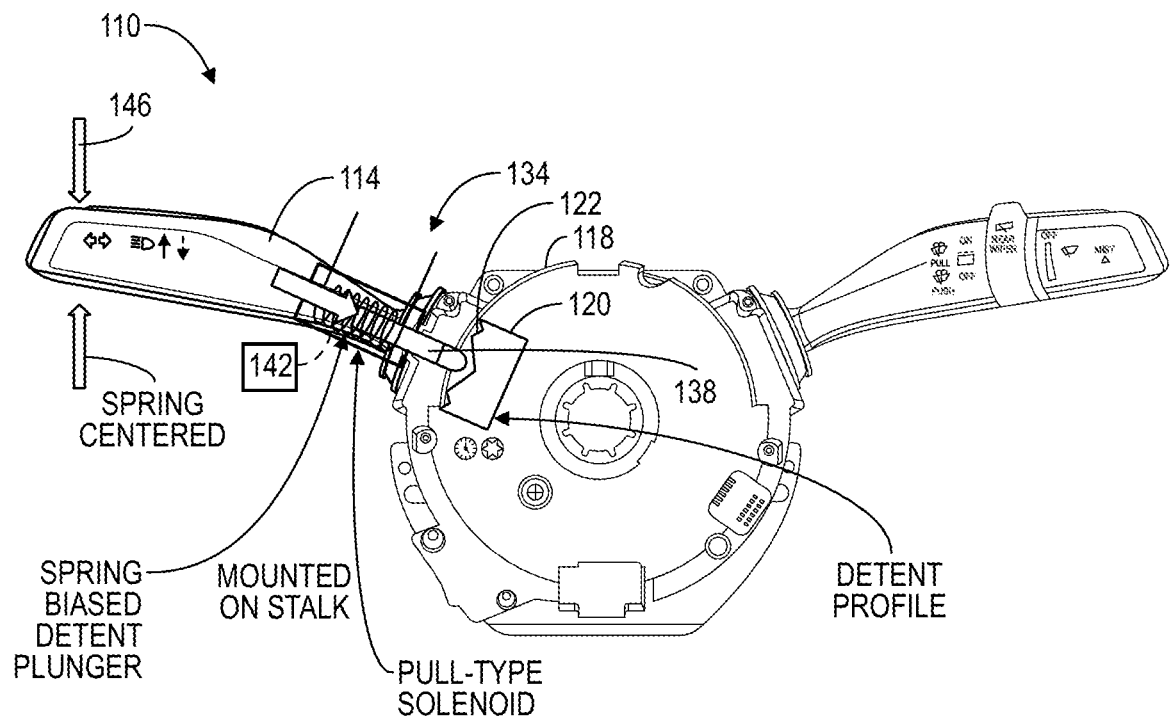
FIGS. 2-5 are schematic views of turn signal devices according to various embodiments, each incorporating a solenoid.
Figure 2B:
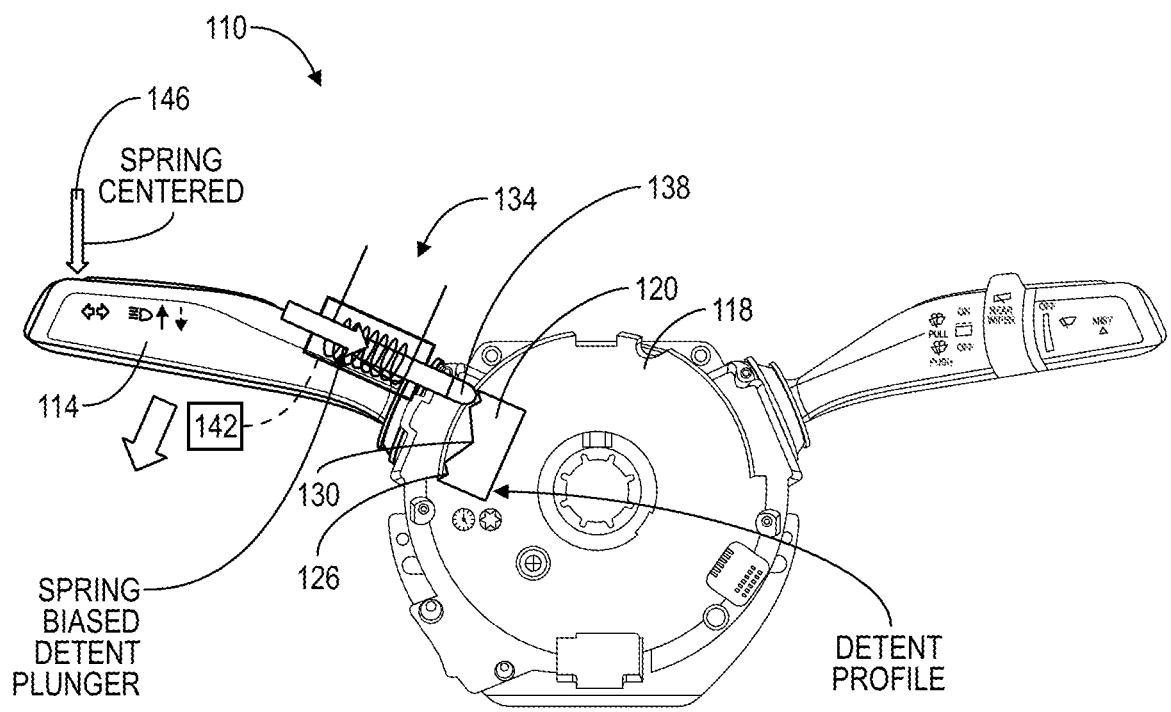

With reference to FIGS. 2A and 2B, a turn signal device 110 according to one embodiment includes a stalk 114 that is pivotally coupled to a steering column 118, and is movable between an original starting position, a right turn position, and a left turn position. The steering column 18 includes a detent profile 120 (e.g., block) mounted therein having a first detent 122 (e.g., indented or recessed region) corresponding to the right turn position, a second detent 126 (e.g., indented region) corresponding to the left turn position, and a third detent 130 corresponding to the original starting position (i.e., neutral position). In some embodiments the first detent 122 corresponds instead to the left turn position and the second detent 126 corresponds instead to the right turn position.

The device 110 further includes a solenoid actuator 134 and a linearly-movable core element 138 (e.g., detent plunger) coupled to the actuator 134. The core element 138 is movable toward and/or away from the detent profile 120 (e.g., silently or with little noise). The actuator 134 is mounted on the stalk 114, and is controlled via a controller 142. The core element 138 is naturally biased (e.g., via a spring) toward the detent profile 120, such that when the actuator 142 is actuated, the core element 138 is then pulled back away from the detent structure 120 against the bias.

With continued reference to FIGS. 2A and 2B, the device 110 further includes a centering spring 146 (e.g., leaf spring, coiled spring(s), or other biasing spring-like element) that centers the stalk 114. The centering spring 146 may be coupled to the steering column 118. As illustrated in FIG. 2A, when the stalk 114 is centered, the core element 138 is generally located adjacent to the third detent 130 that is halfway between the first detent 122 and the second detent 126.

During use, a driver manually pivots or otherwise moves the stalk 114 from the original starting position to the right turn position or the left turn position against the biasing force of the centering spring 142. When the stalk 114 reaches the right turn position or the left turn position, the core element 138 (e.g., an end thereof) moves into the first detent 122 or the second detent 126. Movement of the core element 138 into the first or second detent 122, 126 causes a tactile feedback for the driver, similar to the feedback associated with the conventional stalk 14. When the core element 138 is in the first detent 122 or the second detent 126, the stalk 114 is held stationary, and is inhibited or prevented from returning back to the original starting position via the pressure of the core element 138 pressing into the detent profile 120.

Once the vehicle has completed a turning operation, the controller 142 actuates the solenoid actuator 134, causing the core element 138 to pull out of the first or second detent 122, 126 and away from the detent profile 120. The centering spring 146 then automatically moves the stalk 114 back to the original starting position. In some embodiments, the controller 142 includes or is coupled to one or more sensors (not illustrated) on the vehicle that determine (e.g., via angling of tires, steering wheel, axle, etc.) whether the vehicle has completed a turn, and thus whether the solenoid actuator 134 should be activated to return the stalk 114 to its original starting position.

Figure 3:
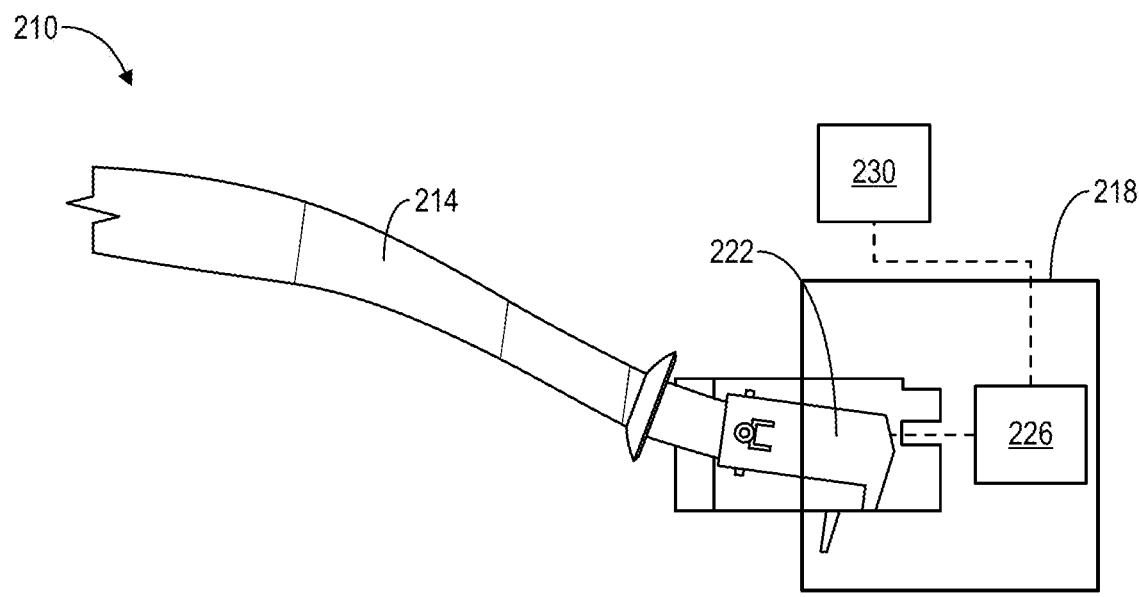

With reference to FIG. 3, a turn signal device 210 according to another embodiment includes a stalk 214 that is pivotally coupled to a steering column 218, and is movable between an original starting position, a right turn position, and a left turn position. The stalk 214 is identical to that of the conventional stalk 14 described above. The turn signal device 210 further includes release pawl 222 that is identical to the release pawl 22 described above. The turn signal device 210 further includes a solenoid 226. The solenoid 226 may be located in the steering column 218, and may be controlled via a controller 230. When activated by the controller 230, the solenoid 226 (e.g., a core element thereof) moves the release pawl 226 back, which in turn moves the stalk 214 back to its original starting position (FIG. 1A).

Figure 4:
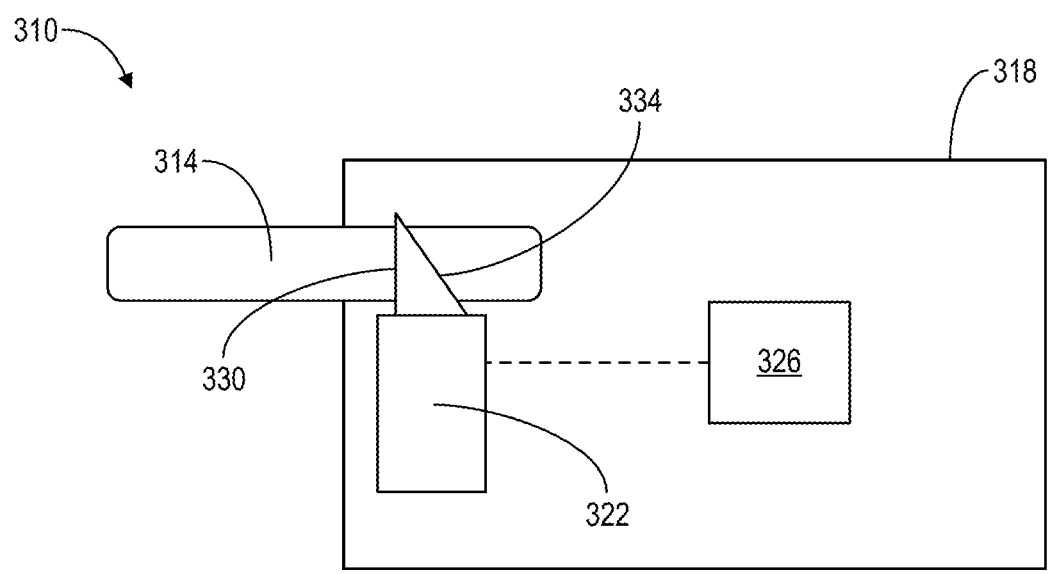

With reference to FIG. 4, a turn signal device 310 according to another embodiment includes a stalk 314 that is pivotally coupled to a steering column 318, and is movable between an original starting position, a right turn position, and a left turn position. The device 310 further includes a solenoid 322. The solenoid 322 may be located in the steering column 318, and may be controlled via a controller 326. The solenoid 322 includes a core element 330 that includes a cam surface 334. When activated by the controller 326, the cam surface 334 presses directly against one or more surfaces of the stalk 314 to move the stalk back to its original starting position.

Figure 5:
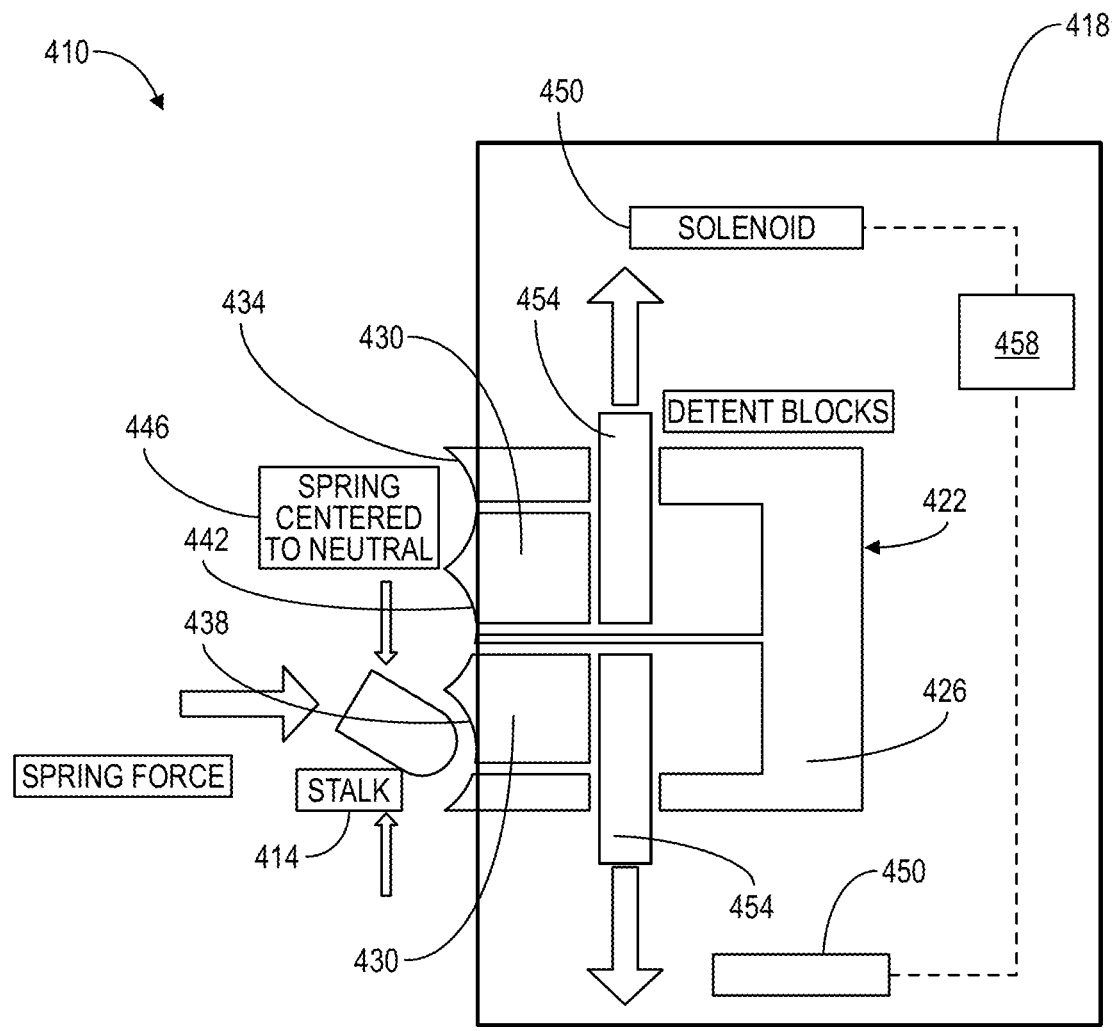

With reference to FIG. 5, a turn signal device 410 according to another embodiment includes a stalk 414 that is pivotally coupled to a steering column 418, and is movable between an original starting position, a right turn position, and a left turn position. The device 410 further includes a detent assembly 422 having a detent housing 426 and detent ramps 430 disposed within and movable linearly relative to the detent housing 426. The detent assembly 422, or a portion thereof, may be disposed in the steering column 418. In the illustrated embodiment two detent ramps 430 are provided. The two detent ramps 430, in conjunction with the detent housing 426, define a first detent 434 (e.g., recessed region) corresponding to the right or left turn position, a second detent 438 corresponding to the left or right turn position, and a third, neutral detent 442 corresponding to the original starting position.

The device 410 further includes a centering spring 446 (e.g., leaf spring, coiled spring(s), or other spring-like biasing element) that naturally biases and centers the stalk 414 back toward the original starting position, as well as two solenoid actuators 450 that are each coupled to a respective detent block 454. Each solenoid actuator 450 is coupled to a controller 458. In the illustrated embodiment a single controller 458 is provided to control both solenoid actuators 450, although in other embodiments each solenoid actuator 450 may be coupled to its own separate controller 458.

In use, when the driver wishes to turn the vehicle right or left, the user moves the stalk 414 so that a spring-biased detent plunger of the stalk 414 moves across the detent ramps 430 until the plunger engages into the first detent 434 or the second detent 438. In a manual use, for example, the detent ramps 430 are held stationary, and the plunger is manually moved to the different detent positions. In some embodiments the detent ramps 430 themselves are biased away from the detent housing 426 (i.e., to the left in FIG. 5) via springs. In an automatic use, the solenoid actuator 450 may be activated to move the detent blocks 454 relative to the detent housing 426 (e.g., into or away from). In some embodiments the detent blocks 454 may already be naturally biased to move into the detent housing 426 (e.g., with springs), thereby preventing movement of the detent ramps 430 to the right, and locking the stalk 414 in position. Once the vehicle turn has been completed, the controller 458 may activate the solenoid actuators 450 for example to pull the detent blocks 454 out away from the detent housing 426, allowing the detent ramps 430 to move and the centering spring 446 to return the stalk 414 to the original starting position (i.e., the plunger may be moved back to the third detent 442 via just the centering spring 446). As with all other embodiments described herein, the controller 458 may receive one or more signals from a sensor or sensors in the vehicle, indicating that the turn has been completed, prior to activating the solenoid actuators 450.

Electric Motors

Figure 6A:
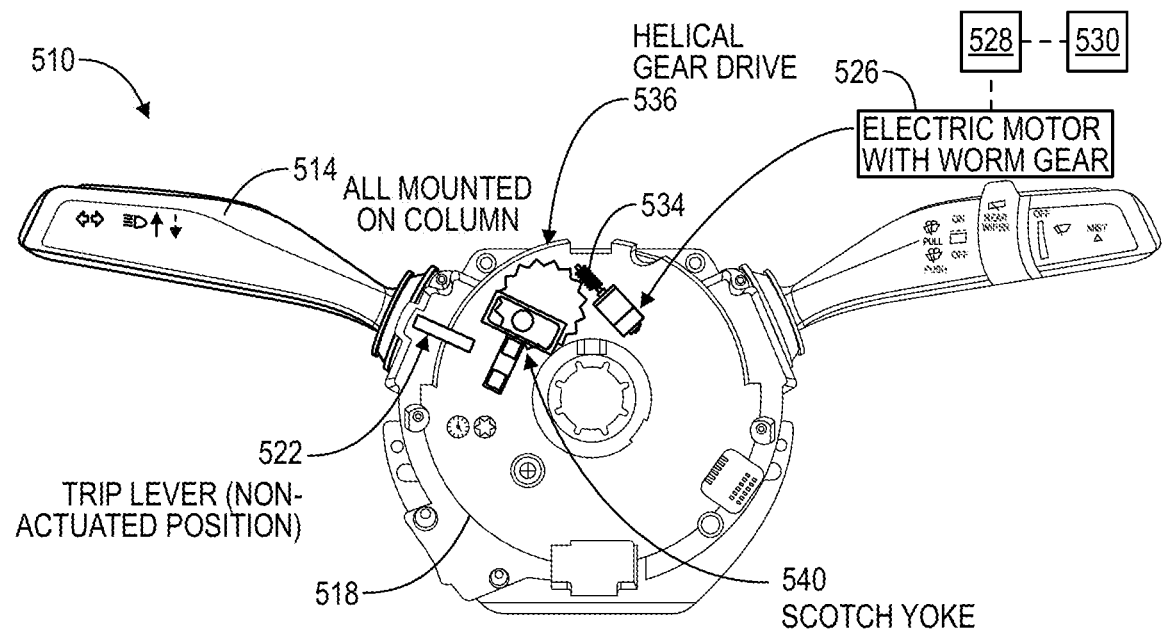
FIGS. 6-9 are schematic views of turn signal devices according to various embodiments, each incorporating an electric motor.
Figure 6B:
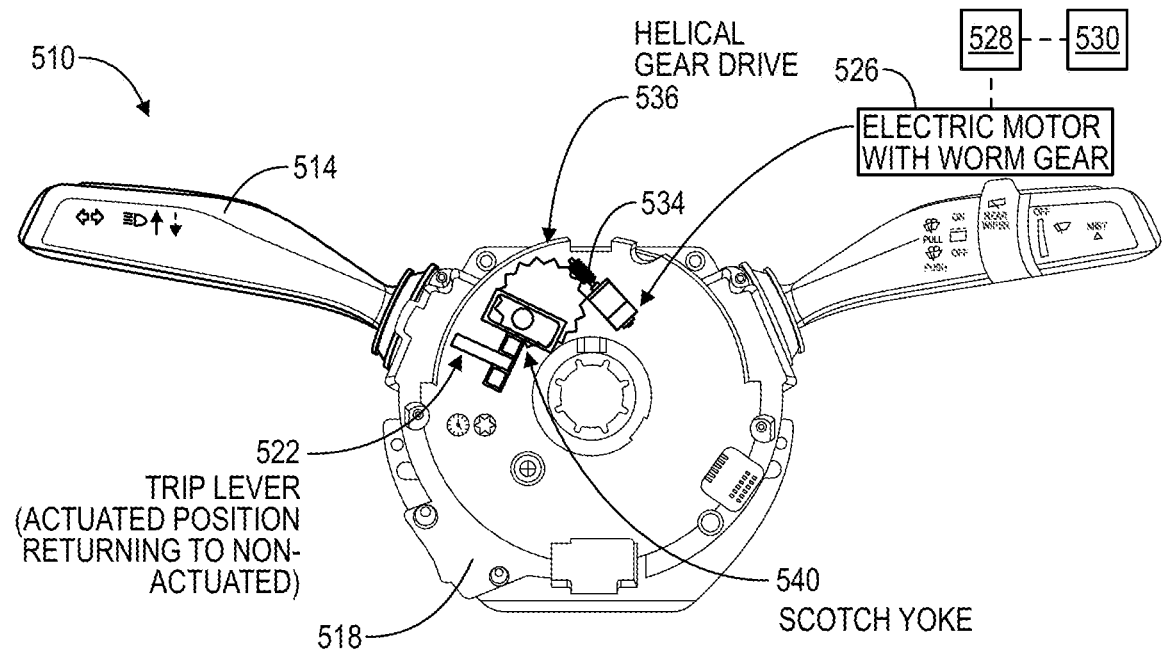
Figure 6C:
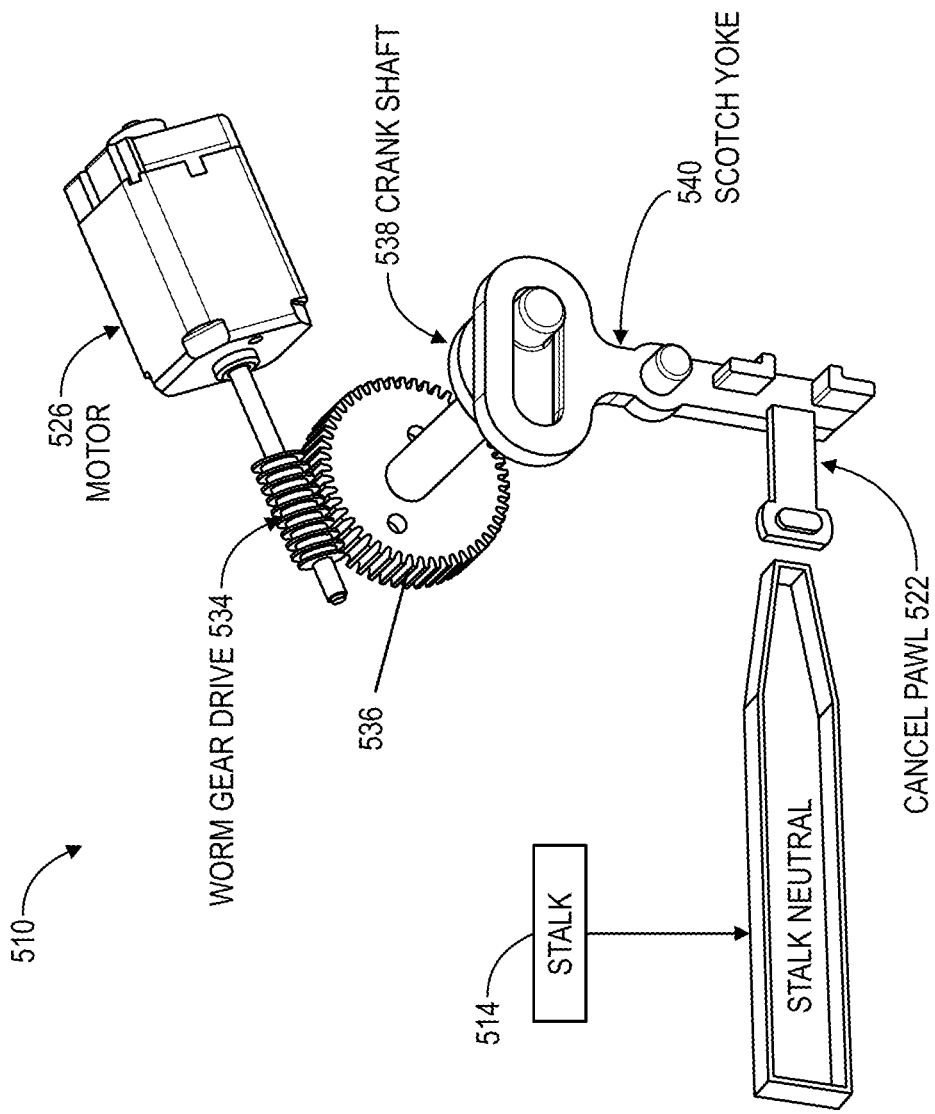

With reference to FIGS. 6A-6C, a turn signal device 510 according to another embodiment includes a stalk 514 that is pivotally coupled to a steering column 518, and is movable between an original starting position, a right turn position, and a left turn position. The stalk 514 is identical to that of the conventional stalk 14 described above. The turn signal device 510 further includes a release pawl 522 (trip lever) that is identical to the release pawl 22 described above, and an electric motor 526. The electric motor 526 may be located in the steering column 518, and may be controlled via a controller 528. The controller 528 may receive signals, for example, from a sensor 530 (e.g., steering angle sensor, lane change sensor, etc.), similar to all other embodiments described herein. The signals indicate whether a turn has been completed. In the illustrated embodiment the electric motor 526 includes a worm gear 534. The worm gear 534 drives a helical gear 536 (which may include a crank shaft 538 as seen in FIGS. 6C-6O). The worm gear 534 and the helical gear 536 may produce low sound levels. A Scotch yoke 540 is coupled to the helical gear 536. The Scotch yoke 540, during its linear stroke, catches the release pawl 522 and forces it to retract, causing the stalk 514 to return to the original starting position. Other embodiments include different types of motors and gears (e.g., spur gear, etc.). In some embodiments, a low revolution per minute (RPM) motor 526 is used, or a motor where a precise number of revolutions from start to stop is known. In some embodiments, the motor 526 may be overridden at any time.

FIGS. 6D-6O illustrate further details of the turn signal device 510, showing how the components may operate during specific periods of use.

Figure 6D:
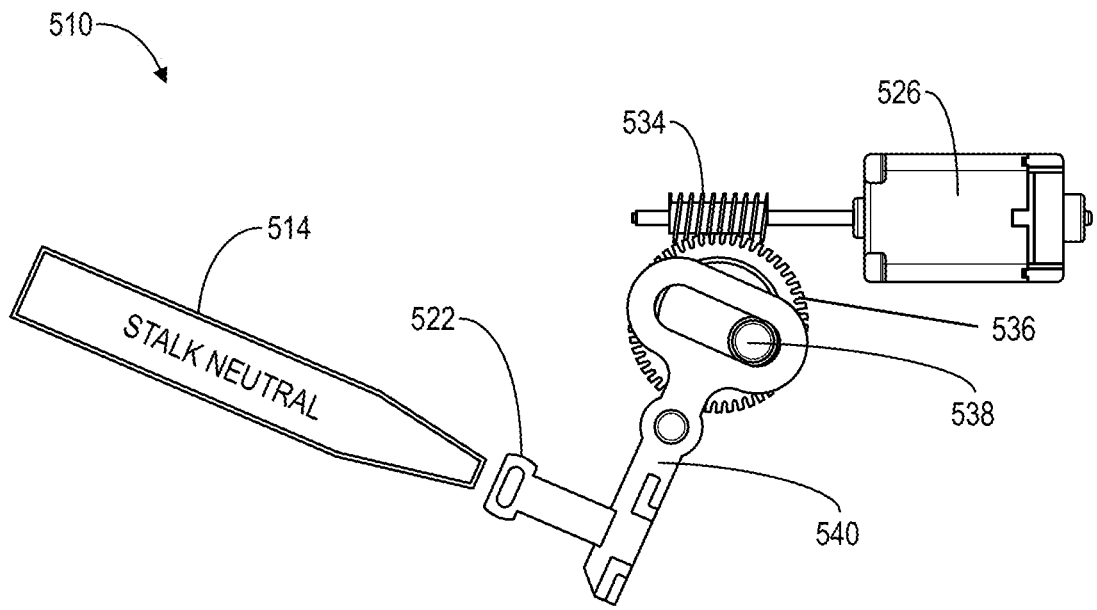
Figure 6E:
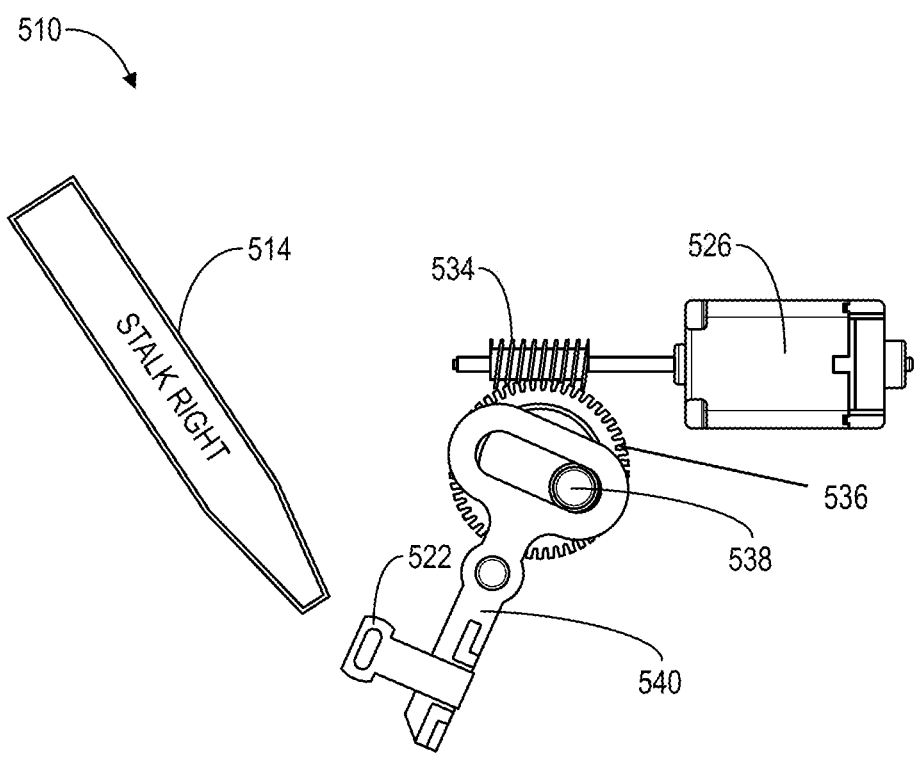
Figure 6F:
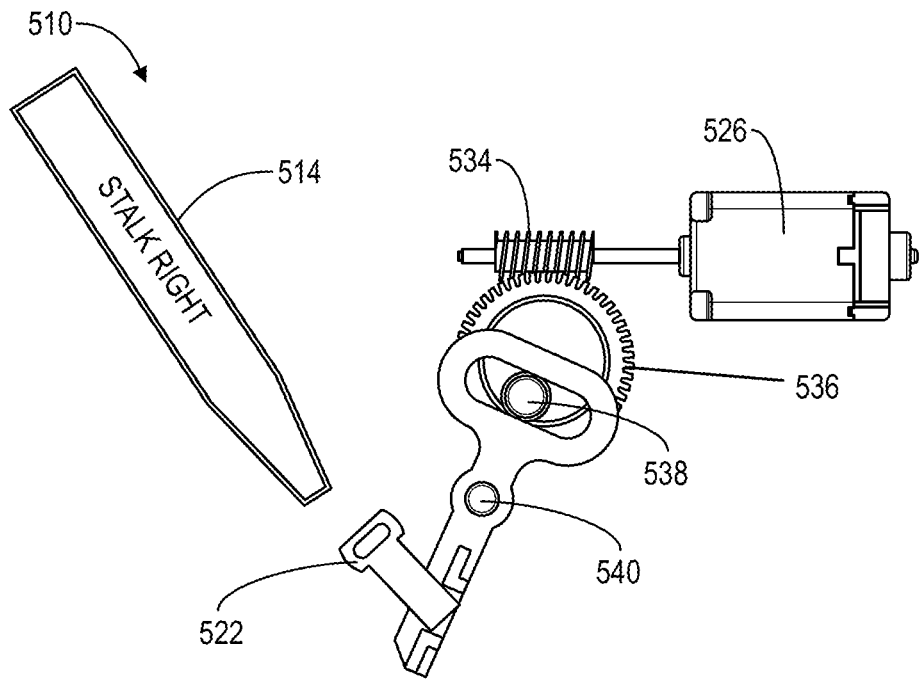
Figure 6G:
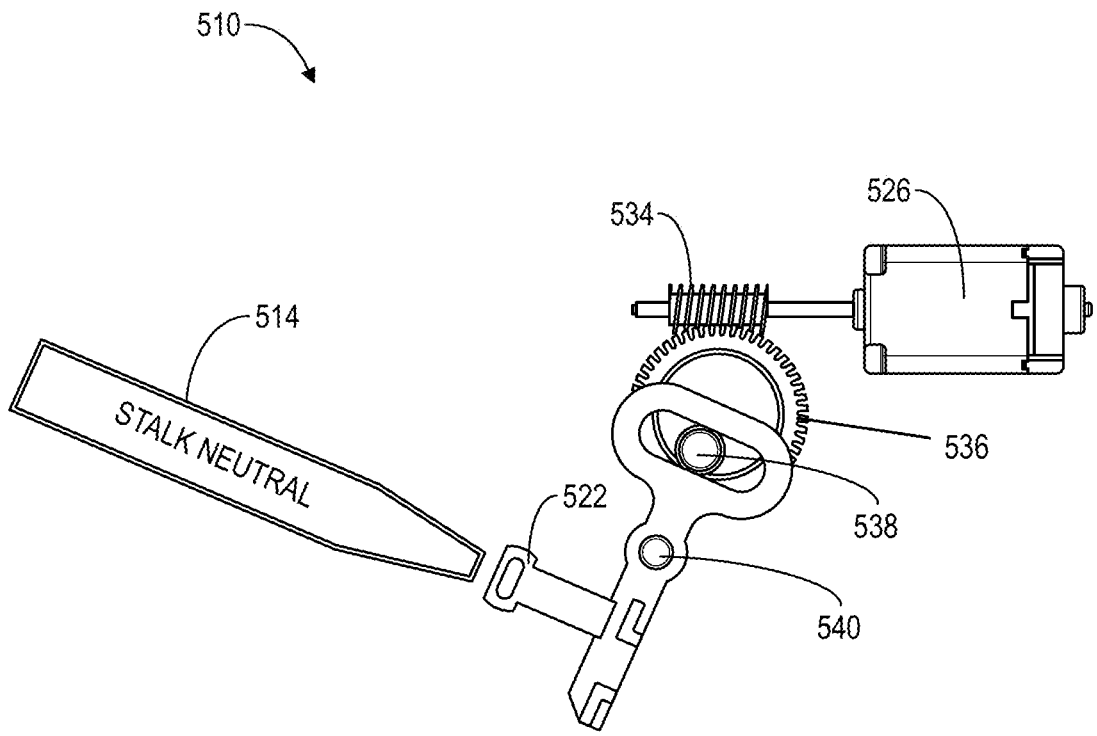

For example, FIG. 6D illustrates an example of the turn signal device 510 in a first initial position. With reference to FIG. 6E, in this initial position the stalk 514 may be shifted to the right turn position, silently fully extending the pawl 522 and switching on power to the turn signal lights. With reference to FIG. 6F, when the cancellation signal is sent to the motor 526 (e.g., via the controller 528 based on detection by the sensor 530), the shaft of the motor 526 rotates 10 revolutions (90 degrees of crankshaft rotation), moving the pawl 522 to a cancel position. With reference to FIG. 6G, the stalk 514 then snaps to a neutral position, retracting the pawl 522 and cutting power to the turn signal lights and the motor 526.

Figure 6H:
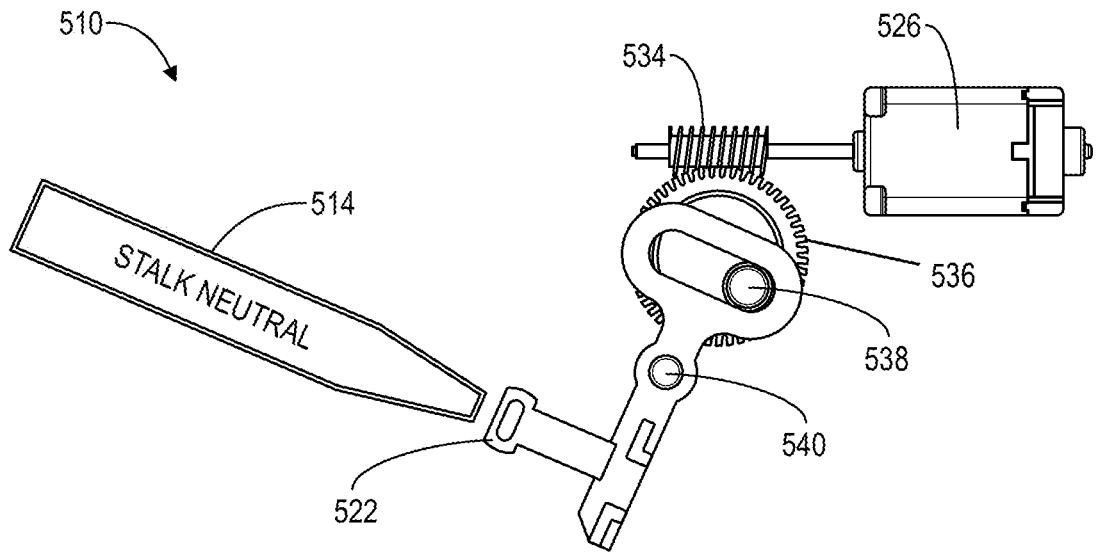
Figure 6I:
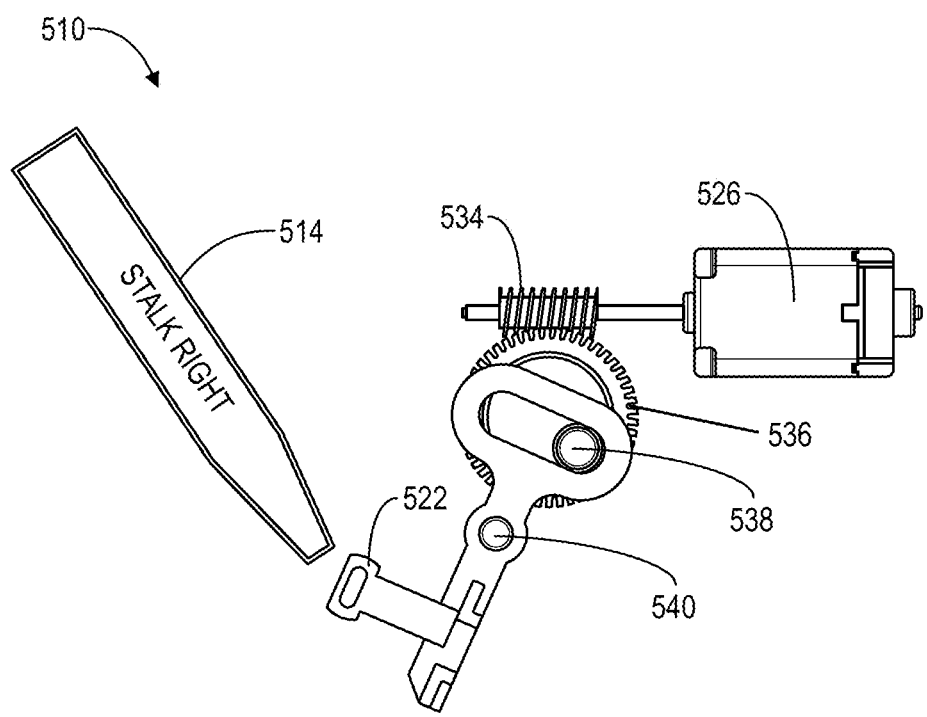
Figure 6J:
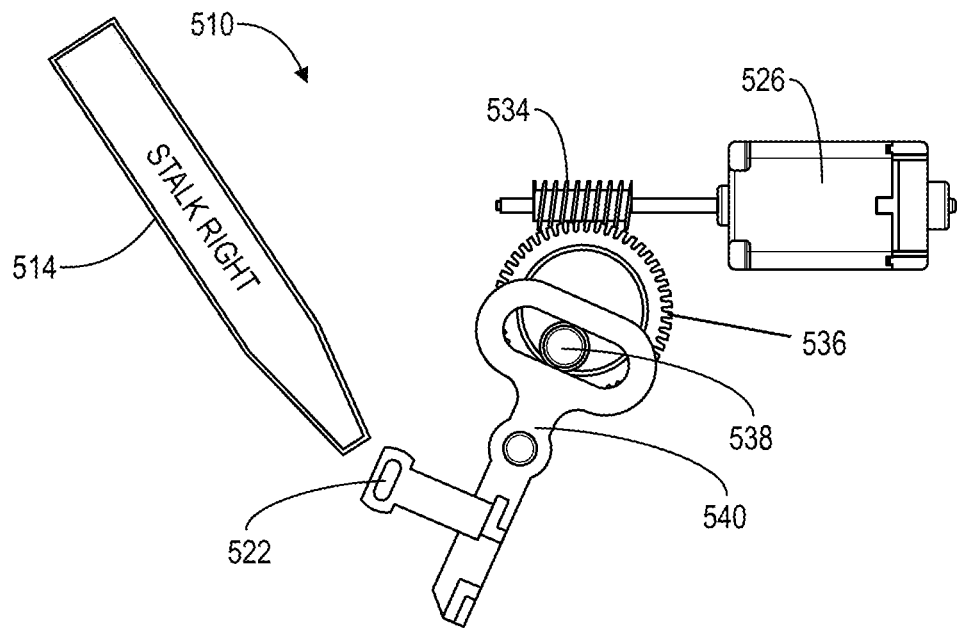
Figure 6K:
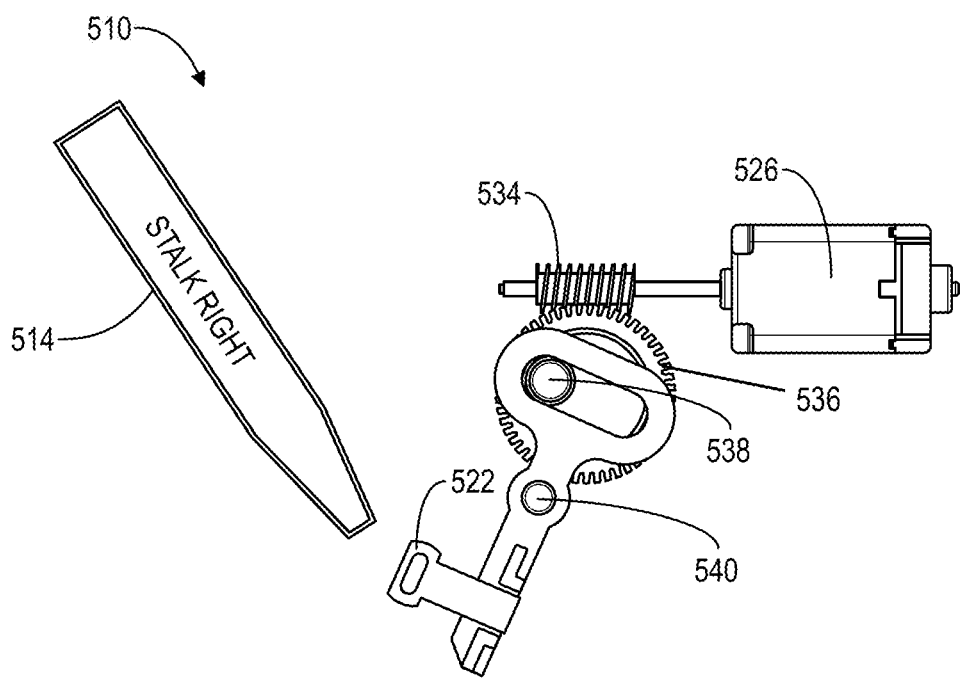
Figure 6L:
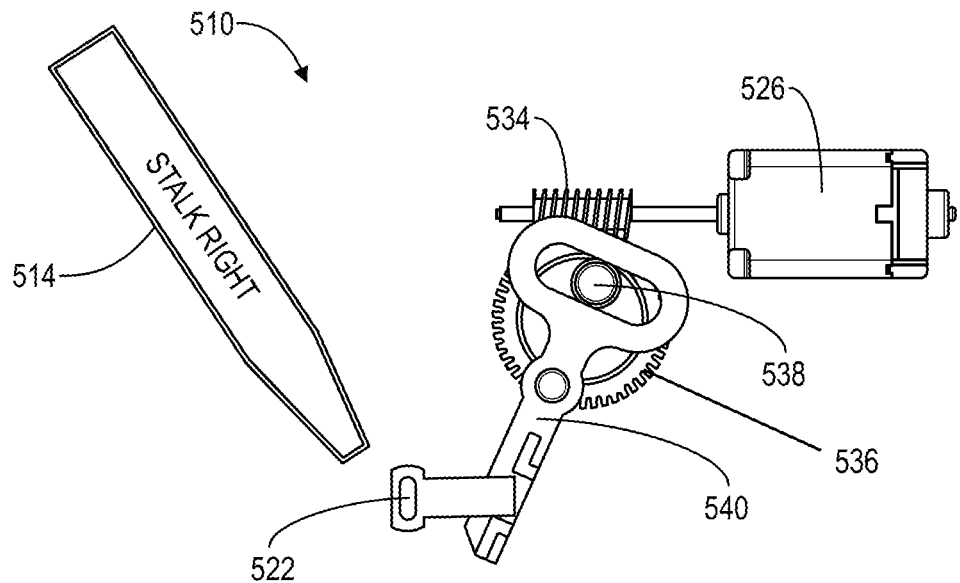
Figure 6M:
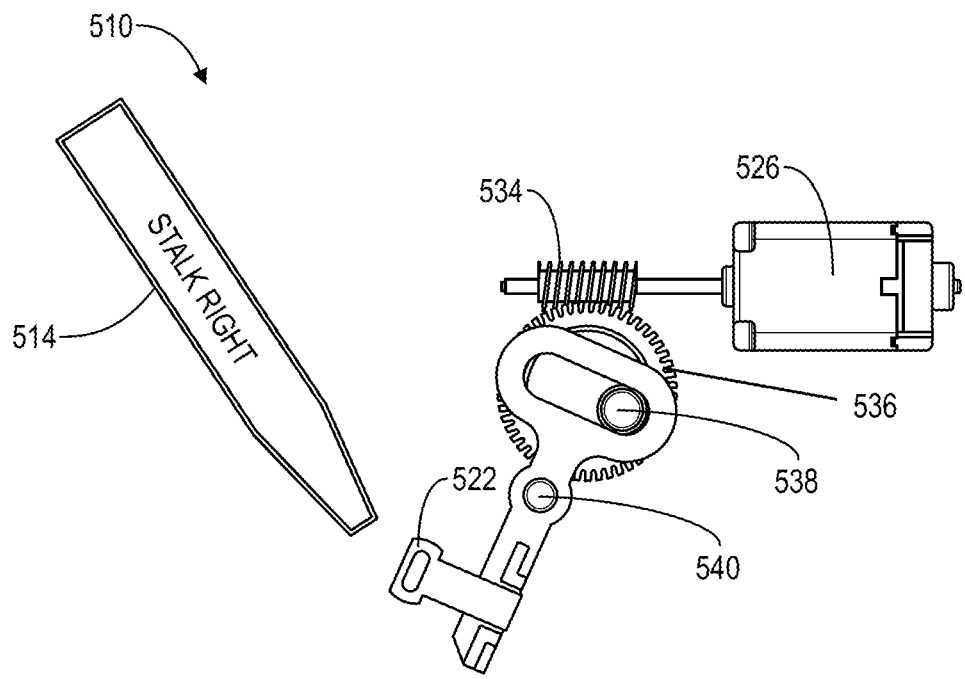
Figure 6N:
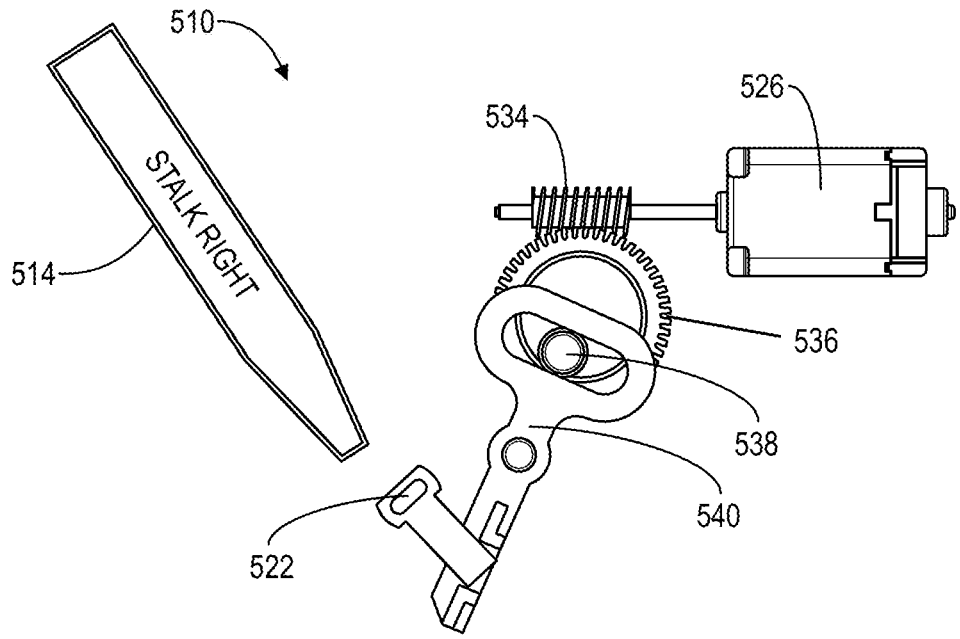
Figure 6O:
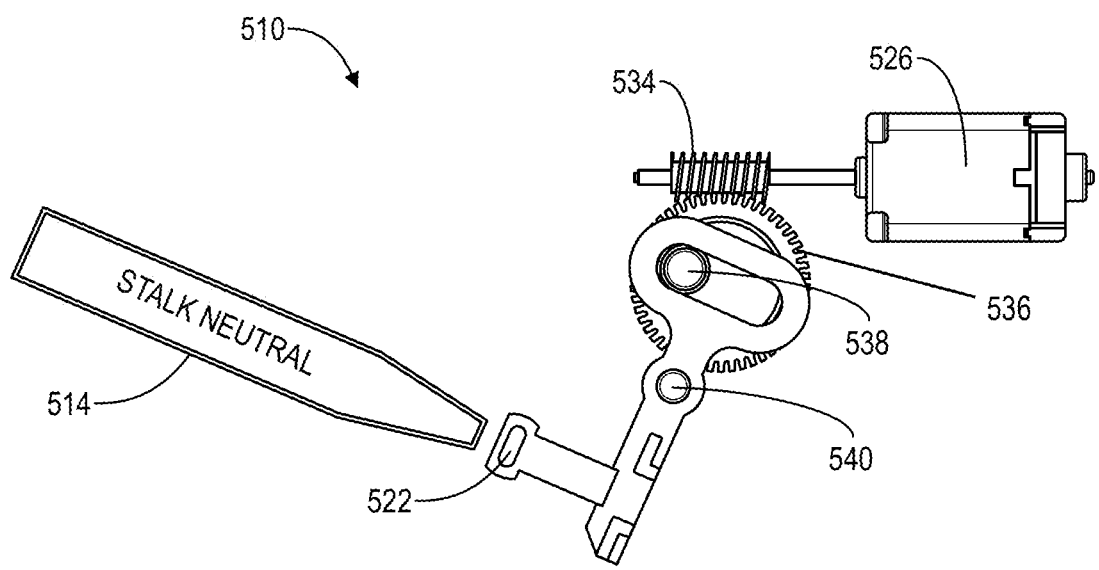

FIG. 6H illustrates an example of the turn signal device 510 in a different initial position. With reference to FIG. 6I, in this initial position the stalk 514 is shifted to the right turn position, partially extending the pawl 522 and switching on power to the turn signal lights. With reference to FIG. 6J, when the cancellation signal is sent to the motor 526 (e.g., via the controller 528 based on detection by the sensor 530), the shaft of the motor 526 rotates. FIG. 6J illustrates a position of the Scotch yoke 540 after 9 motor shaft revolutions. As can be seen in FIG. 6J, the cancel pawl 522 is still blocked from fully extending. With reference to FIG. 6K, after the motor shaft has rotated 19 revolutions the pawl 522 is then able to snap into the fully extended position. With reference to FIG. 6L, once the motor shaft of the motor 526 has rotated 29 motor shaft revolutions the pawl 522 is moved into a "by pass" position. With reference to FIG. 6M, once the motor shaft of the motor 526 has rotated 39 revolutions, the pawl remains in the fully extended position. With reference to FIG. 6N, once the motor shaft of the motor 526 has rotated 49 revolutions, the pawl 522 is then placed into the cancel position. With reference to FIG. 6O, the stalk 514 then snaps to the neutral position, retracting the pawl 522 and cutting power to the turn signal lights and motor 526.

FIGS. 6D-6O are merely representative. Thus, the turn signal device 510 may be operated from other initial positions other than those illustrated. Additionally, the number of revolutions of the motor 526 needed to cause movement of the pawl 522 may vary from the numbers described above.

Figure 7:
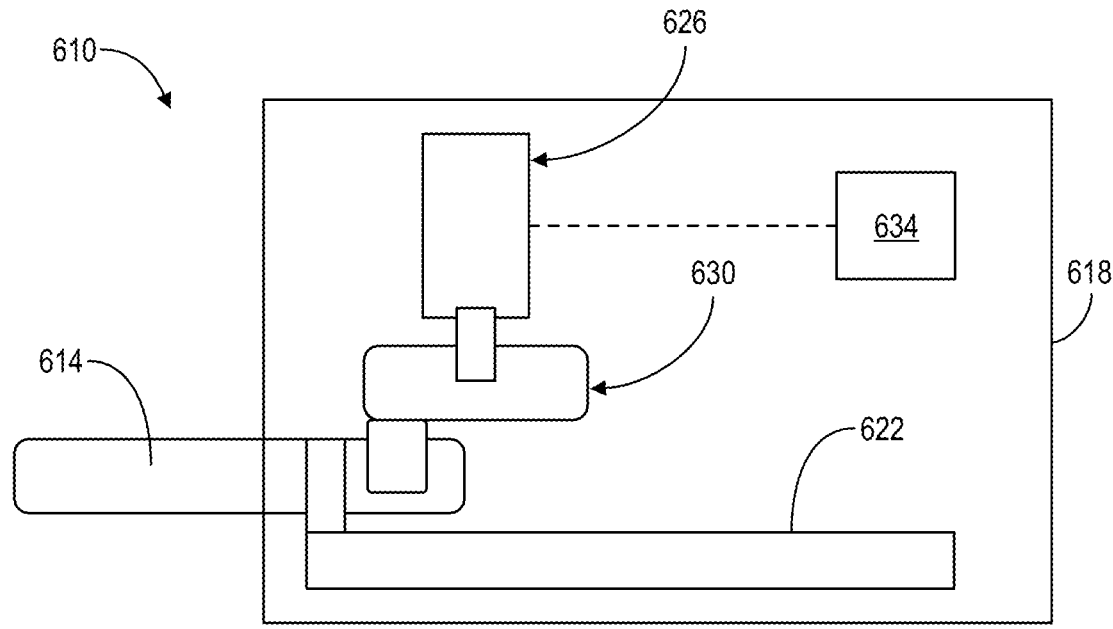

With reference to FIG. 7, a turn signal device 610 according to another embodiment includes a stalk 614 that is pivotally coupled to a steering column 618, and is movable between an original starting position, a right turn position, and a left turn position. As illustrated in FIG. 7, the device 610 may include a return pawl 622 that is coupled to the stalk 614, and is similar or identical to the return pawl 22 described above. Additionally, however, the device 610 includes an electric motor 626 that is coupled to a secondary pawl gear 630. The secondary pawl gear 630 meshes for example with an area (e.g., catch) along the stalk 614. The device 610 further includes a controller 634 that is coupled to the electric motor 626. Rather than utilizing the return pawl 622 (e.g., in conjunction with rotation of a steering wheel such as in the conventional device 10), the electric motor 626 and the secondary pawl gear 630 instead directly move the stalk 614 back to the original starting position, once activated by the controller 634.

Figure 8:
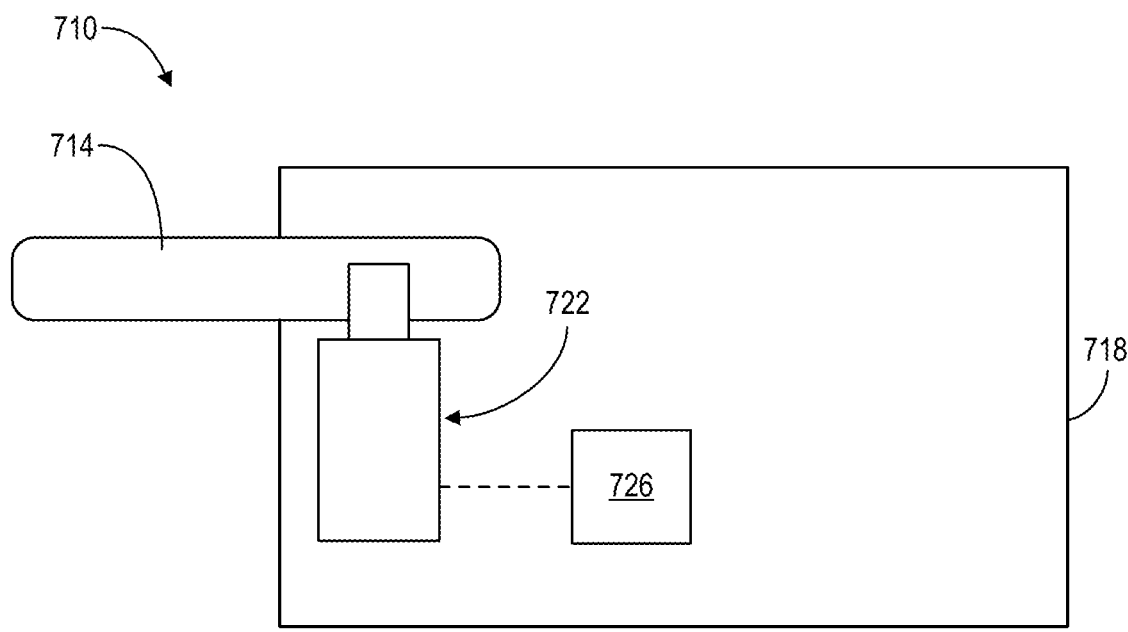

With reference to FIG. 8, a turn signal device 710 according to another embodiment includes a stalk 714 that is pivotally coupled to a steering column 718, and is movable between an original starting position, a right turn position, and a left turn position. In contrast to the turn signal device 610, the turn signal device 710 includes an electric motor 722 that is coupled directly to the stalk 714 at a pivot point of the stalk 714. The electric motor 722 is coupled to a controller 726. The electric motor 722 rotates the stalk 714 back to the original starting position, once activated by the controller 726.

Figure 9:
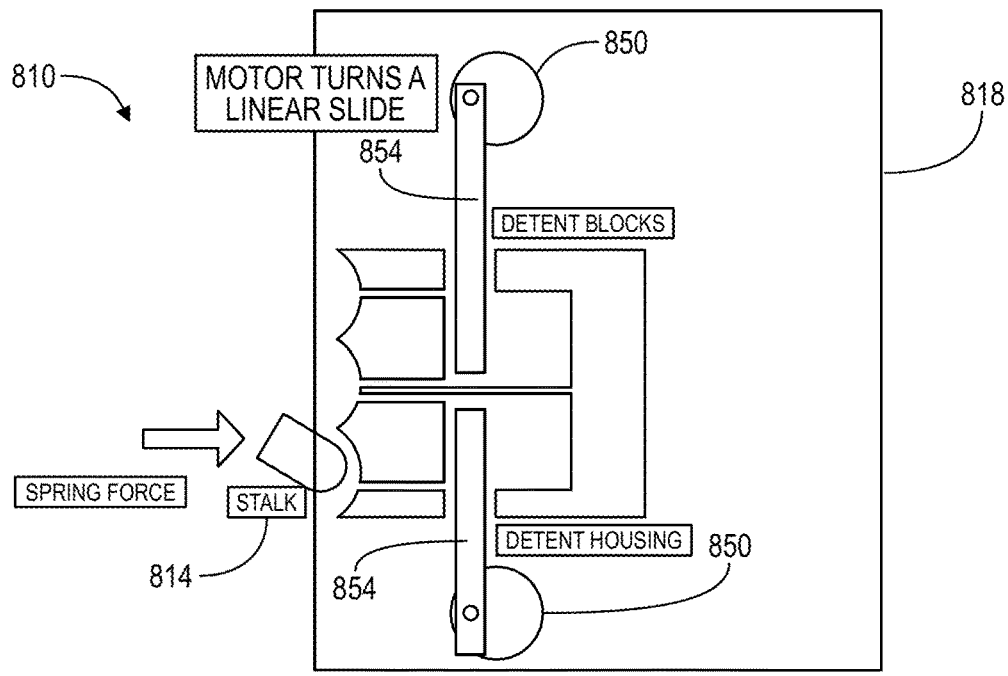

With reference to FIG. 9, a turn signal device 810 according to another embodiment includes a stalk 814 that is pivotally coupled to a steering column 818, and is movable between an original starting position, a right turn position, and a left turn position. The turn signal device 810 is similar to the turn signal device 410. The only difference between the two devices is that the solenoids 450 of device 410 are replaced by electric motors 850. Additionally, as illustrated in FIG. 9, detent blocks 854 may be pivotally coupled to the electric motors 850, such that the electric motors 850 rotate and cause sliding vertical movement of the detent blocks 854.

As described above, the initiation of the turn signal cancellation may be triggered by a sensor detecting that a turn or lane change has been completed. In yet other embodiments, the initiation may be triggered by a time out motor. Additionally, and in particular for one or more of the embodiments described herein for the motors, the motors (e.g., motor shafts of the motors) may operate or rotate in a single direction at all times (e.g., clockwise, or counter-clockwise) to return the stalk to the neutral position, regardless of whether the stalk is in the right turn position or the left turn position. When the stalk has been returned to the neutral position, power to the turn signal lights and the motor is cut (e.g., via the controller). The motor then coasts to a random stop. In this embodiment the motor does not require rotation resolvers, hard stops, or control circuit logic. When the turn signal cancellation signal is initiated, the effects of ambient temperature variations, vehicle age, voltage variations, etc. are mitigated as the motor will run until the required number of revolutions for cancellation is reached. In yet other embodiments, the motors may be configured to reverse direction at one or more times, for example to move the yoke or move the stalk in a reverse direction as needed, depending on whether the stalk is in the right turn position or the left turn position. In yet other embodiments after completing turn signal cancellation, the motor may be run in the reverse direction to position it more ideally for the next cancellation command employing a ratchet like hard stop for the precise positioning. In some embodiments, as a load increases on the motor, the torque also increases. Thus, the motors may provide a robust solution for controlling movement of the release pawl and/or stalk.

Permanent Magnets

Figure 10A:
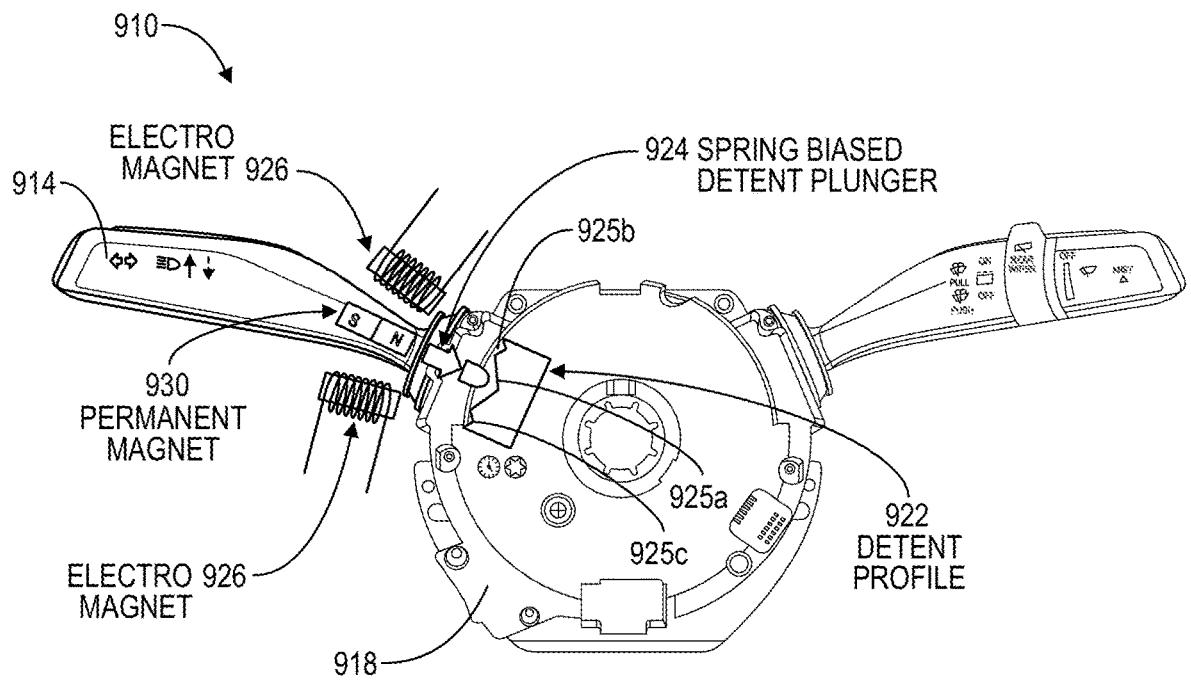
FIGS. 10-18 are schematic views of turn signal devices according to various embodiments, each incorporating a permanent magnet.
Figure 10B:
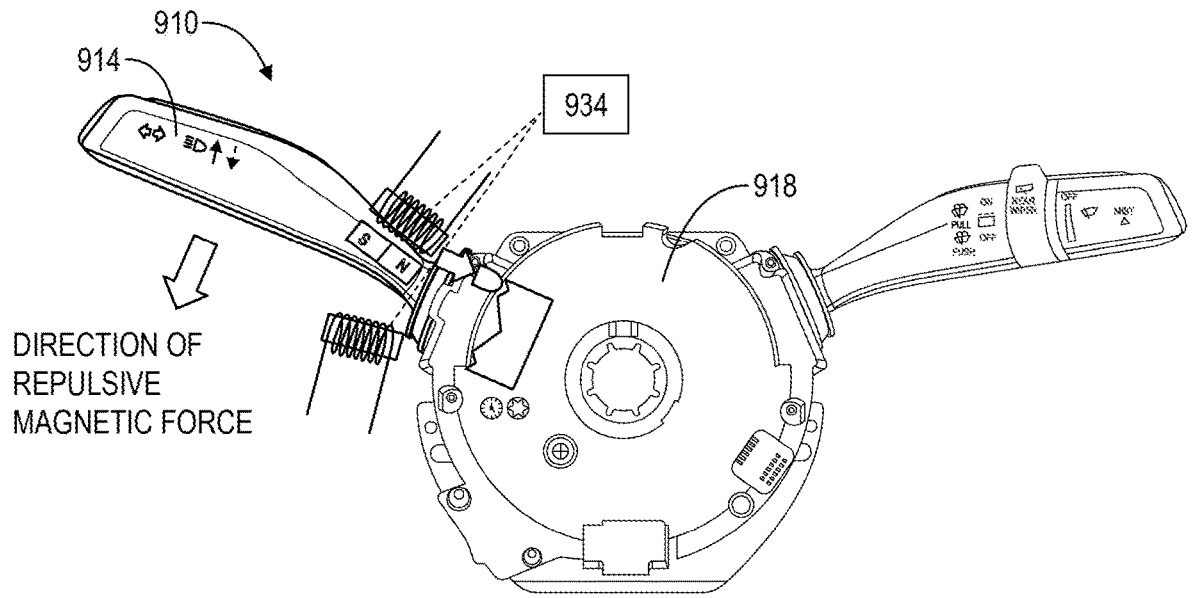

With reference to FIGS. 10A and 10B, a turn signal device 910 according to another embodiment includes a stalk 914 that is pivotally coupled to a steering column 918, and is movable between an original starting position, a right turn position, and a left turn position. The device 910 includes a detent profile 922, similar to the detent profile 120 above, that engages with a spring-biased detent plunger 924 of the stalk 914. When the stalk 914 is in a neutral position, the plunger 924 engages in a first, central notch 925a of the detent profile 922 and is held in place. When the stalk 914 is in a right turn position, the plunger 924 engages in a second, upper notch 925b of the detent profile 922 and is held in place. When the stalk 914 is in a left turn position, the plunger 924 engages in a third, lower notch 925c of the detent profile 922, and his held in place. The device 910 further includes a dual set of electro-magnets 926 that are mounted for example to the steering column 918, and a single permanent magnet 930 that is mounted to the stalk 914. The electro-magnets 926 may each be coupled to a controller 934. In some embodiments one or more of the magnets 926, 930 are programmed, or correlated, magnets that are programmed or otherwise arranged to interact only with other magnetic structures (e.g., one of the other magnets 926, 930).

As illustrated in FIG. 10B, the electro-magnets 926 may be activated (i.e., current sent there through) when the stalk 914 is in the right turn position or the left turn position and it is desired to return the stalk 914 back to the original starting position (e.g., when a vehicle turn has completed). The electro-magnets 926 may be activated by the controller 934. When the electro-magnets 926 are activated, the repulsive magnetic force of the activated electro-magnets 926 (see arrow referencing the direction of the repulsive magnetic force) acts on the stalk 914 (i.e., on the permanent magnet 930) and pushes the stalk 914 back to its original starting position (i.e., the neutral position), such that the plunger 924 engages back into the first, central notch 925a. Once in the original starting position the current running through the electromagnets 926 may be turned off.

Figure 11:
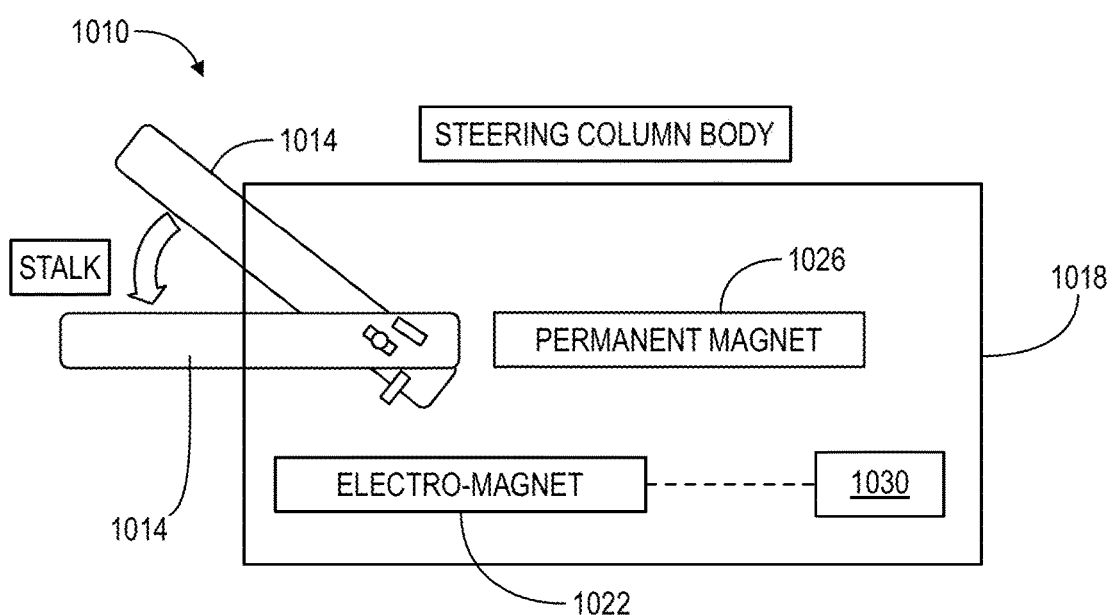

With reference to FIG. 11, a turn signal device 1010 according to another embodiment includes a stalk 1014 that is pivotally coupled to a steering column 1018, and is movable between an original starting position, a right turn position, and a left turn position. The stalk 1014 may be identical to that of the conventional stalk 14 described above. The turn signal device 1010, however, further includes an electro-magnet 1022 coupled to the stalk 1014 (e.g., to an end of the stalk 1014), and a permanent magnet 1026 coupled (e.g., fixedly mounted) to the steering column 1018. The electro-magnet 1022 is coupled to a controller 1030. When the controller 1030 activates the electro-magnet 1022 (e.g., directs current there through), the electro-magnet 1022 develops a magnetic field that repels or attracts the magnetic field of the permanent magnet 1026, thereby forcing a desired rotation of the stalk 1014 (e.g., from the right turn position to the original starting position or from the left turn position to the original starting position). In some embodiments the device 1010 includes one or more sensors (e.g., in communication with the controller 1030) that detect a position of the stalk 1014 to determine whether the stalk 1014 is in the original starting position. Additionally, in some embodiments the magnets 1022, 1026 may be used to create tactile feedback to the driver as the stalk 1014 is moved between the original starting position to the right or left turn positions (i.e., creating resistance, or the feel of a detent, as the stalk 1014 is moved).

Figure 12:
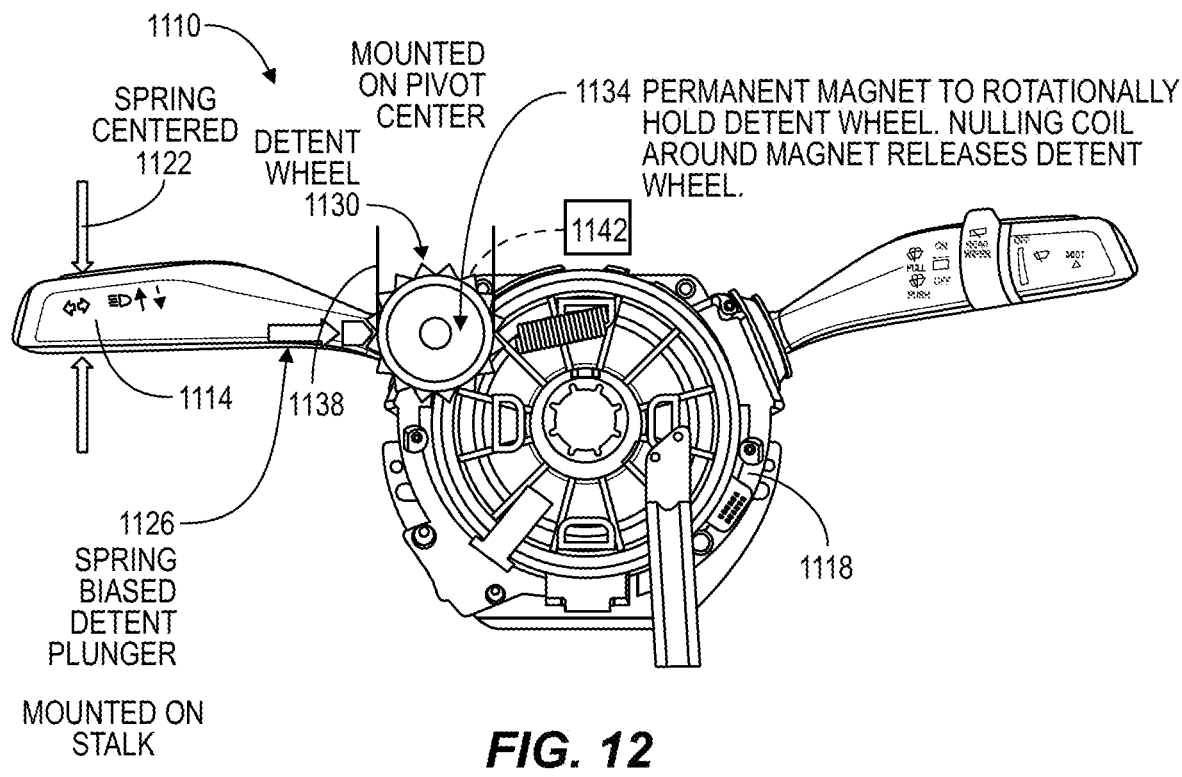

With reference to FIG. 12, a turn signal device 1110 according to another embodiment includes a stalk 1114 that is pivotally coupled to a steering column 1118, and is movable between an original starting position, a right turn position, and a left turn position. The device 1110 includes a centering spring 1122, similar to the centering springs described herein, that automatically centers the stalk 1114 and naturally returns the stalk 1114 to the original starting position. The device 1110 further includes a spring-biased detent plunger 1126, mounted on the stalk 1114, that is biased to move toward a detent wheel 1130. The device 1110 further includes a permanent magnet 1134 (e.g., within the detent wheel 1130) that rotationally holds the detent wheel 1130. The device 1110 further includes a nulling coil 1138 wrapped around the permanent magnet 1134 that releases the detent wheel 1130. The nulling coil 1138 is coupled to a controller 1142.

During use, the detent plunger 1126 is naturally biased into engagement with a notch in the detent wheel 1130, and the permanent magnet 1134 prevents rotation of the detent wheel 1130. Thus, when the driver wishes to turn right or left, the driver manually pivots the stalk 1114, forcing the detent plunger 1126 to slide up and into a different notch on the detent wheel 1130, and creating a tactile feedback for the driver. When the vehicle has completed its turn, the controller 1142 then activates the nulling coil 1138, which negates the force of the permanent magnet 1134, allowing the detent wheel 1130 to rotate freely. This freedom of rotation allows the centering spring 1122 to automatically pull the stalk 1114 back to the original starting position.

Figure 13:
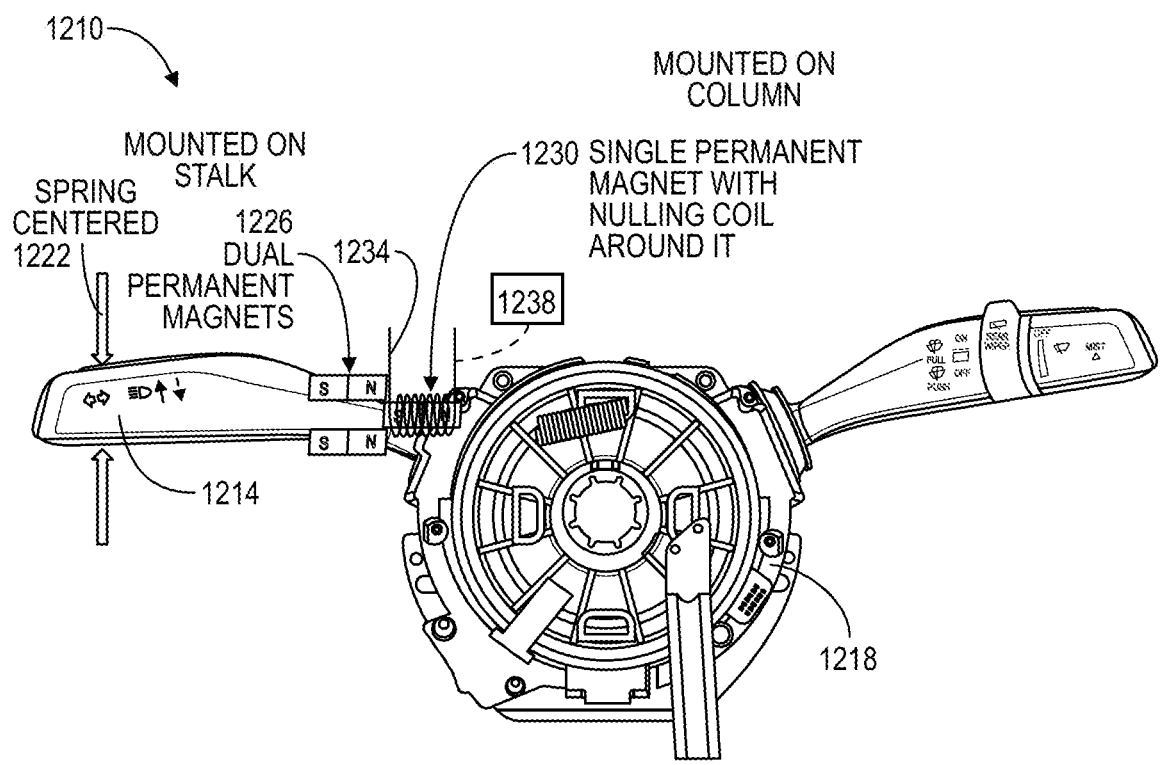

With reference to FIG. 13, a turn signal device 1210 according to another embodiment includes a stalk 1214 that is pivotally coupled to a steering column 1218, and is movable between an original starting position, a right turn position, and a left turn position. The device 1210 includes a centering spring 1222, similar to other centering springs described herein, that automatically centers the stalk 1214 and naturally returns the stalk 1214 to the original starting position. The device 1210 further includes a dual set of permanent magnets 1226 that are mounted on the stalk 1214, and a single permanent magnet 1230 that is mounted to the steering column 1218. In some embodiments one or more of the magnets 1226, 1230 are programmed, or correlated, magnets that are programmed or otherwise arranged to interact only with other magnetic structures (e.g., one of the other magnets 1226, 1230). The device 1210 further includes a nulling coil 1234 wrapped around the single permanent magnet 1230, and a controller 1238 coupled to the nulling coil 1234.

As illustrated in FIG. 13, the polarities of the magnets 1226, 1230 are the same (repelling force). Thus, during use, the magnets 1226, 1230 act as detents (e.g., similar to over-center detents), and also act as a latching mechanism. For example, when the driver moves the stalk 1214 to the right turn position or the left turn position the stalk 1214 will naturally latch in place after either of the dual set of permanent magnets 1226 passes by the single magnet 1230. When the vehicle has completed a turn, the controller 1238 will activate the nulling coil 1234, negating the magnetism of the single permanent magnet 1230. The centering spring 1222 will then automatically return the stalk 1214 to the original starting position.

Figure 14A:
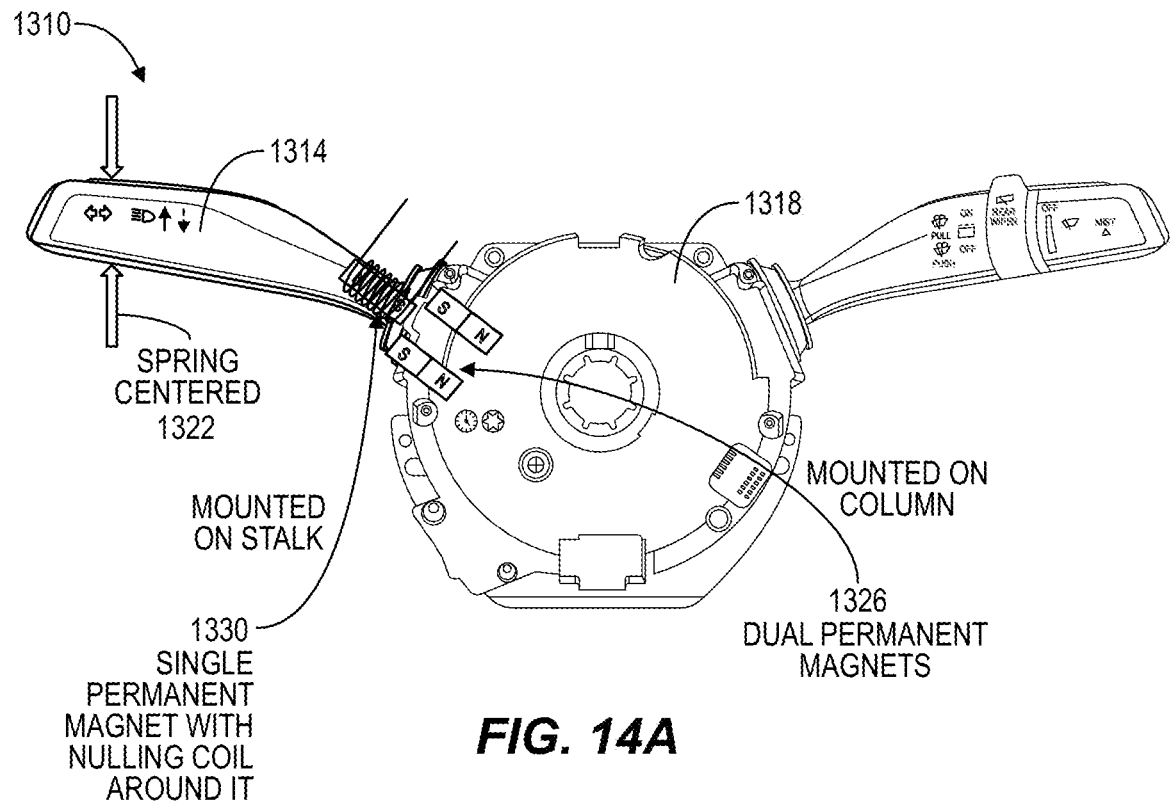
Figure 14B:
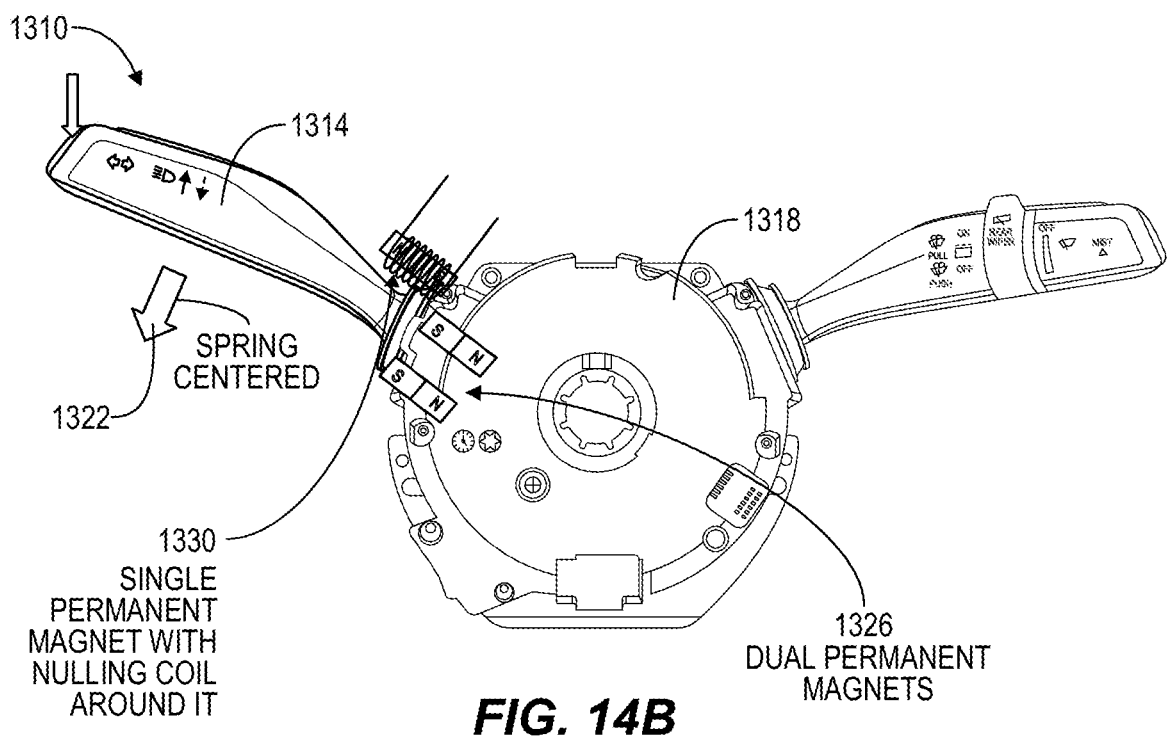

With reference to FIGS. 14A and 14B, a turn signal device 1310 according to another embodiment includes a stalk 1314 that is pivotally coupled to a steering column 1318, and is movable between an original starting position, a right turn position, and a left turn position. A centering spring 1322 is provided. The device 1310 is similar to the device 1210. The only difference between the two devices is that a dual set of permanent magnets 1326 is disposed on the steering column 1318 as opposed to the stalk 1314, and a single permanent magnet 1330 is disposed on the stalk 1318 as opposed to the steering column 1318.

As illustrated in FIGS. 14A and 14B, the polarities of the magnets 1326, 1330 are again the same polarity (repelling force). Thus, during use, the magnets 1326, 1330 act as detents (e.g., similar to over-center detents), and also act as a latching mechanism. For example, when the driver moves the stalk 1314 to the right turn position or the left turn position the stalk 1314 will naturally latch in place after the single permanent magnet 1330 passes either of the dual set of permanent magnets 1326. When the vehicle has completed a turn, the single permanent magnet 1330 will be deactivated. Thus, a centering spring 1322 will then automatically return the stalk 1314 to the original starting position.

Figure 15:
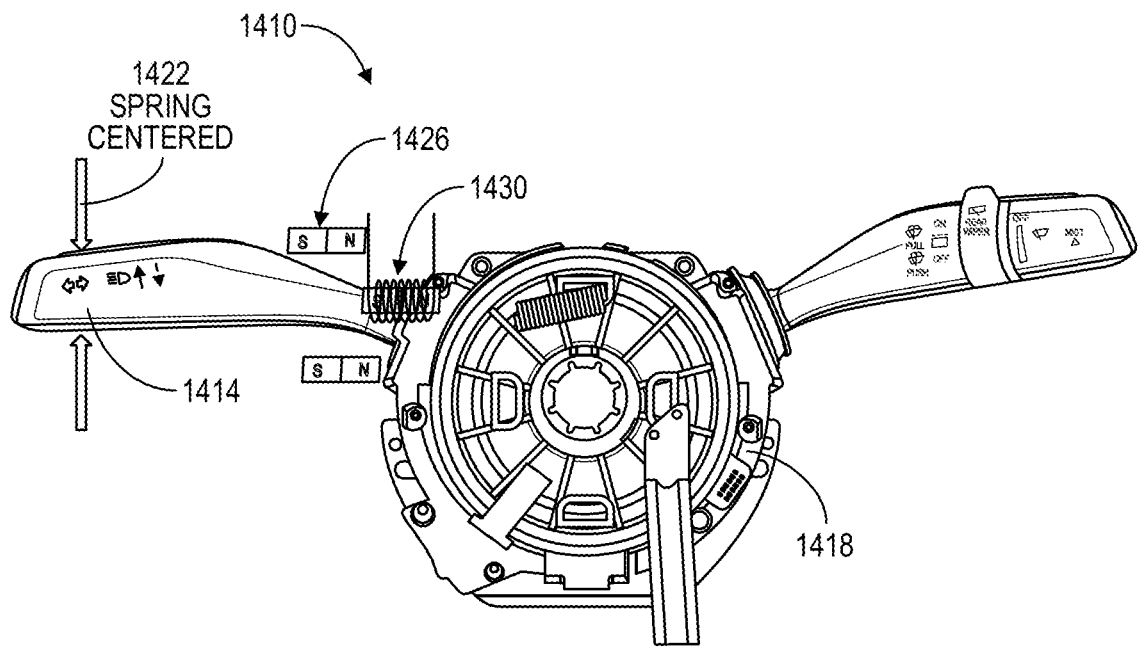

With reference to FIG. 15, a turn signal device 1410 according to another embodiment includes a stalk 1414 that is pivotally coupled to a steering column 1418, and is movable between an original starting position, a right turn position, and a left turn position. The device 1410 is similar to the device 1210. The only difference between the two devices is that the dual set of permanent magnets 1426 and the single permanent magnet 1430 have polarities that are opposite (attractive force). Thus, during use, the magnets 1426, 1430 attract one another and act directly on each other to latch. For example, when the driver moves the stalk 1414 to the right turn position or the left turn position the stalk 1414 will naturally latch in place when the either of the two permanent magnets 1426 approaches the single permanent magnet 1430. When the vehicle has completed a turn, the single permanent magnet 1430 will be deactivated. The centering spring 1422 will then automatically return the stalk 1414 to the original starting position.

Figure 16:
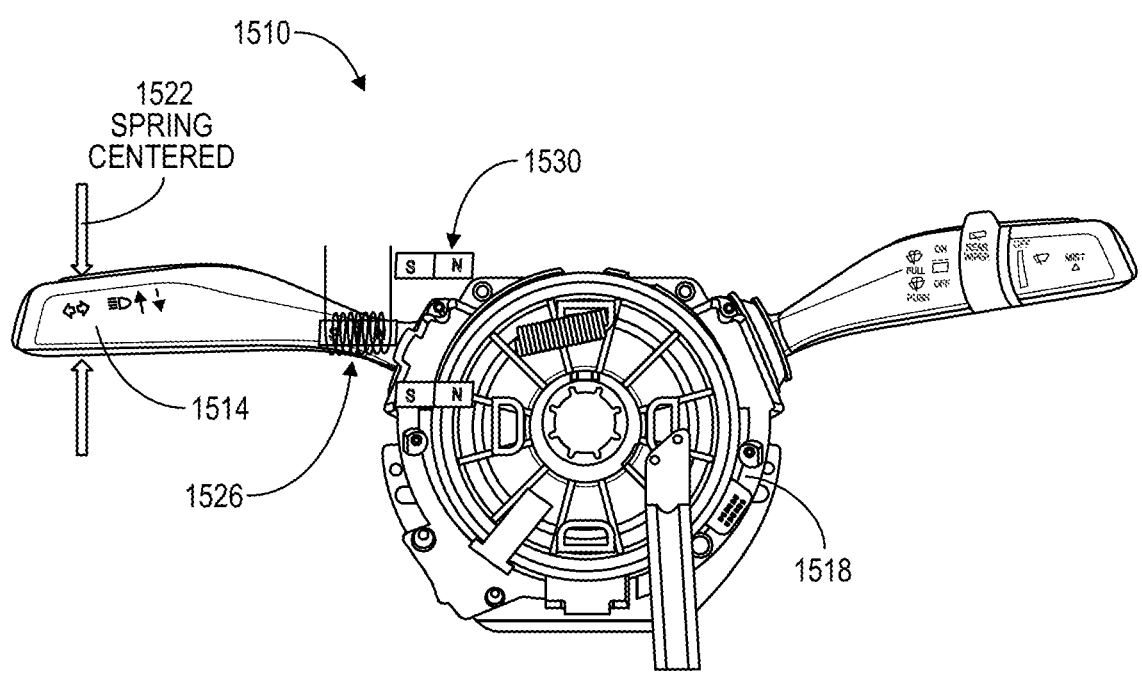

With reference to FIG. 16, a turn signal device 1510 according to another embodiment includes a stalk 1514 that is pivotally coupled to a steering column 1518, and is movable between an original starting position, a right turn position, and a left turn position. The device 1510 includes a centering spring 1522 similar to other centering springs. The device 1510 is similar to the device 1410. The only difference between the two devices is that a dual set of permanent magnets 1530 is disposed on the steering column 1518 as opposed to the stalk 1514, and a single permanent magnet 1526 is disposed on the stalk 1514 as opposed to the steering column 1518. During use, and similar to the device 1410, the magnets 1526, 1530 will attract one another and act directly on each other to latch, and the centering spring 1522 can return the stalk 1514 after a nulling coil is activated.

Figure 17:
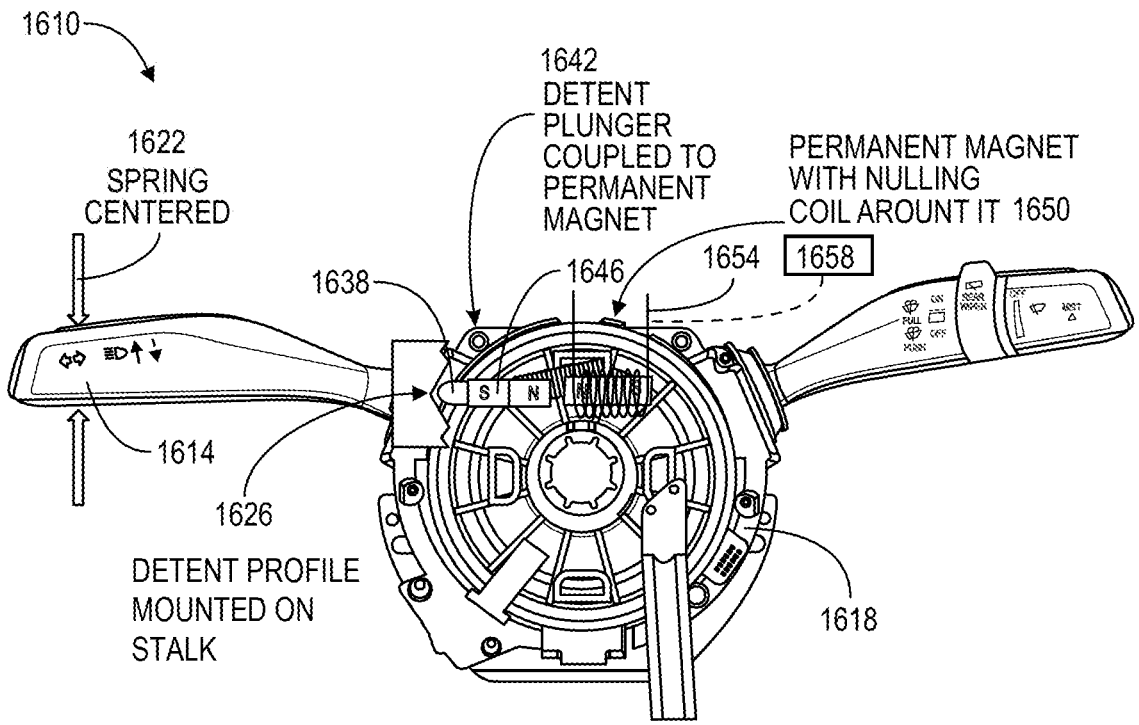

With reference to FIG. 17, a turn signal device 1610 according to another embodiment includes a stalk 1614 that is pivotally coupled to a steering column 1618, and is movable between an original starting position, a right turn position, and a left turn position. The device 1610 includes a self-centering spring 1622 for the stalk 1614. The device 1610 further includes a detent profile 1626 mounted to the stalk 1614. The detent profile 1626 may be a block or other structure having first, second, and third detents similar to those described above. The device 1610 further includes a detent plunger 1642 coupled to a first permanent magnet 1646, the detent plunger 1642 and first permanent magnet 1646 slidably mounted on the steering column 1618. The device 1610 further includes a second permanent magnet 1650, and a nulling coil 1654 wrapped around the second permanent magnet 1650. A controller 1658 is coupled to the nulling coil 1654. The second permanent magnet 1650 and the nulling coil 1654 are mounted on the steering column 1618.

During use, the driver may raise or lower the stalk 1614, so that the detent plunger 1642 is moved from the third detent 1638 and presses into one of the first or second detents. This movement causes a tactile feedback to the driver, similar to the device 10. As illustrated in FIG. 17, the first and second permanent magnets 1646, 1650 have opposite polarities (repelling force), such that the detent plunger 1642 is pushed away from the second, stationary magnet 1650. Thus, once the stalk 1614 is moved to the right turn position or the left turn position, the stalk 1614 will remain in place. Once the vehicle turn is completed, the controller 1658 sends a signal to the nulling coil 1654, activating the nulling coil 1654. Activation of the nulling coil 1654 negates the magnetic field of the second magnet 1650, thereby freeing the self-centering spring 1622 to return the stalk 1614 to the original starting position.

Figure 18A:
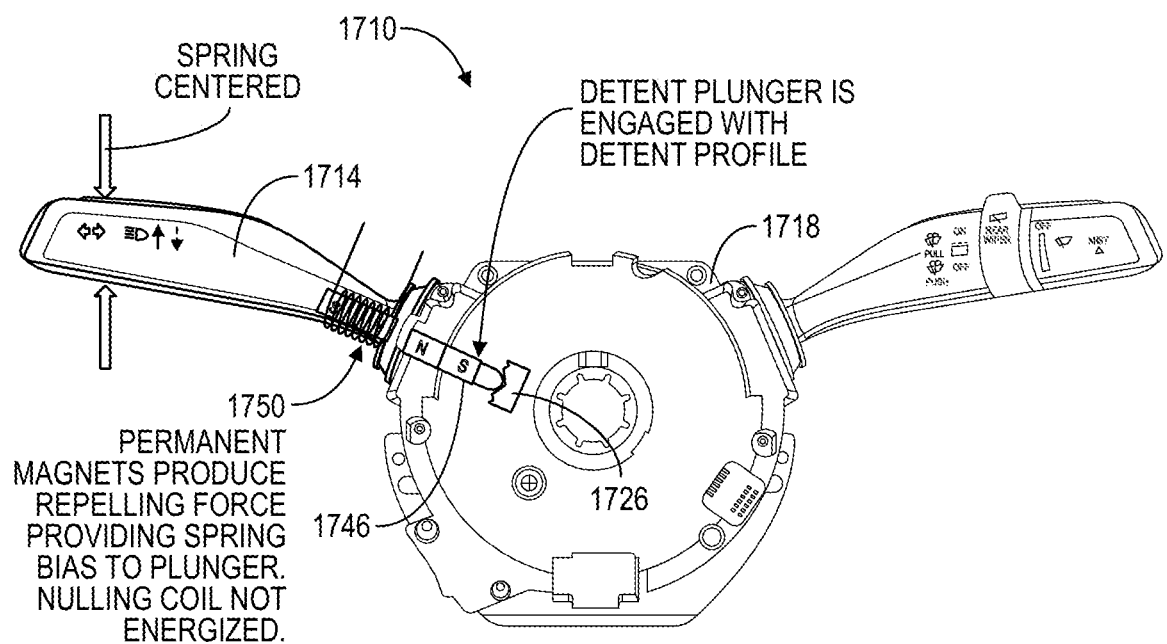
Figure 18B:
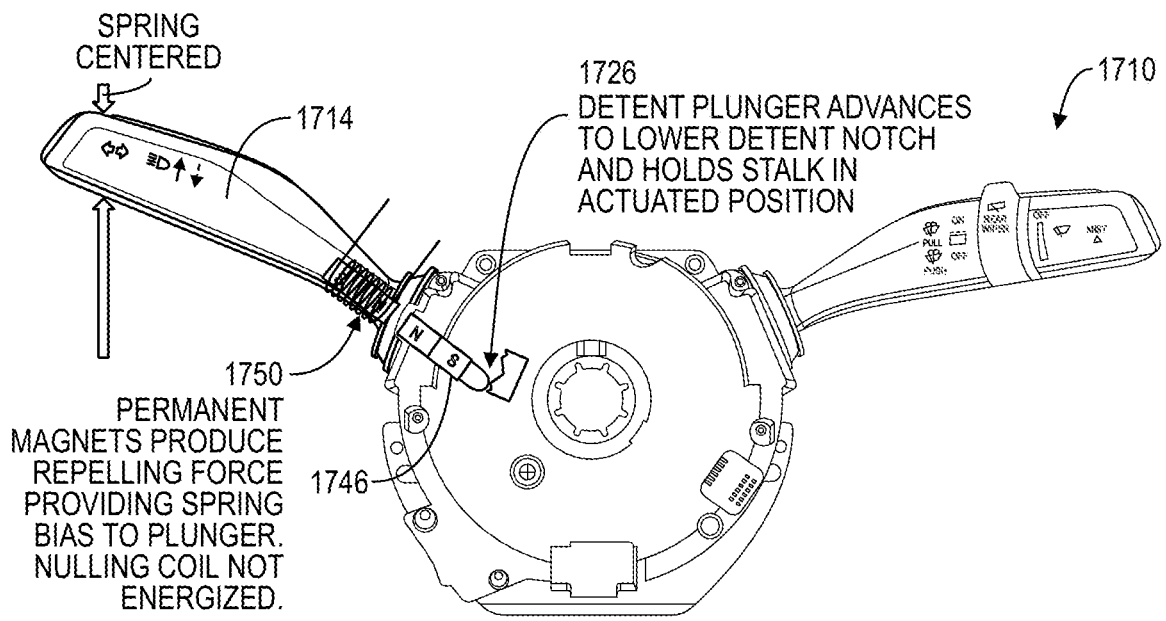
Figure 19A:
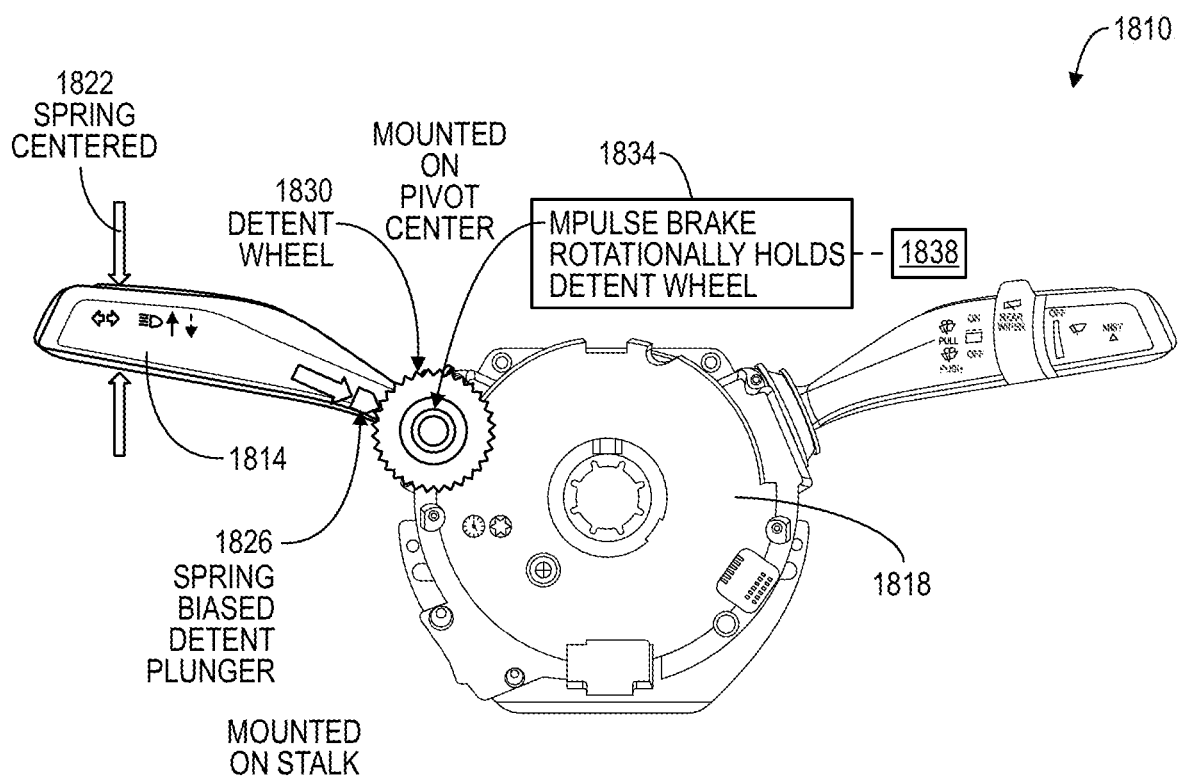
FIGS. 19-23 are schematic views of turn signal devices according to various embodiments, each incorporating a pulsed magnetic element or electromagnet.
Figure 19B:
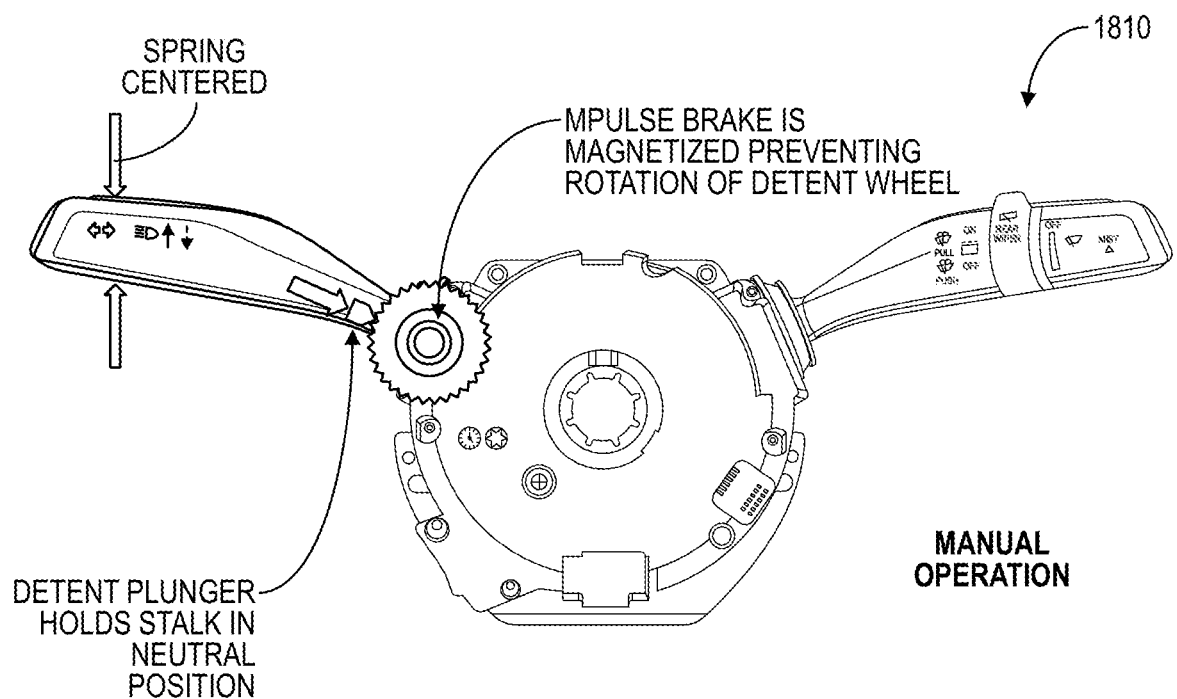
Figure 19C:
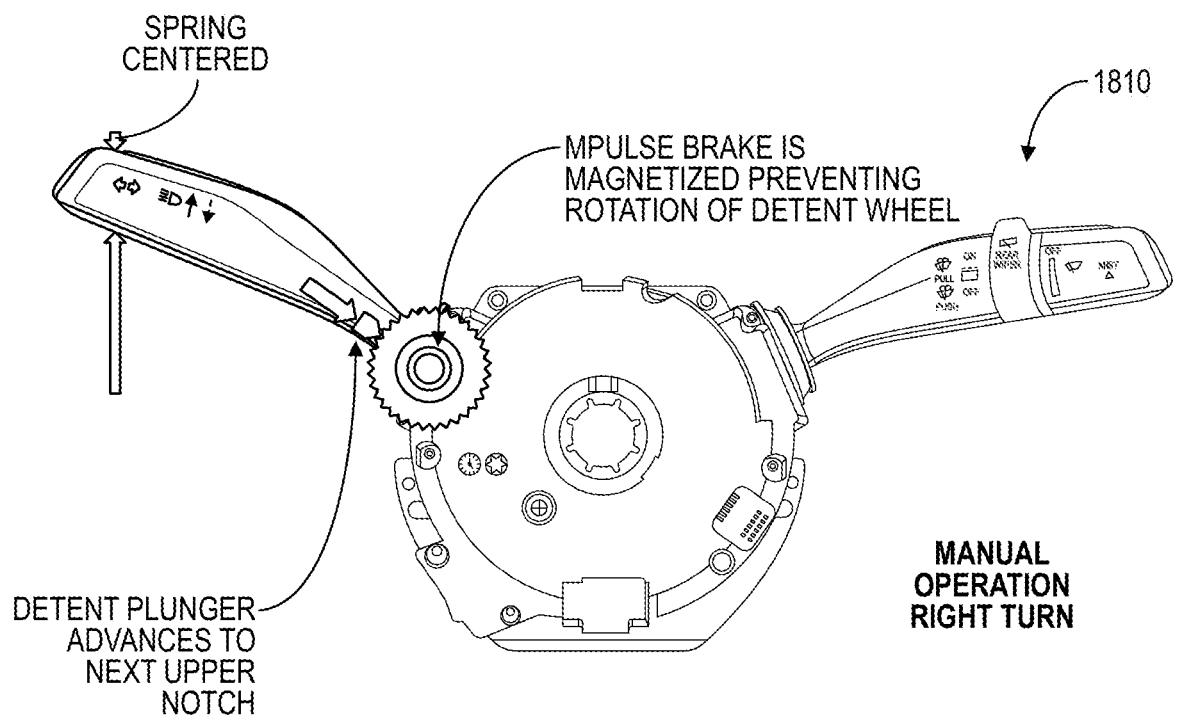
Figure 19D:
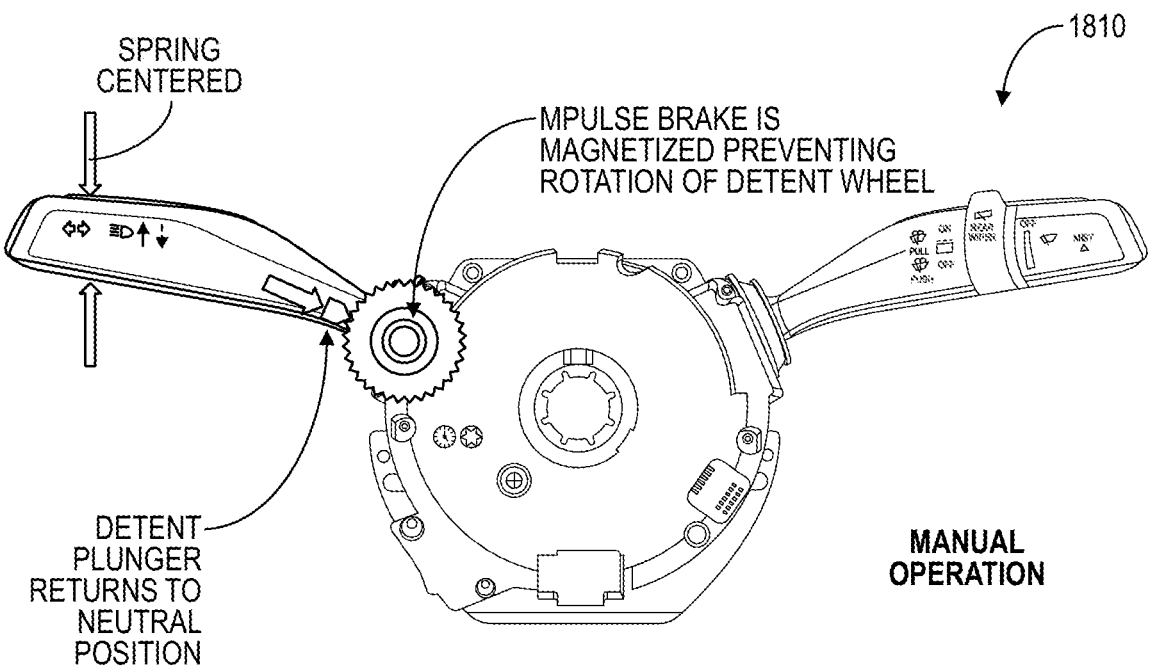
Figure 19E:
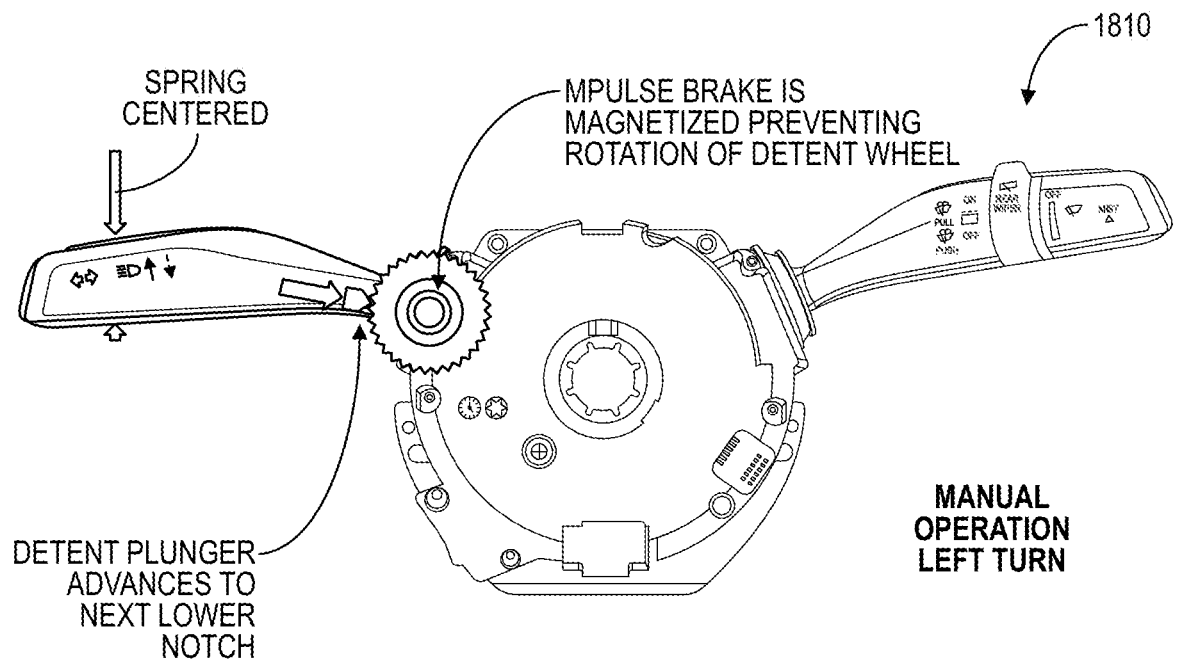
Figure 19F:
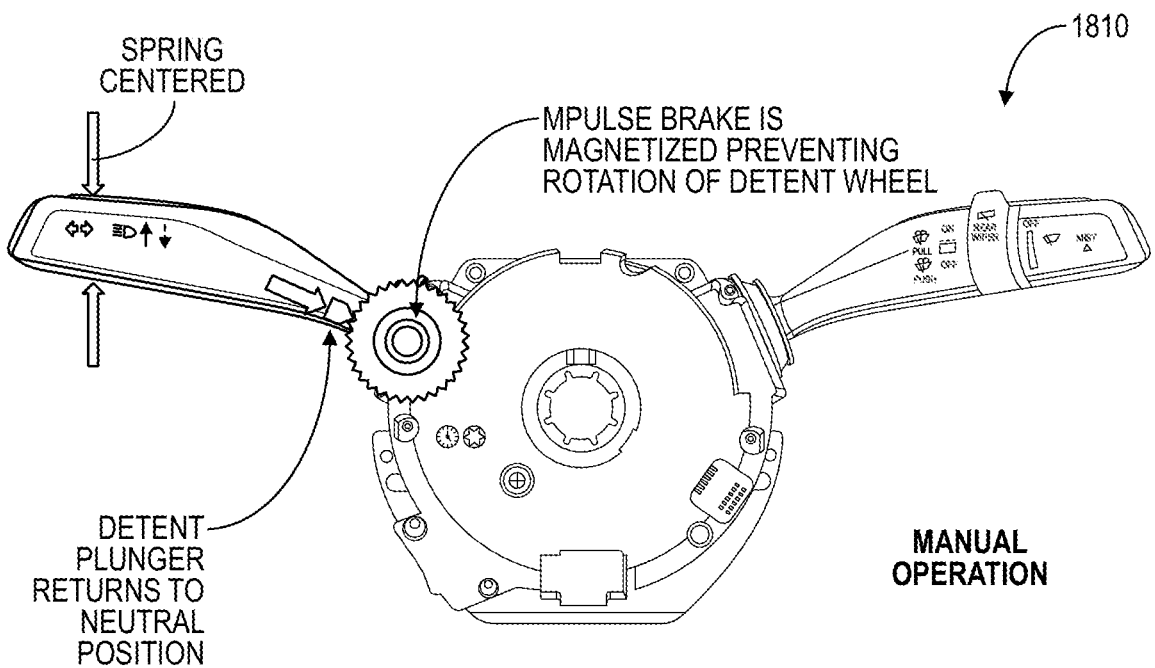
Figure 19G:
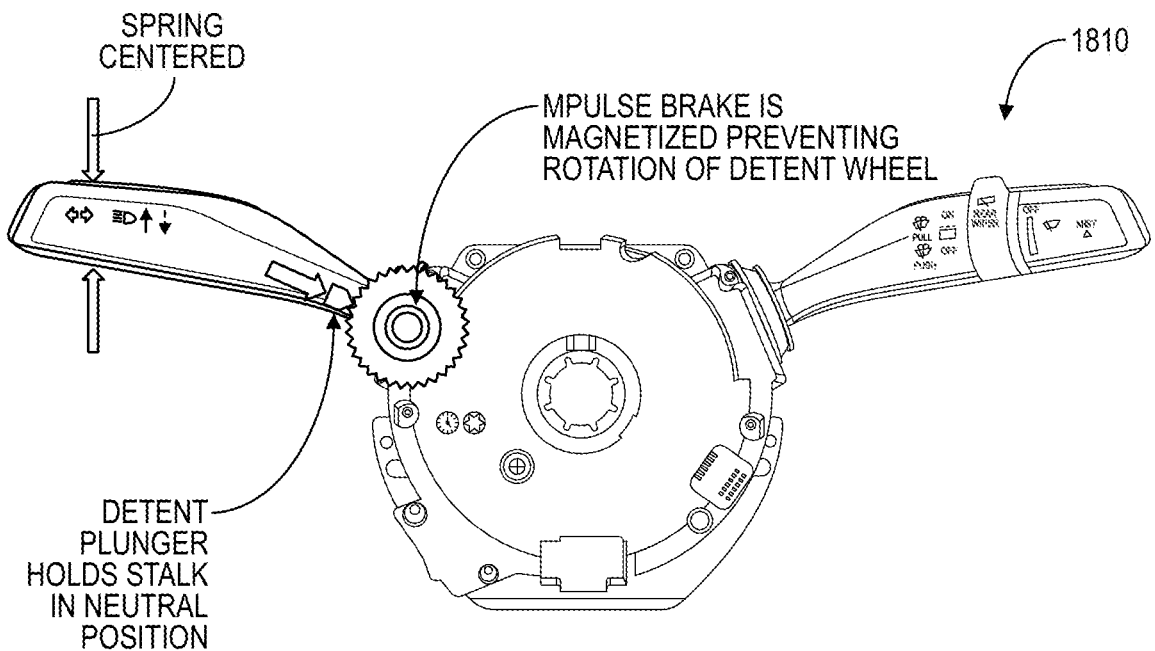
Figure 19H:
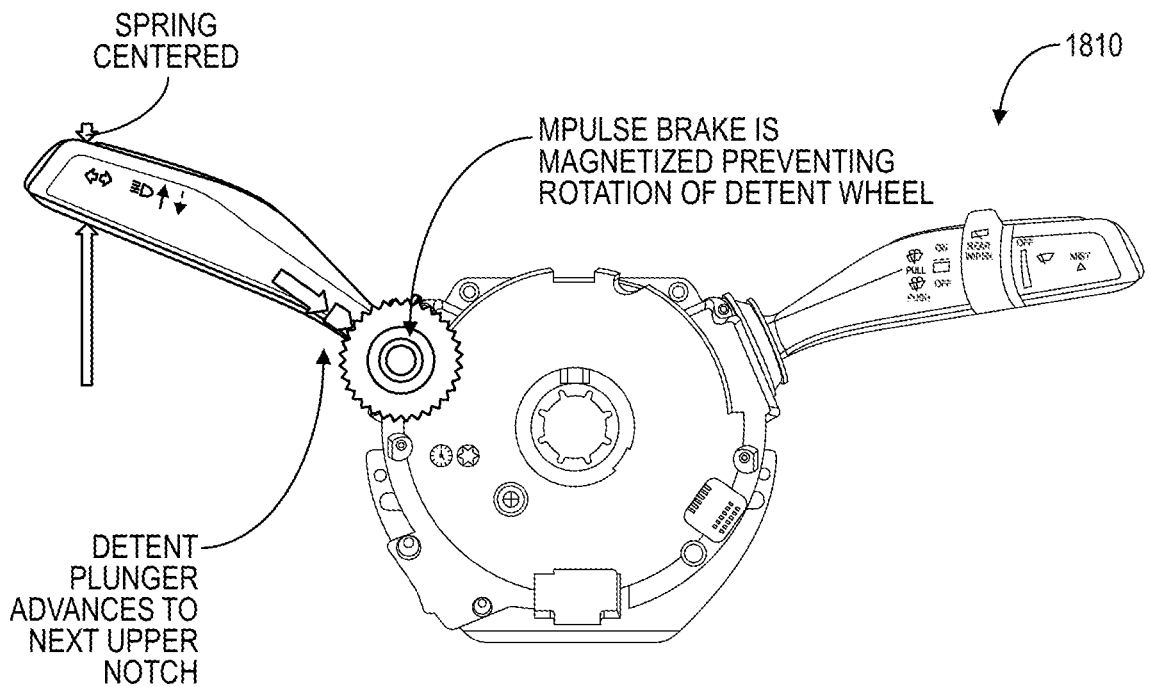
Figure 19I:
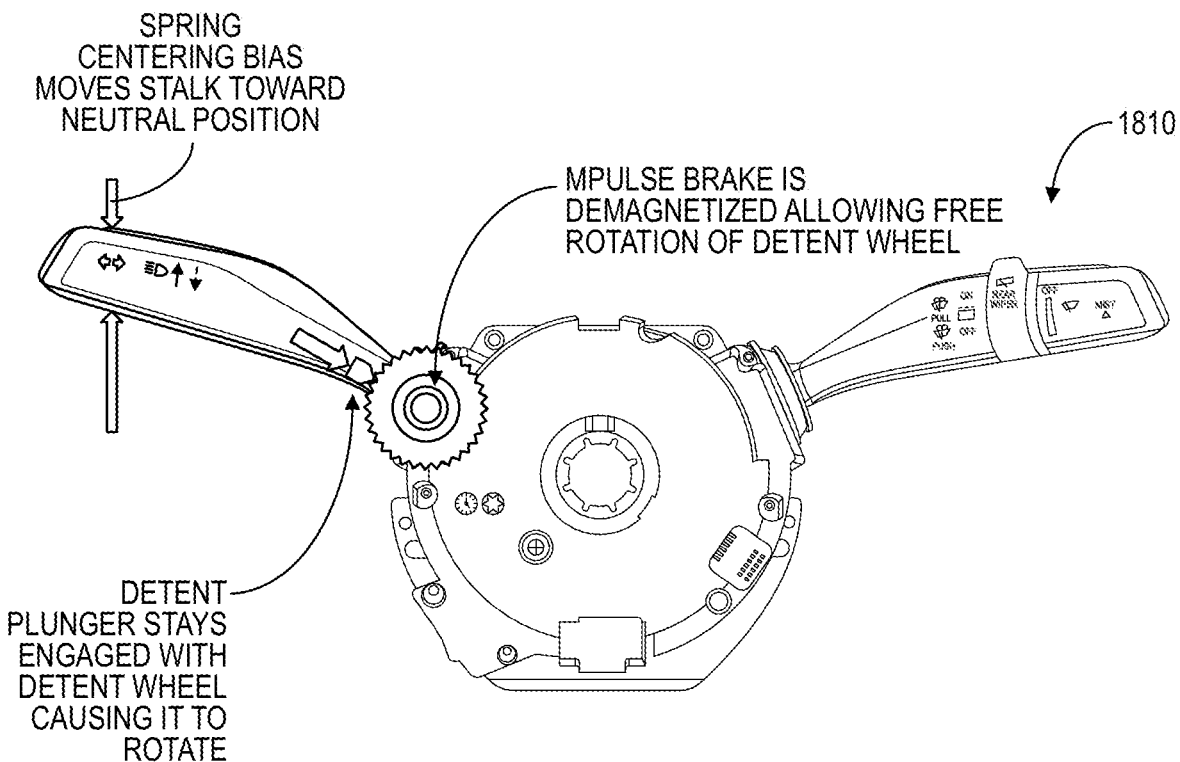
Figure 19J:
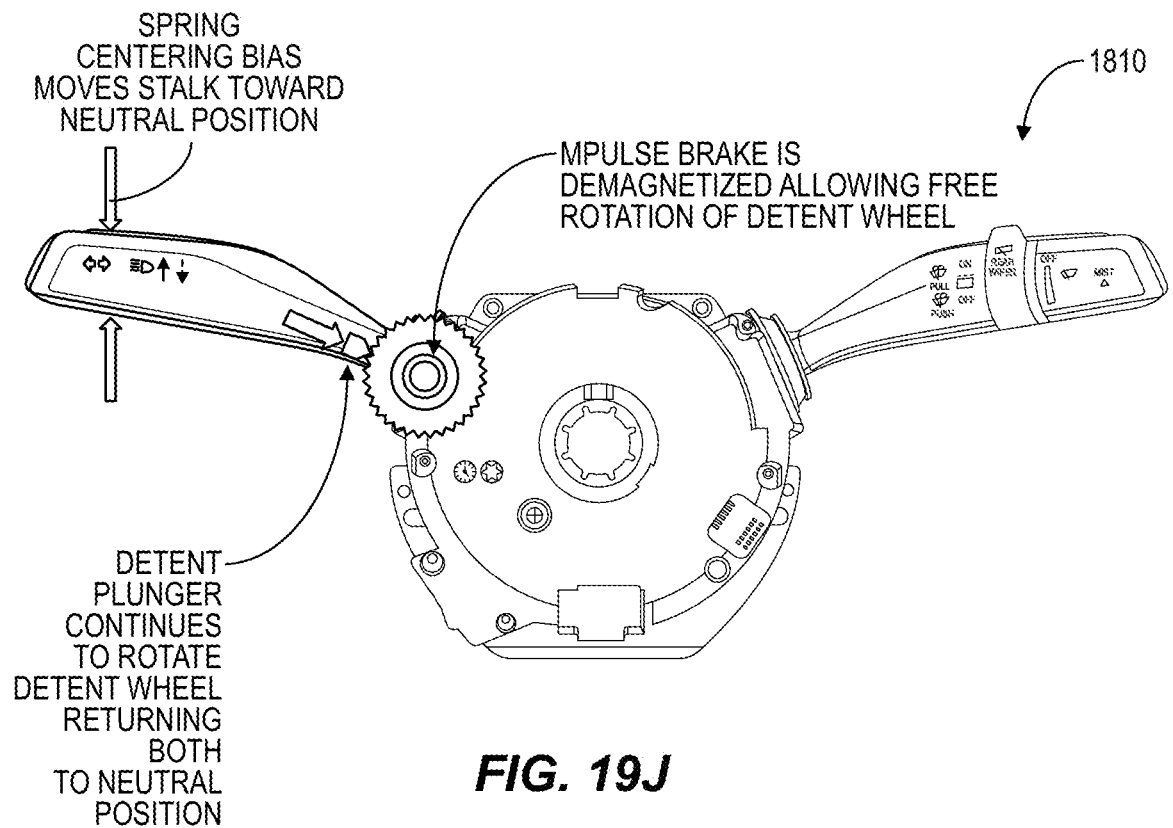
Figure 19K:
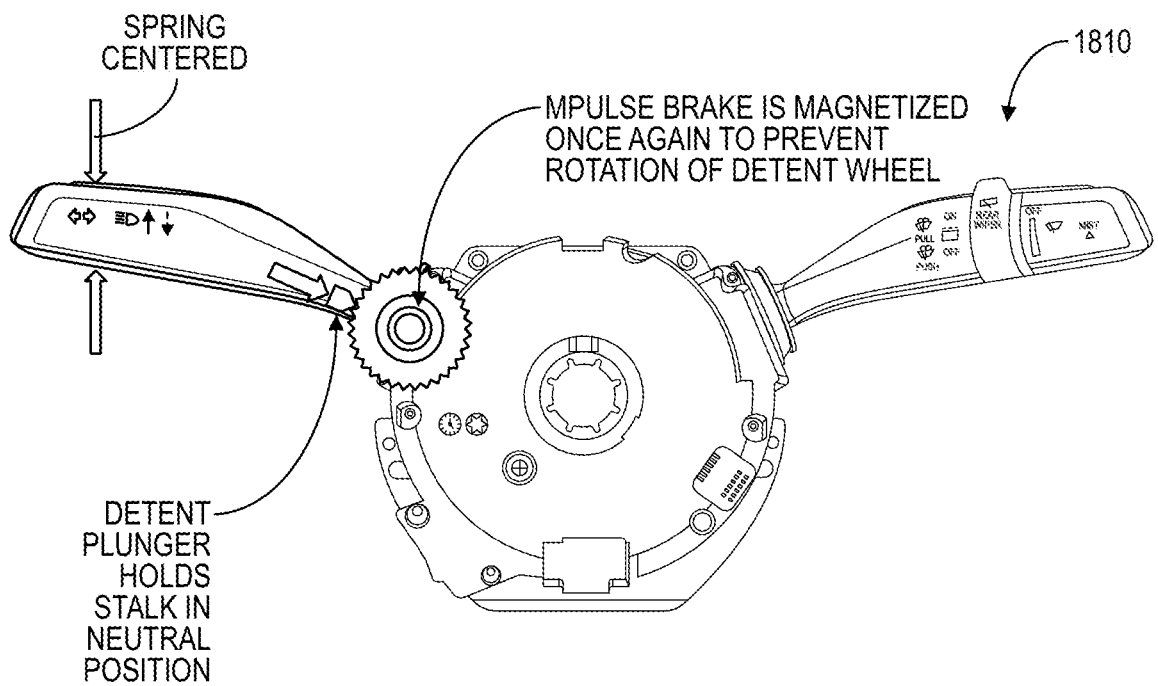

With reference to FIGS. 18A and 18B, a turn signal device 1710 according to another embodiment includes a stalk 1714 that is pivotally coupled to a steering column 1718, and is movable between an original starting position, a right turn position, and a left turn position. The device 1710 is similar to the device 1610. The only difference between the two devices is that a detent profile 1726 is mounted to the steering column 1718 instead of the stalk 1714, and the permanent magnet 1750 with the nulling coil and permanent magnet 1746 are mounted to the stalk 1714 instead of the steering column 1718. A detent plunger includes a permanent magnet 1746. Accordingly, the operation of the device 1710 works in a similar manner to that of the device 1610.

Pulsed Magnetics

With reference to FIGS. 19A-19K, a turn signal device 1810 according to another embodiment includes a stalk 1814 that is pivotally coupled to a steering column 1818, and is movable between an original starting position, a right turn position, and a left turn position. The device 1810 includes a self-centering spring 1822 for the stalk 1814, similar to other self-centering springs described herein. The device 1810 further includes a spring-biased detent plunger 1826 mounted to the stalk 1814, and a detent wheel 1830 mounted to the steering column 1818 at a pivoting location of the stalk 1814. The detent plunger 1826 and the detent wheel 1830 provide a latching or detent function similar to that of the device 10. A pulsed magnetic brake 1834 is disposed on or within the detent wheel 1830, and is coupled to a controller 1838.

During manual use (FIGS. 19A-19F), the magnetic brake 1834 remains magnetized at all times, locking rotation of the detent wheel 1830. Thus, when the driver lifts up on the stalk 1814, the plunger 1826 moves along the detents of the detent wheel 1830, providing tactile feedback. The stalk 1814 is then locked in this position until the driver manually pulls the stalk 1814 back to the original starting position, or is overridden by moving the steering wheel back.

In contrast, during an automatic use (FIGS. 19G-19K), the detent wheel 1830 is initially held stationary by the pulsed magnetic brake 1834 (e.g., magnetized with no current) as the driver moves the stalk 1814, causing the detent plunger 1826 to move up or down to one of the detents on the detent wheel 1830 (e.g., corresponding to the right turn position or left turn position). This movement creates a tactile feedback similar to the device 10. Once the vehicle has completed a turn, the controller 1838 then automatically deactivates (de-magnetizes) the pulsed magnetic brake 1834, allowing the self-centering spring 1822 to index the detent wheel 1830 to bring the stalk 1814 back to the original starting position. The pulsed magnetic brake 1834 may re-magnetize once the stalk 1814 returns to the original starting position.

Figure 20:
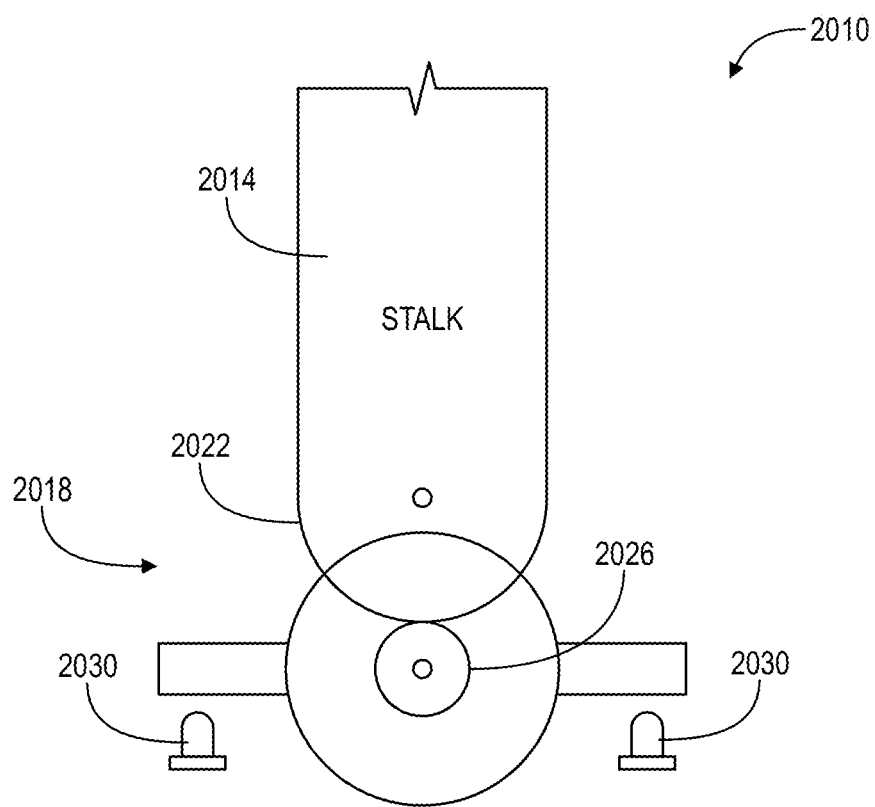

With reference to FIG. 20, a turn signal device 2010 according to another embodiment includes a stalk 2014 that is pivotally coupled to a steering column 2018, and is movable between an original starting position, a right turn position, and a left turn position. The device 2010 may include a self-centering spring (not illustrated) for the stalk 2014. The stalk 2014 may move between different detent positions that correspond to the right turn position, left turn position, and original starting position (e.g., similar to the first, second, and third detent positions described above for various other embodiments). A geared segment 2022 of the stalk 2014 is coupled to a central pinion 2026 that is coupled to a pulsed magnetic brake and two locating switches 2030. A controller (not illustrated) may be coupled to the pulsed magnetic brake. During use, the stalk 2014 is manually moved, causing rotation of the central pinion 2026 and causing one of the switches 2030 to send a signal to the controller to activate the pulsed magnetic brake and hold the stalk 2014 in place. When the pulsed magnetic brake is deactivated (i.e., after the vehicle turn is completed), the centering spring may then return the stalk 2014 back to the original starting position.

Figure 21:
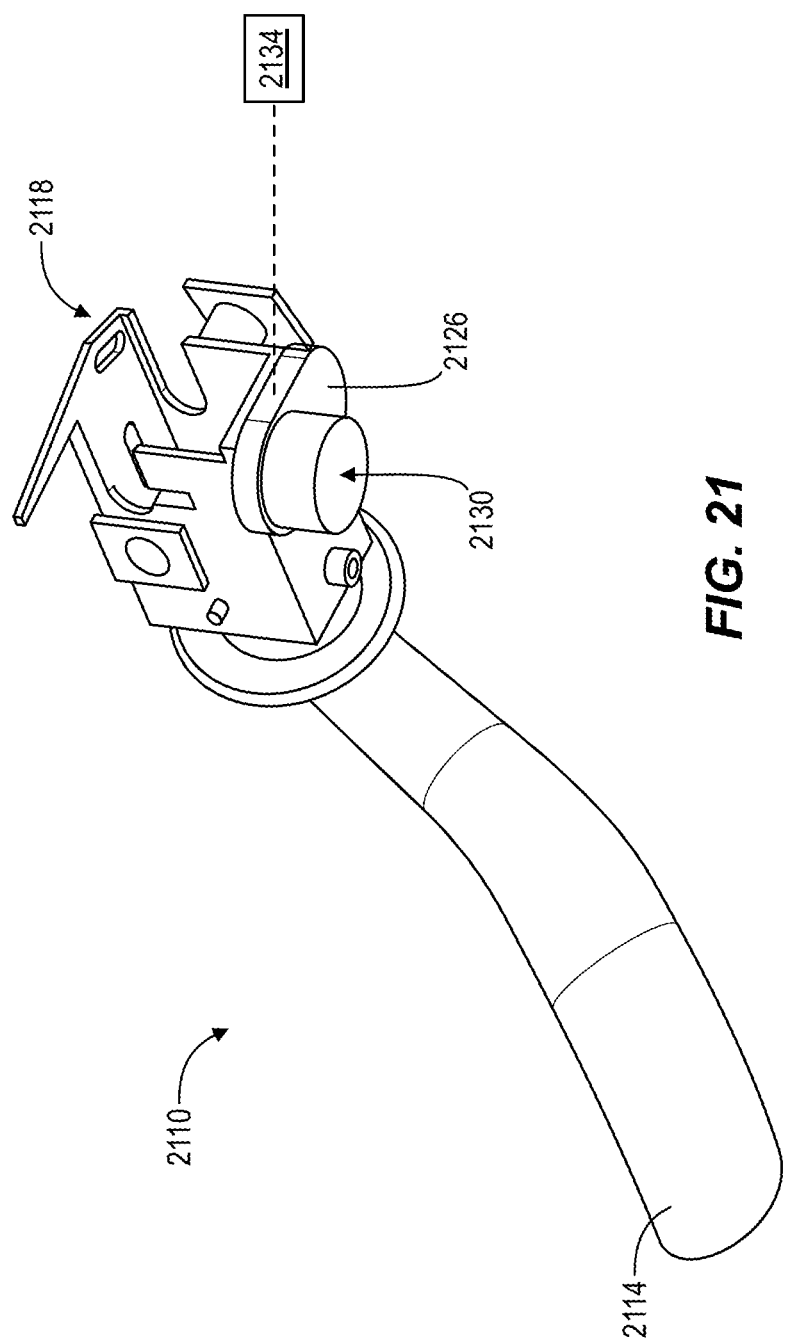

With reference to FIG. 21, a turn signal device 2110 according to another embodiment includes a stalk 2114 that is pivotally coupled to a steering column 2118, and is movable between an original starting position, a right turn position, and a left turn position. The device 2110 may include a self-centering spring (not illustrated) for the stalk 2114. The stalk 2114 may move between different detent positions that correspond to the right turn position, left turn position, and original starting position (e.g., similar to the first, second, and third detent positions described above for various other embodiments). The device 2110 further includes a pulsed magnetic slider 2126 (e.g., steel plate) disposed on the stalk 2114, and a pulsed magnetic brake or stator 2130. The pulsed magnetic stator 2130 is coupled to a controller 2134. When the stalk 2114 moves, the pulsed magnetic slider 2126 moves, and is then latched to the stator 2130 in one or more of the detent positions via magnetism when the pulsed magnetic stator 2130 is activated (e.g., magnetized). This holds the stalk 2114 in place. Deactivation of the pulsed magnetic stator 2130 allows the centering spring to return the stalk 2114 back to the original starting position.

Figure 21A:
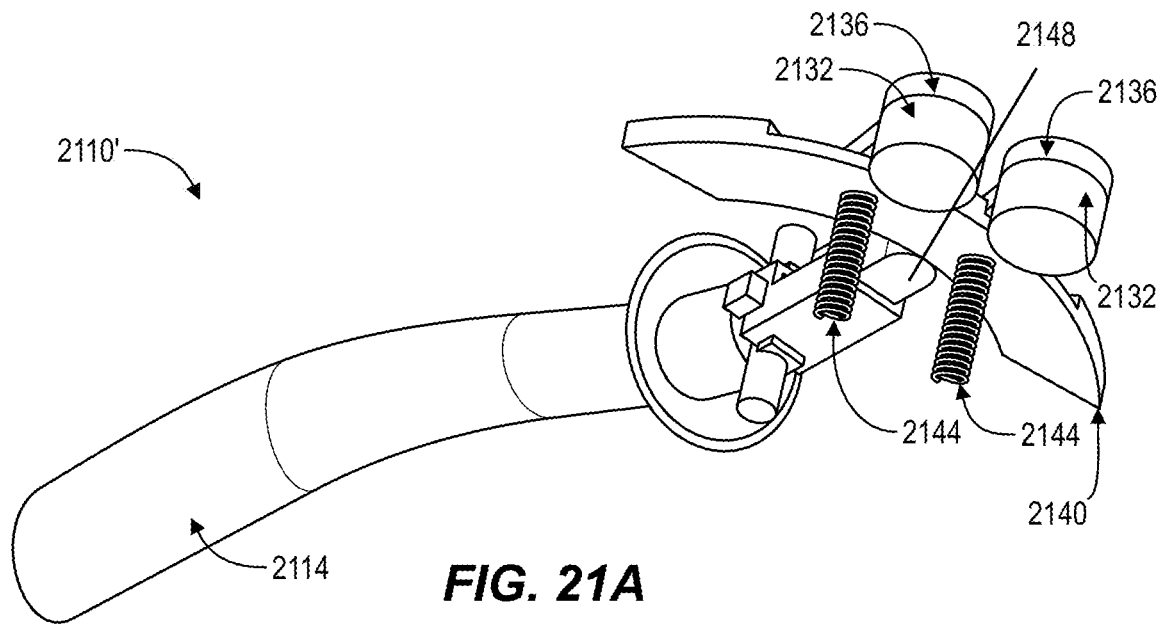
Figure 21B:
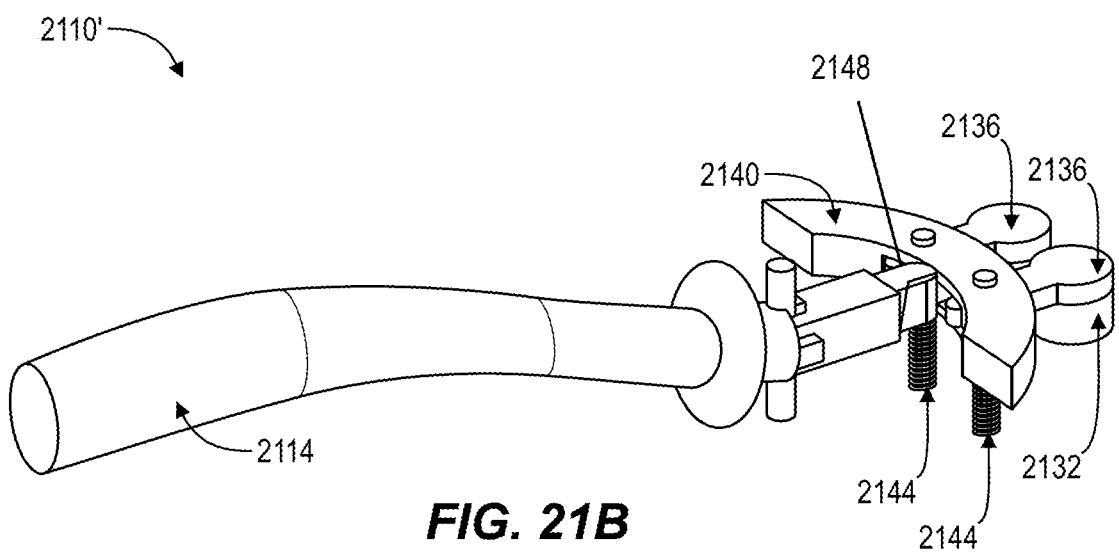

With reference to FIGS. 21A-21M, in some embodiments the pulsed magnetic stator 2130 described above is replaced by at least one electromagnet 2132 (seen in detail in FIG. 21M) that is powered on when the stalk 2114 has been moved and the turn signal lights are flashing, and is powered off when the turn has been completed and the stalk 2114 returns to the neutral position. For example, as seen in FIGS. 21A and 21B, in some embodiments a turn signal device 2110' includes two electromagnets 2132, and detent levers 2136 positioned over the electromagnets 2132. The device 2110' further includes a mounting structure (e.g., plate) 2140, lever biasing springs 2144 (e.g., torsion springs) that rotationally bias the detent levers 2136, and a spring-biased plunger 2148 coupled to the stalk 2114. The turn signal stalk 2114 functions as a latching switch apparatus.

Figure 21C:
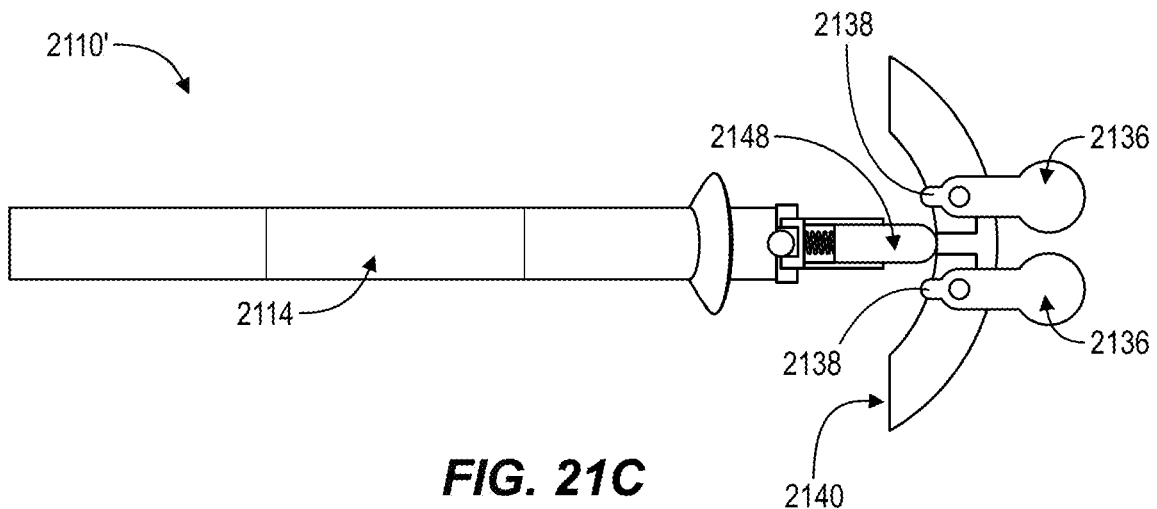
Figure 21D:
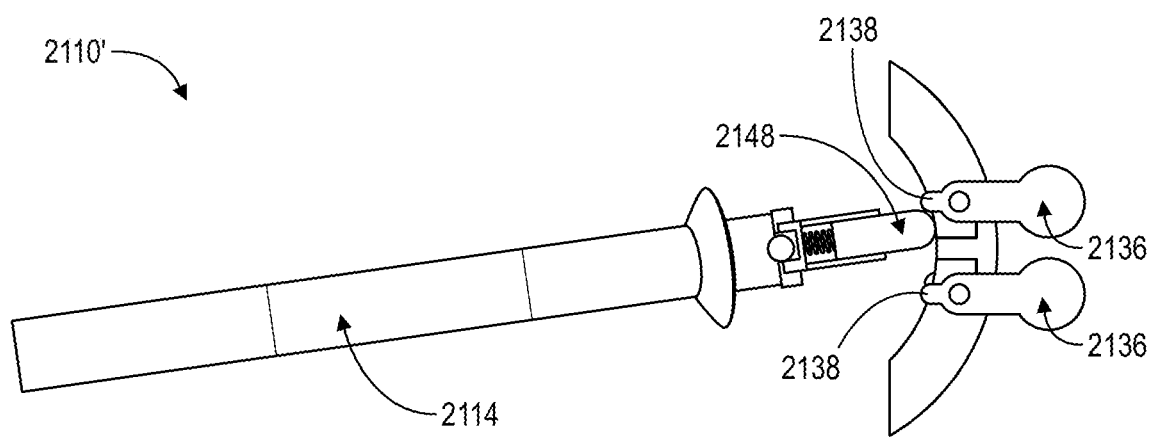
Figure 21E:
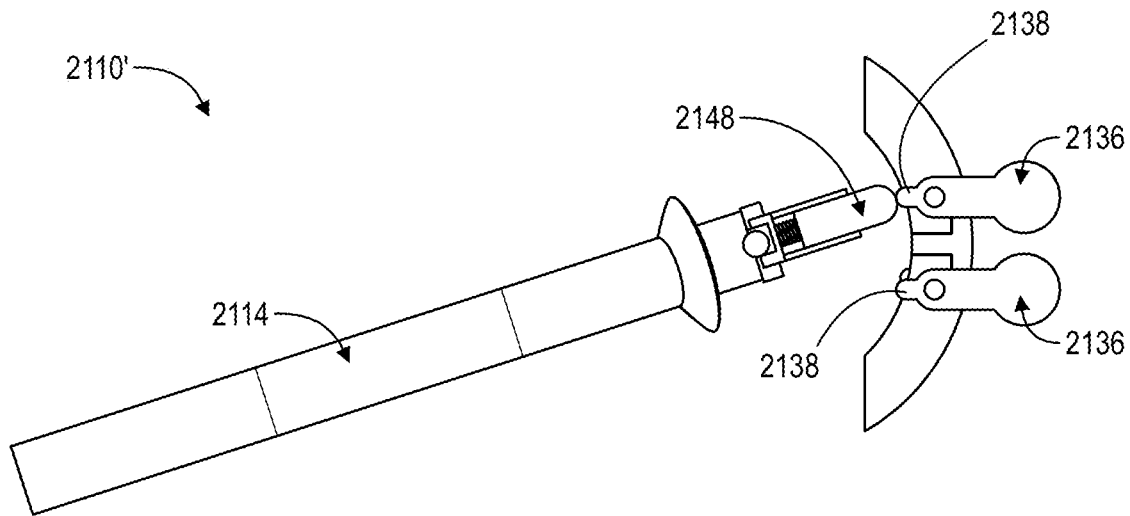
Figure 21F:
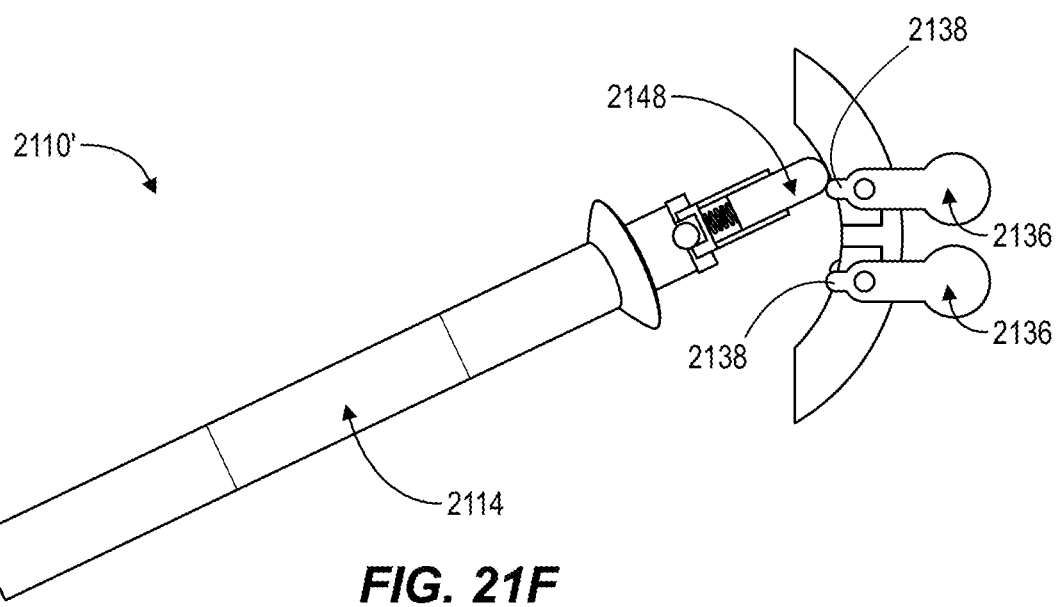

FIG. 21C illustrates the stalk 2114 in a neutral position, and FIG. 21D illustrates initial movement of the stalk 2114 to a left turn position. With reference to FIGS. 21E and 21F, during movement to the left turn position the plunger 2148 is compressed by a tip 2138 of one of the detent levers 2136 before it finally snaps or otherwise latches into a latched position as seen in FIG. 21F. In the latched position, power is turned on to the signal lights and to the electromagnet 2132 (i.e., at least the electromagnet beneath one of the two detent levers 2136 as seen in FIG. 21F), for example via a controller such as controller 2134. The magnetism generated by this electromagnet 2132 holds the detent lever 2136 in place, preventing the plunger 2148 from easily snapping back to the neutral position (e.g., via a centering spring such as any of the centering springs described herein). A portion of portions of the detent lever 2136 may be made of metal to facilitate the magnetic attraction.

Figure 21G:
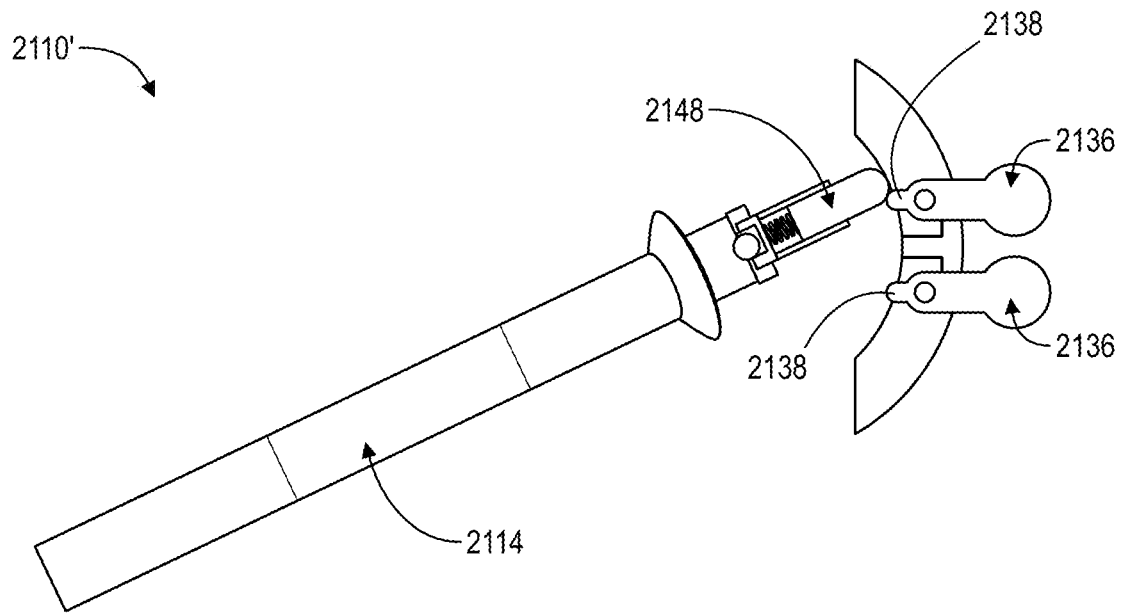
Figure 21H:
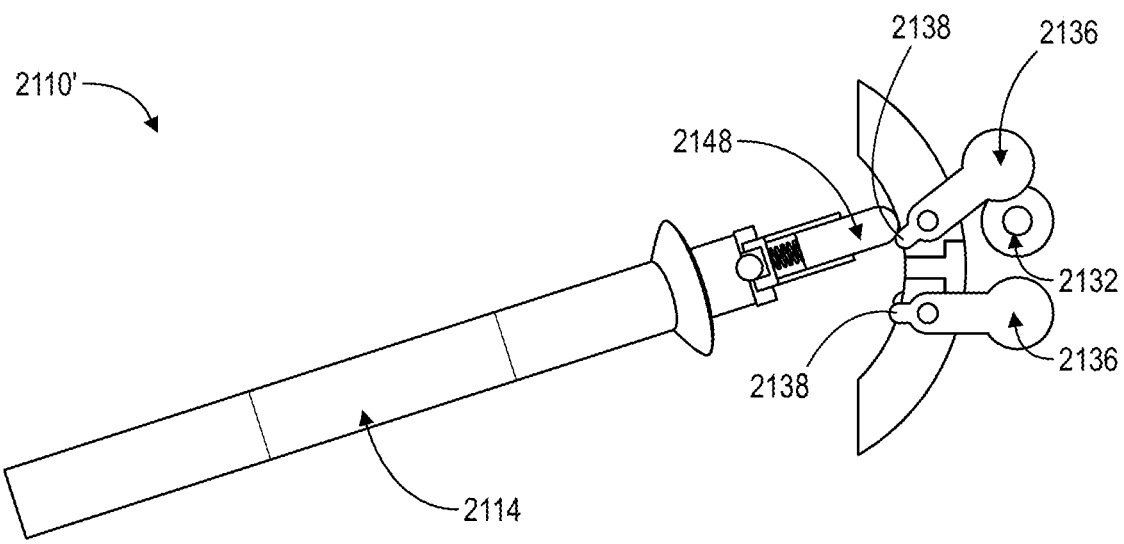

With reference to FIGS. 21G-21J, once the turn has completed and the power to the turn signal and the electromagnet 2132 has been cut off, the detent lever 2136 is no longer restrained by the electromagnet 2132. The centering spring then pulls the stalk 2114 back to the neutral position. As illustrated in FIGS. 21G and 21H, during this movement the detent lever 2136 swings or otherwise pivots (e.g., via the plunger 2148 pressing against the tip 2138), and then snaps back into position (FIGS. 21I and 21J) for example via the lever biasing spring 2144.

Figure 21I:
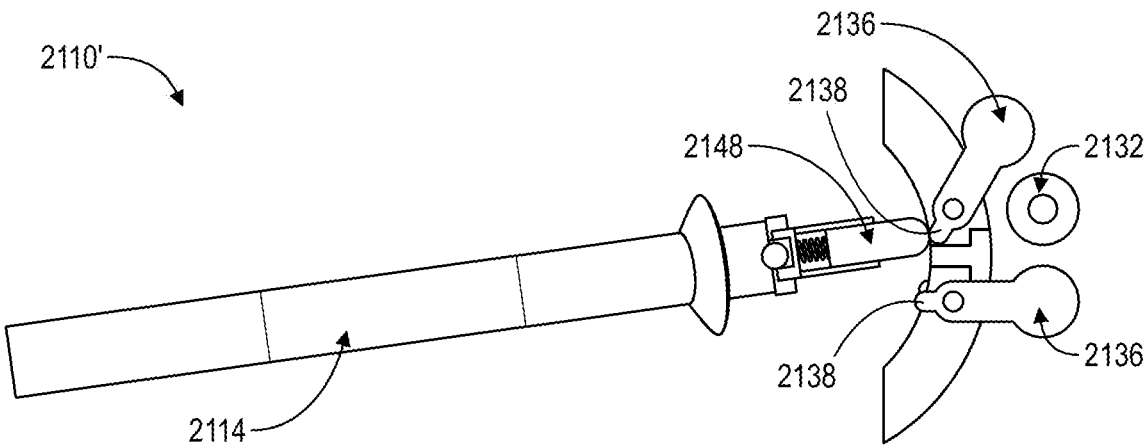
Figure 21J:
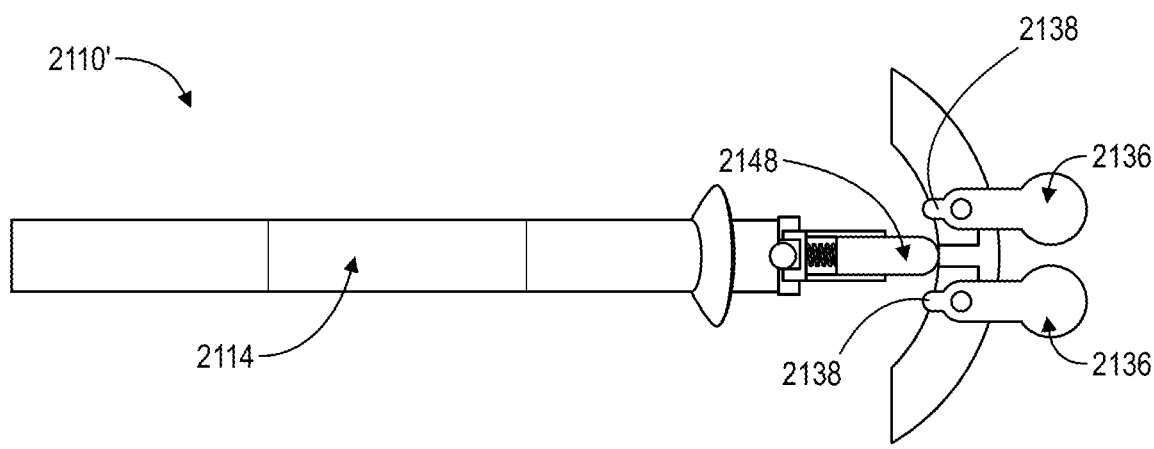
Figure 21K:
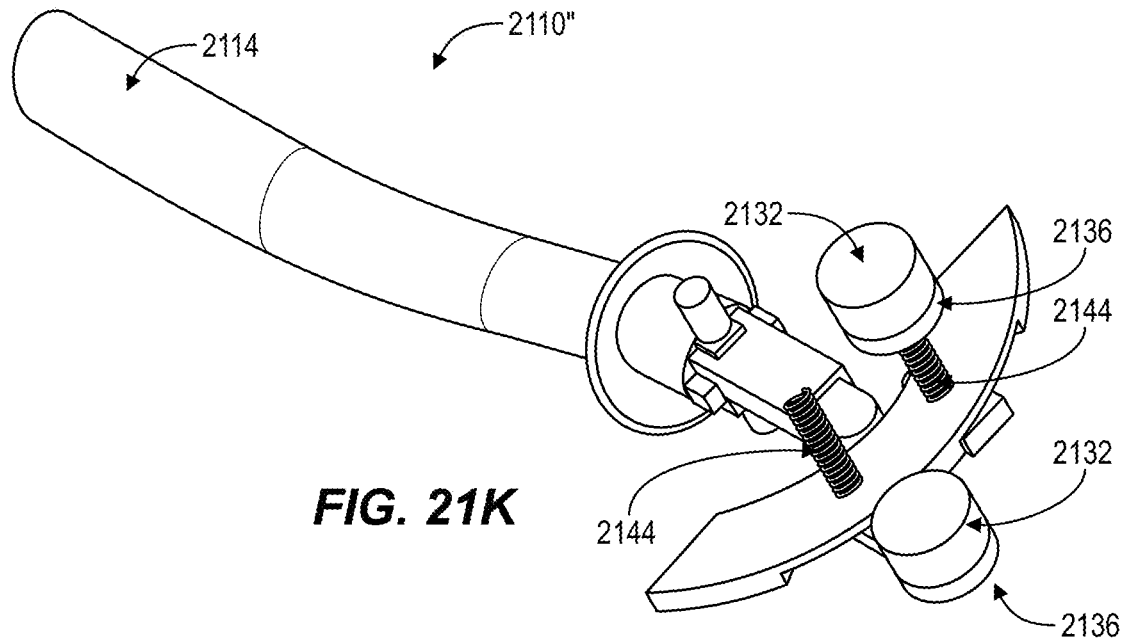
Figure 21L:
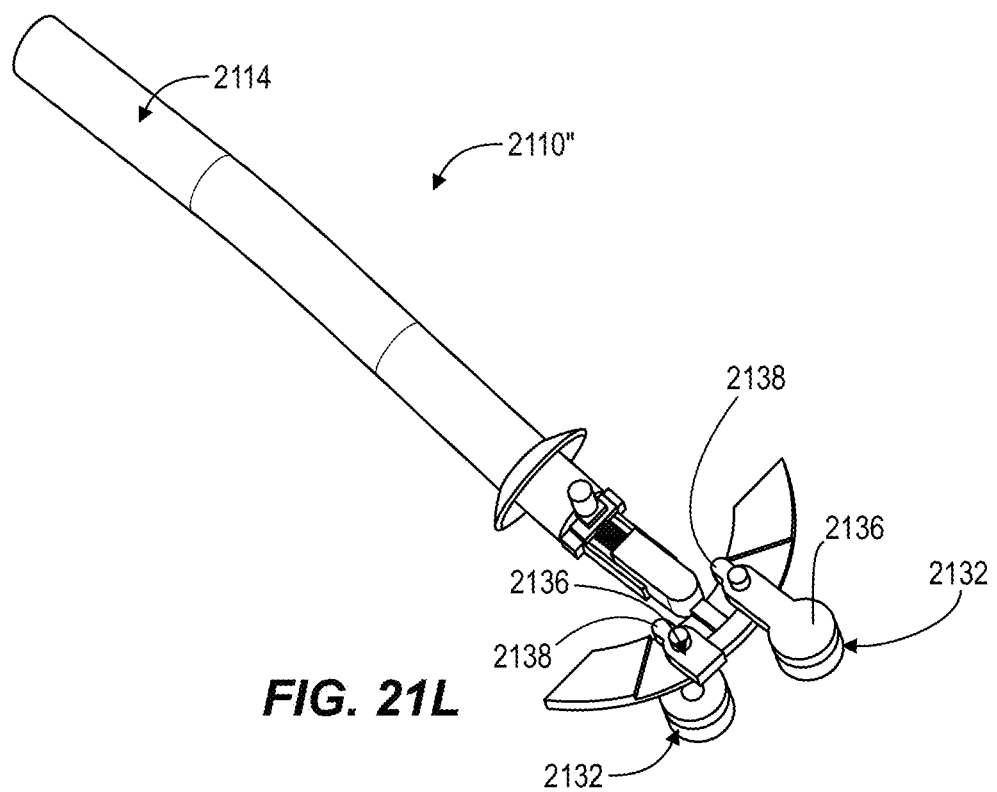

With reference to FIGS. 21K and 21L, in some embodiments, a turn signal device 2110" may include one or more electromagnets 2132 that are positioned more directly below or above the mounting structure 2140, rather than spaced radially spaced away as seen in FIGS. 21A-21I. The detent lever 2136 may be torsionally restrained by the centrally-located lever biasing spring 2144 and rotate directly above or below the electromagnet 2132, rather than swinging away radially from the electromagnet 2132 as seen in FIGS. 21H and 21I.

Figure 21M:
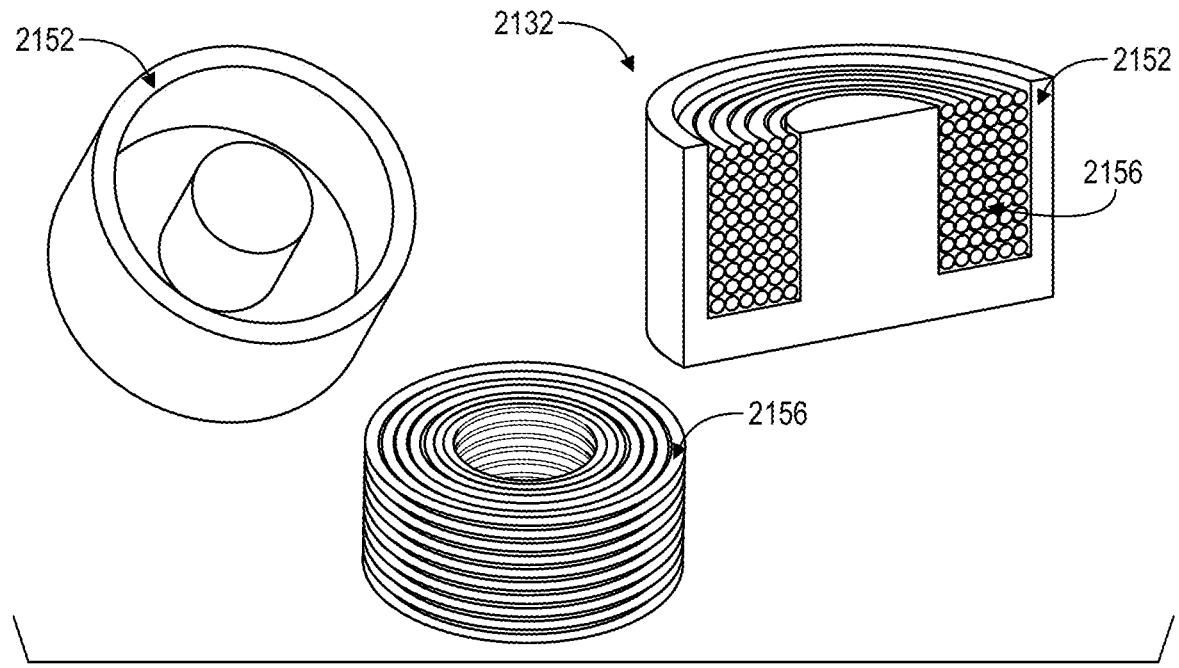

With reference to FIG. 21M, the electromagnets 2132 described above may each include, for example, a housing 2152 and a coil 2156 wrapped around a portion of the housing. Current may be passed through the coil 2156 to generate a magnetic field. Other embodiments include different structures or types of electromagnets than that illustrated. While the embodiment illustrated in FIGS. 21A-M includes electromagnets 2132, the electromagnets could be replaced by pulsed magnetic element(s).

Figure 22:
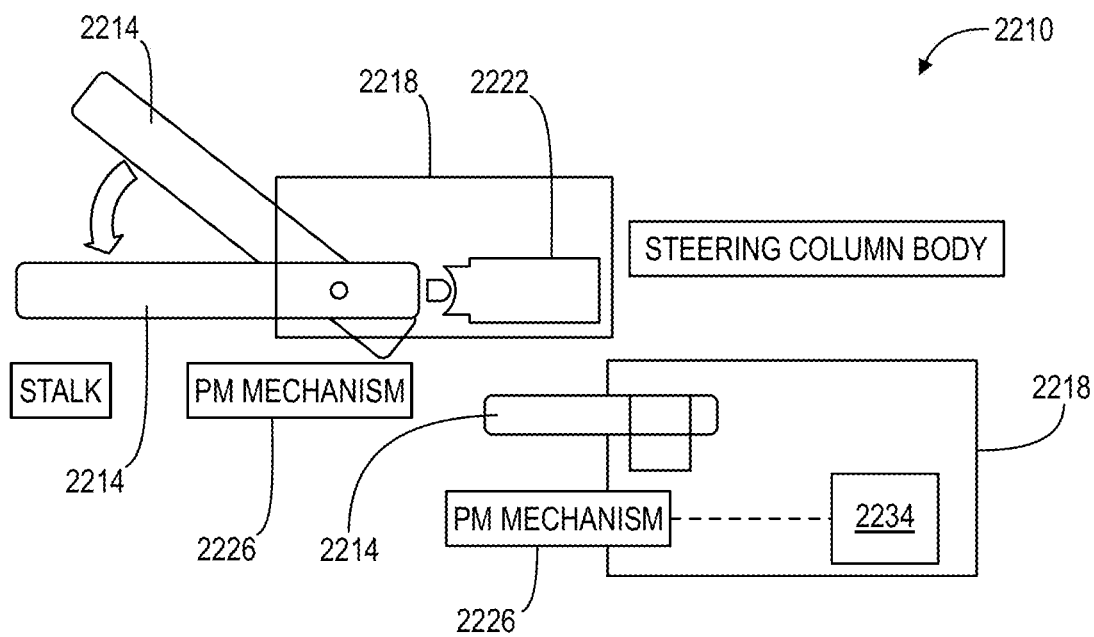

With reference to FIG. 22, a turn signal device 2210 according to another embodiment includes a stalk 2214 that is pivotally coupled to a steering column 2218, and is movable between an original starting position, a right turn position, and a left turn position. The device 2210 includes a self-centering spring (not illustrated) for the stalk 2214. The stalk 2214 may move between different detent positions that correspond to the right turn position, left turn position, and original starting position (e.g., similar to the first, second, and third detent positions described above for various other embodiments). The device 2210 further includes a detent mechanism 2222 mounted on the steering column 2218 (e.g., with multiple detents providing tactile feedback), and a pulsed magnetic mechanism 2226 (e.g., also mounted on the steering column 2218), which may be located at the pivot of the stalk 2214 and coupled to a controller 2234. Similar to the device 2110 above, when the pulsed magnetic mechanism 2226 is activated by the controller 2234 the stalk 2214 is held stationary in one of the detent positions. When deactivated, the stalk 2214 may be returned to the original starting position for example by the centering spring.

Figure 23:
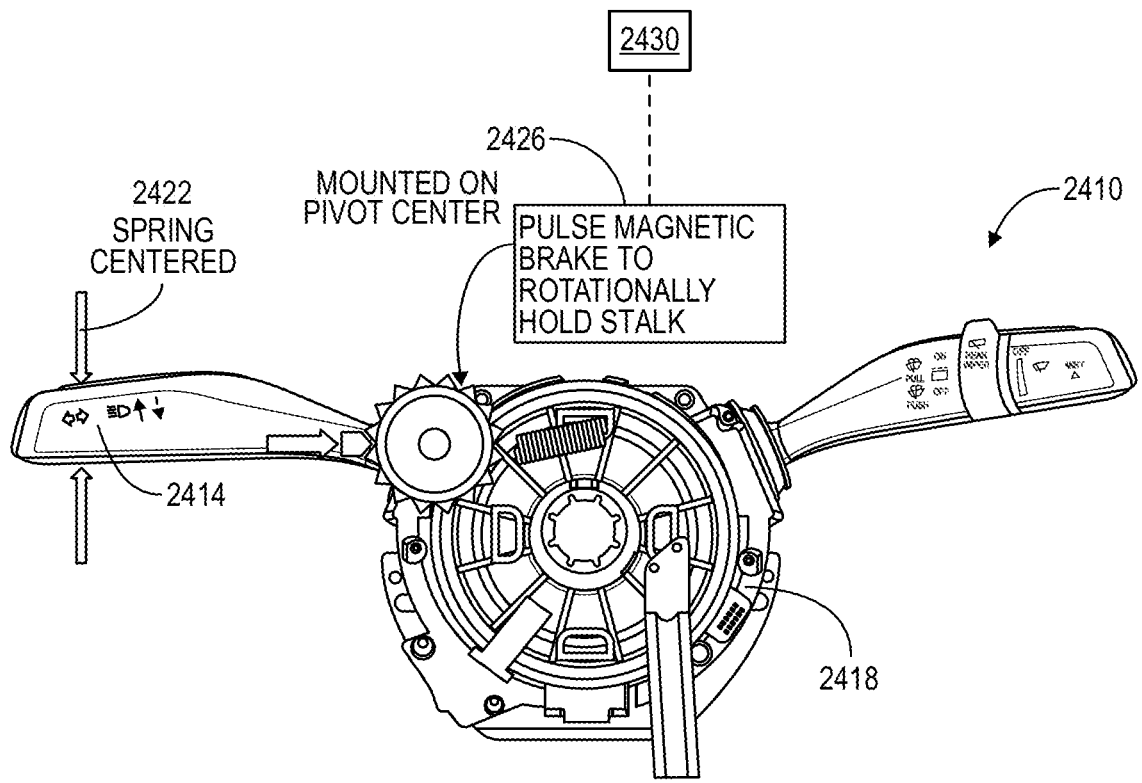

With reference to FIG. 23, a turn signal device 2410 according to another embodiment includes a stalk 2414 that is pivotally coupled to a steering column 2418, and is movable between an original starting position, a right turn position, and a left turn position. The device 2410 includes a self-centering spring 2422 for the stalk 2414, similar to the self-centering springs described above. The device 2410 further includes a pulsed magnetic brake 2426 mounted at a pivot location of the stalk 2414, and coupled to a controller 2430. The pulsed magnetic brake 2426 may be modulated to provide variable resistance to simulate a detent feel similar to that of the device 10. When the pulsed magnetic brake 2426 is fully magnetized, the pulsed magnetic brake 2426 holds the stalk 2414 in one of the right turn position, left turn position, and/or original starting position. Demagnetizing the pulsed magnetic brake 2426 allows the centering spring 2422 to return the stalk 2414 back to the original starting position.

In some embodiments, the pulsed magnetic brakes described above may be replaced for example by a solenoid or other electromagnet or powered magnetic device.

Smart Materials

Figure 24:
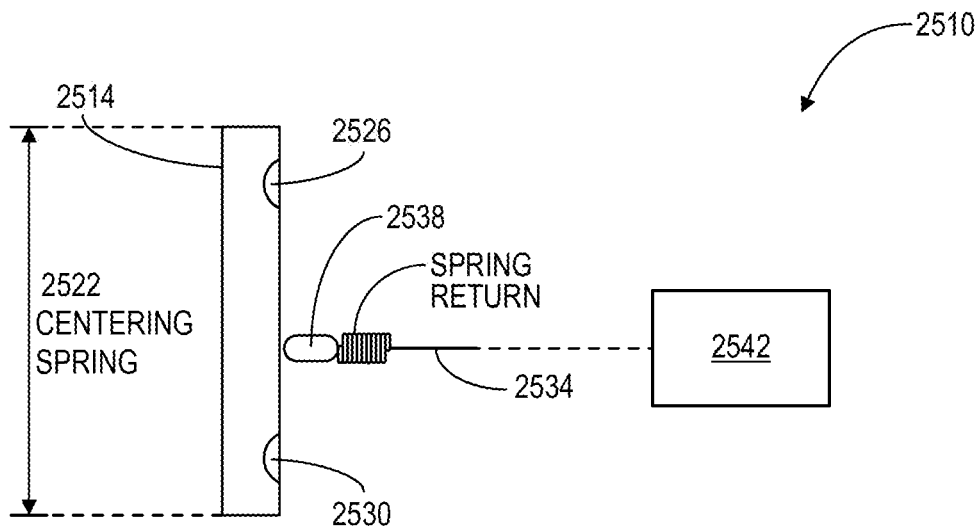
FIGS. 24-27 are schematic views of turn signal devices according to various embodiments, each incorporating a smart material.

With reference to FIG. 24, a turn signal device 2510 includes a stalk 2514 that is pivotally coupled to a steering column, and is movable between an original starting position, a right turn position, and a left turn position. A centering spring 2522, similar to the centering springs described above, centers the stalk 2514 back toward the original starting position. The stalk 2514, a portion of which is illustrated in FIG. 24, includes a first detent 2526 (e.g., indented or recessed region) corresponding to the right turn position and a second detent 2530 (e.g., indented region) corresponding to the left turn position. The device 2510 may further include a third detent (e.g., indented region) corresponding to the original starting position. The device 2510 further includes a muscle wire 2534 (e.g., a wired device that moves when current is directed through it) and a linearly-movable plunger 2538 coupled to the muscle wire 2534. The muscle wire 2534 may be located in the steering column, and may be controlled via a controller 2542. In the illustrated embodiment, the plunger 2538 is naturally biased toward the stalk 2514, and when the muscle wire 2534 is actuated, the plunger 2538 is pulled back away from the stalk 2514 against the bias, to free the centering spring 2522 to return the stalk 2514 to the original starting position. In other embodiments the plunger 2538 is not biased, and when the muscle wire 2534 is actuated, the plunger 2538 is either pushed toward the stalk 2514 or pulled away from the stalk 2514.

Figure 25:
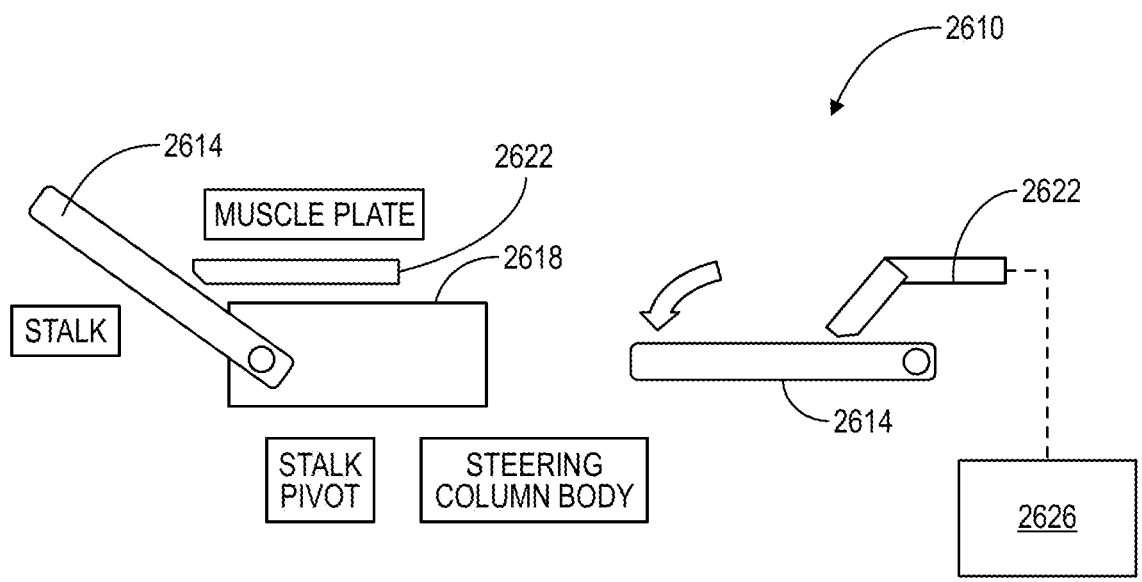

With reference to FIG. 25, a turn signal device 2610 includes a stalk 2614 that is pivotally coupled to a steering column 2618, and is movable between an original starting position, a right turn position, and a left turn position. The device 2610 includes a muscle plate 2622 coupled for example to the steering column 2618, as well as to a controller 2626. When activated, the muscle plate 2622 flexes, or bends, as illustrated in FIG. 25, to press against the stalk 2614 and push the stalk 2614 back to the original starting position. While not illustrated, the device 2610 may include at least two muscle plates 2622, one to push the stalk 2614 from the right turn position back to the original starting position, and a second muscle plate 2622 to push the stalk 2614 from the left turn position back to the original starting position. The device 2610 may include detents similar to those already in the device 10. Thus, the device 2610 does not include a centering spring. Rather, the device 2610 is used only to automatically return the stalk 2614 back to the original starting position, rather than relying on the turning of a steering wheel as with the device 10.

Figure 26:
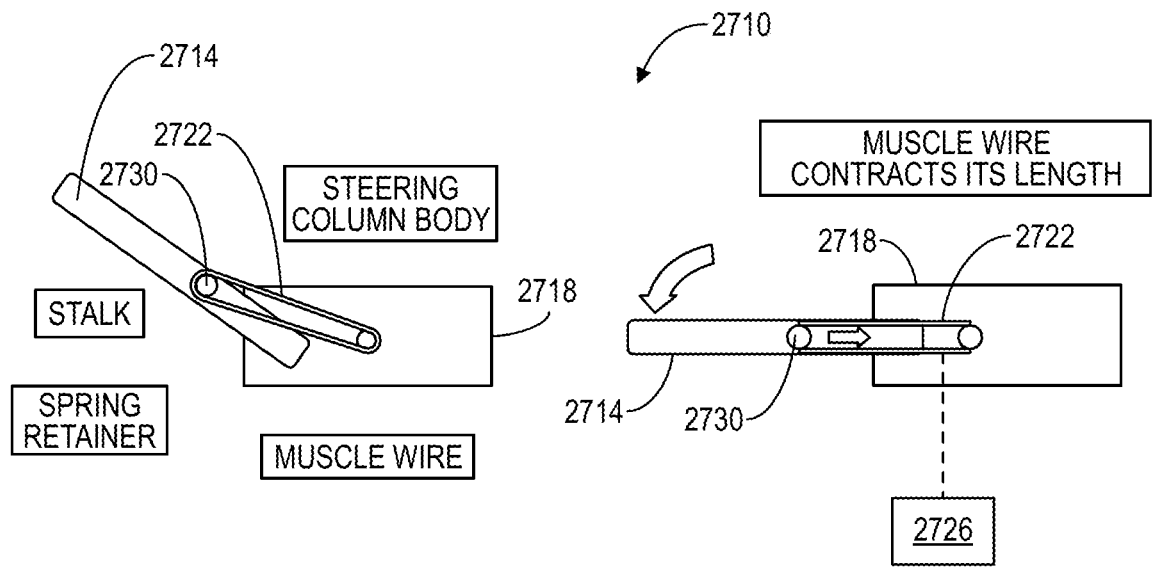

With reference to FIG. 26, a turn signal device 2710 includes a stalk 2714 that is pivotally coupled to a steering column 2718, and is movable between an original starting position, a right turn position, and a left turn position. The device 2710 includes a muscle wire 2722 coupled for example to the steering column 2718, and to a controller 2726. One end of the muscle wire 2722 is looped around a fixed stud 2730 on the stalk 2714. When activated (e.g., via the controller 2726), the muscle wire 2722 shortens its loop length and pulls the stalk 2714 back to the original starting position. The device 2710 may include detents similar to those already in the device 10. Thus, similar to the device 2610, the device 2710 does not include a centering spring. Rather, the device 2710 is used only to automatically return the stalk 2714 back to the original starting position, rather than relying on the turning of a steering wheel as with the device 10.

Figure 27:
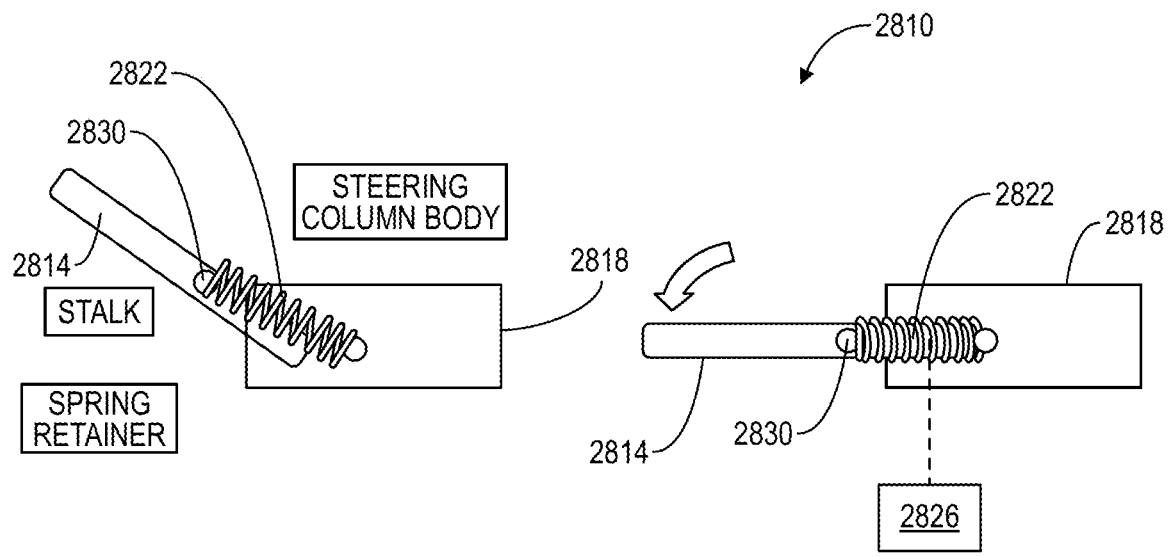

With reference to FIG. 27, a turn signal device 2810 includes a stalk 2814 that is pivotally coupled to a steering column 2818, and is movable between an original starting position, a right turn position, and a left turn position. The device 2810 includes a muscle spring 2822 coupled for example to the steering column 2818 and to a controller 2826. One end of the muscle spring 2822 is looped or otherwise fixed to a fixed stud 2830 on the stalk 2814. When activated (e.g., via the controller 2826), the muscle spring 2822 shortens its total length and pulls the stalk 2814 back to the original starting position. The device 2810 may include detents similar to those already in the device 10. Thus, similar to the devices 2610 and 2710, the device 2810 also does not include a centering spring. Rather, the device 2810 is used only to automatically return the stalk 2814 back to the original starting position, rather than relying on the turning of a steering wheel as with the device 10.

Pumps

Figure 28:
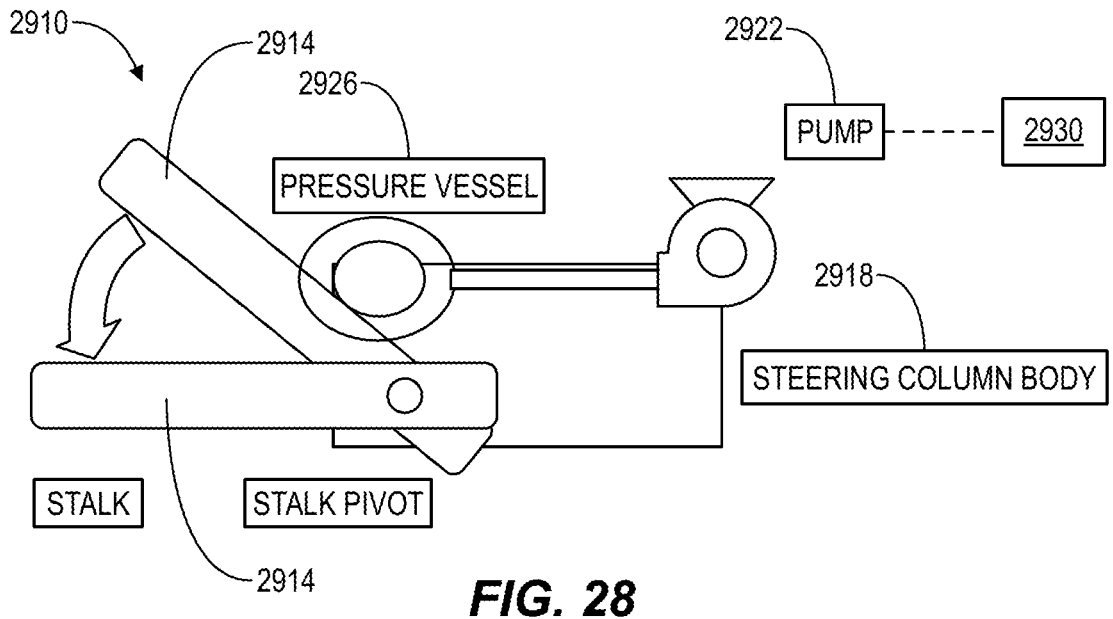
FIGS. 28 and 29 are schematic view of turn signal devices according to various embodiments, each incorporating a pump.

With reference to FIG. 28, a turn signal device 2910 includes a stalk 2914 that is pivotally coupled to a steering column 2918, and is movable between an original starting position, a right turn position, and a left turn position. The device 2910 includes a pump 2922, a pressure vessel 2926 coupled to the pump 2922, and a controller 2930 coupled to the pump 2922. The device 2910 does not include a centering spring. Rather, the device 2910 relies upon the pump 2922 and pressure vessel 2926 to press against and automatically return the stalk 2914 back to the original starting position. For example, once the vehicle has completed a turn, the controller 2930 activates the pump 2922. The activated pump 2922 pumps air or fluid into the pressure vessel 2926, causing the pressure vessel 2926 to expand and pivot the stalk 2914. In some embodiments the device 2910 includes the detent mechanisms of the device 10, and thus the only added feature or different feature from the device 10 is the controller 2930, the pump 2922, and the pressure vessel 2926.

Figure 29:
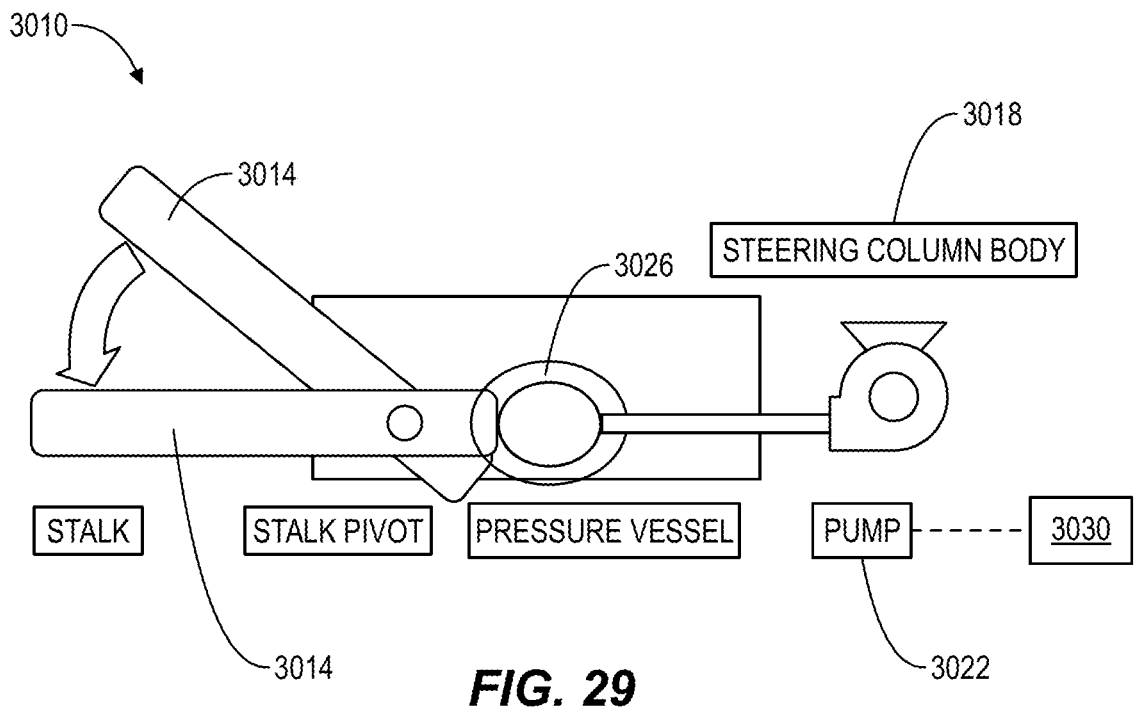

With reference to FIG. 29, a turn signal device 3010 includes a stalk 3014 that is pivotally coupled to a steering column 3018, and is movable between an original starting position, a right turn position, and a left turn position. The device 3010 includes a pump 3022, a pressure vessel 3026 coupled to the pump 3022, and a controller 3030 coupled to the pump 3022. In contrast to the device 2910, the activated pump 3022 empties the pressure vessel 3026, creating a vacuum or negative pressure that acts to pull on the stalk 3014 and return the stalk 3014 to the original starting position. In some embodiments the device 3010 includes the detent mechanisms of the device 10, and thus the only added feature or different feature from the system 10 is the controller 3030, the pump 3022, and the pressure vessel 3026.

In some embodiments, and as described above, the turn signal devices described herein generally maintain all current turn signal stalk user functions. In other words, the stalks may all still be manually moved by a driver to activate a turn signal, similar to the stalk 14 of the conventional turn signal device 10. Additionally, in some embodiments the turn signal devices described herein may generally maintain all current forces, tactile feels, and sound levels associated with the conventional turn signal device 10. In other words, when a user moves the stalks described above, the user still generally feels the same tactile feedback that the user would otherwise feel moving the stalk 14 in the conventional turn signal device 10. Accordingly, the driver is not burdened or distracted by new or changing feels or sounds with the turn signal devices described above. Additionally, while the turn signal devices described above are described in the context of being devices that automatically return the stalk to its original starting position or return the stalk via a powered operation, in some embodiments a user may still manually override the devices. In other words, a user may physically pull the stalk back down or raise the stalk back up at any time, overriding the automatic functionality of the turn signal devices described herein. Finally, some of the embodiment described herein may simply include a retrofit of the conventional turn signal device 10. For example, and as described above, many of the embodiments may utilize the conventional stalk 14 and release pawl 22, or a conventional detent mechanism, but may add further structures (e.g., an electric motor, solenoid, pump, etc.) to the already existing structures to modify the conventional turn signal device 10 into one of the turn signal devices described herein. Thus, many of the turn signal devices described herein may be implemented as retrofits to existing vehicles.

While the embodiments of the cancellation devices described herein have been in the context of a turn signal device (e.g., with a steering column and a stalk), in yet other embodiments the devices may be used in combination with other automotive features, and with other levers other than stalks. For example, the cancellation devices may be used in combination with a shifting device such as a gear shifter, or for a headlight adjuster. The shifting device or headlight adjuster may include a lever such as a stalk, a rotary knob, or any other component that is gripped and moved relative to the vehicle either linearly, rotationally, or a combination thereof. For example, the lever may be pivoted, similar to the stalks described above. The lever instead may be shifted linearly (e.g., pushed up or down). The lever may instead be a rotary knob that is twisted or otherwise rotated about an axis of rotation between different positions. The cancellation devices may include actuators (e.g., solenoids, motors, permanent magnets, pulsed magnetics, smart materials, pumps) such as those described above, which are coupled to the lever and/or move the lever in a similar manner to that described above for the turn signal stalks. The actuators may operate to return the lever back to a neutral position after a gear shift has occurred, or after headlight adjustment has occurred.

Although the invention has been described in detail with reference to certain preferred embodiments, variations and modifications exist within the scope and spirit of one or more independent aspects of the invention as described.

What is claimed is:

1. A cancellation device for an automotive feature on a vehicle, the cancellation device comprising:
   a main lever configured to be manually moved relative to the vehicle from a first, neutral position to a second, non-neutral position to actuate the automotive feature;
   a magnet configured to generate a force to hold the main lever in the second, non-neutral position;
   a detent lever configured to pivot about a pivot point between a first, latched position and a second, released position, the detent lever having a first end on one side of the pivot point configured to be attracted toward the magnet, and a second end on an opposite side of the pivot point, wherein the second end defines a tip; and
   an elongate member coupled to the main lever, wherein an end of the elongate member is configured to be moved and snapped over the tip of the detent lever when the detent lever is in the first, latched position.

2. The cancellation device of claim 1, wherein the automotive feature is a turn signal, and wherein the main lever is a turn signal stalk.

3. The cancellation device of claim 1, wherein the magnet is an electromagnet, wherein the electromagnet is configured to be activated when the main lever has moved to the second, non-neutral position.

4. The cancellation device of claim 1, wherein the elongate member is disposed at a distal end of the main lever.

5. The cancellation device of claim 1, wherein the elongate member is configured to move with the main lever when the main lever moves between the first, neutral position and the second, non-neutral position.

6. The cancellation device of claim 1, wherein the elongate member includes a spring-biased plunger.

7. The cancellation device of claim 1, wherein the end of the elongate member is rounded.

8. The cancellation device of claim 1, wherein the main lever is configured to rotate about a first axis when the main lever moves between the first, neutral position and the second, non-neutral position, and wherein the detent lever is configured to rotate about a second axis at the pivot point, wherein the first axis is parallel to the second axis.

9. The cancellation device of claim 1, wherein the detent lever is configured to freely rotate about the pivot point when the magnet is deactivated.

10. The cancellation device of claim 1, further comprising a mounting plate, wherein the detent is pivotally coupled to the mounting plate at the pivot point.

11. The cancellation device of claim 1, wherein the magnet is a permanent magnet.

12. The cancellation device of claim 11, further comprising a nulling element, wherein the nulling element is configured to reduce the holding force of the permanent magnet.

13. The cancellation device of claim 1, wherein the detent lever is a first detent lever and the pivot point is a first pivot point, wherein the cancellation device further comprises a second detent lever configured to pivot about a second pivot point that is separate from the first pivot point.

14. The cancellation device of claim 13, wherein the second detent lever is configured to rotate parallel to the first detent lever when the magnet has generated the force.

15. The cancellation device of claim 13, wherein the magnet is a first magnet and the tip is a first tip, wherein the cancellation device further comprises a second magnet, wherein the second detent lever includes a first end on one side of the second pivot point configured to be attracted toward the second magnet, and a second tip on an opposite side of the second pivot point.

16. The cancellation device of claim 1, further comprising a torsion spring, wherein the detent lever is biased by the torsion spring about the pivot point.

17. The cancellation device of claim 16, further comprising a centering spring configured to bias the main lever back to the first, neutral position.

18. The cancellation device of claim 1, further comprising a centering spring configured to bias the main lever back to the first, neutral position.

19. The cancellation device of claim 18, wherein the automotive feature is a turn signal, and wherein the main lever is a turn signal stalk.

20. The cancellation device of claim 18, wherein the magnet is a permanent magnet.

* * * * *